(12) United States Patent
Ibuki et al.

(10) Patent No.: US 7,572,516 B2
(45) Date of Patent: Aug. 11, 2009

(54) ANTIREFLECTION FILM, AND DISPLAY DEVICE COMPRISING THE SAME

(75) Inventors: Shuntaro Ibuki, Minami-Ashigara (JP); Masataka Yoshizawa, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 481 days.

(21) Appl. No.: 11/377,483

(22) Filed: Mar. 17, 2006

(65) Prior Publication Data

US 2006/0210727 A1 Sep. 21, 2006

(30) Foreign Application Priority Data

Mar. 18, 2005 (JP) ............ P.2005-079295
Jul. 29, 2005 (JP) ............ P.2005-220991

(51) Int. Cl.
*B32B 25/20* (2006.01)
(52) U.S. Cl. ................ 428/447; 528/32
(58) Field of Classification Search ........ 428/447; 528/32
See application file for complete search history.

(56) References Cited

U.S. PATENT DOCUMENTS

2004/0070041 A1* 4/2004 Obayashi et al. ........... 257/437

FOREIGN PATENT DOCUMENTS

| JP | 2003-222704 | 8/2003 |
|---|---|---|
| JP | 2004-170901 | 6/2004 |

\* cited by examiner

Primary Examiner—Kuo-Liang Peng
(74) Attorney, Agent, or Firm—Buchanan Ingersoll & Rooney PC

(57) ABSTRACT

An antireflection film comprising: a transparent support; at least one functional layer; and a low-refractive layer, wherein at least one of said at least one functional layer comprises a hydrolyzate and/or a partial condensate of an organosilane compound represented by formula (1), and the antireflection film has an inner haze of from 1 to 50%:

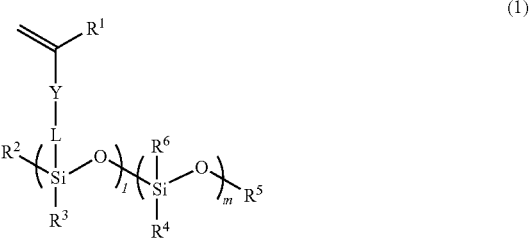

(1)

where $R^1$ represents a hydrogen atom, a methyl group, a methoxy group, an alkoxycarbonyl group, a cyano group, a fluorine atom, or a chlorine atom; Y represents a single bond, *—COO—**, *—CONH—**, or *—O—**; L represents a divalent linking group; $R^2$ to $R^4$ each independently represents a halogen atom, a hydroxyl group, an unsubstituted alkoxy group, or an unsubstituted alkyl group; $R^5$ represents a hydrogen atom or an unsubstituted alkyl group; $R^6$ represents a substituted or unsubstituted alkyl group, or a substituted or unsubstituted aryl group; and l indicates a number that satisfies a numerical formula of $l=100-m$, and m indicates a number of from 0 to 50.

7 Claims, 4 Drawing Sheets

ANTIREFLECTION FILM, AND DISPLAY DEVICE COMPRISING THE SAME

BACKGROUND OF THE INVENTION

1. Field of the Invention

The present invention relates to an antireflection film, a polarizing plate, and a display device comprising the same.

2. Description of the Related Art

In general, an antireflection film is disposed on the outermost surface of display devices such as cathode-ray tube (CRT) devices, plasma display panels (PDP), electroluminescent display devices (ELD) and liquid-crystal display devices (LCD). This is for preventing contrast reduction or image reflection caused by external light reflection on the displays, by reducing the reflectance owing to the principle of optical interference thereon.

The antireflection film of the type is generally produced by forming, on a support, functional layers (e.g., hard coat layer, antiglare layer, light-diffusive layer, high-refractive layer) and further a low-refractive layer having a suitable thickness thereon. For realizing its low reflectance, the material for the low-refractive layer is desired to have a refractivity as low as possible. Since the antireflection film is disposed on the outermost surface of displays, it is desired to have high scratch resistance. In order to realize high scratch resistance of thin films having a thickness of 100 nm or so, the films must have high mechanical strength by themselves and must be adhesive to underlying layers.

JP-A 2003-222704 describes adding a silane coupling agent to a low-refractive layer material comprising a fluoropolymer thereby to enhance the adhesiveness of the layer to the underlying layer and to improve the scratch resistance of the layer. It further describes adding a silane coupling agent also to the underlying hard coat layer material thereby to further enhance the adhesiveness between the upper and lower layers and to greatly improve the scratch resistance of the upper layer. However, the silane coupling agent has a low boiling point and its use is therefore problematic in that the agent may vaporize during the coating and drying step of forming the intended layer. Another problem with the agent is that the agent must be added in an excessive amount thereof in consideration of its vaporization and therefore a layer of stable quality is difficult to form when the agent is used.

A method of reducing the vaporization of the agent is described in JP-A 2004-170901, which comprises previously reacting a silane coupling agent by the use of an acid catalyst or a metal chelate catalyst to form a hydrolyzate and/or a partial condensate thereof, and adding it to a coating liquid to thereby reduce the vaporization of the agent in the coating and drying step of forming a layer. However, when a silane coupling agent is added to the underlying hard coat layer material according to the method, then it gives a problem in that the necessary adhesiveness, scratch resistance and optical properties could not be stably expressed depending on the degree of the hydrolysis and/or the partial condensation of the silane coupling agent.

SUMMARY OF THE INVENTION

Given that situation, we, the present inventors have assiduously studied and, as a result, have found out a region capable of stably attaining the necessary optical properties while ensuring good adhesiveness between upper and lower layers and good scratch resistance of the upper layer, by controlling the degree of the hydrolysis and/or the partial condensation of a silane coupling agent.

An object of the invention is to provide an antireflection film capable of stably showing the necessary optical properties while ensuring good adhesiveness between upper and lower layers and having good scratch resistance of the upper layer.

Another object of the invention is to provide a method of producing such an antireflection film at high producibility.

Still another object of the invention is to provide a polarizing plate and a display device comprising such an antireflection film.

We, the present inventors have assiduously studied and, as a result, have clarified a volatile range necessary for stabilization of scratch resistance and optical properties of an antireflection film, and to attain it, we have combined silane coupling agents having a different composition and have succeeded in obtaining a hydrolyzate and/or a partial condensate of a silane coupling agent having a necessary molecular weight distribution.

The present invention provides an antireflection film, a polarizing plate and an image display device mentioned below, and attains the above-mentioned objects.

1. An antireflection film comprising: a transparent support; at least one functional layer; and a low-refractive layer, wherein at least one of said at least one functional layer comprises a hydrolyzate and/or a partial condensate of an organosilane compound represented by formula (1), and the antireflection film has an inner haze of from 1 to 50%:

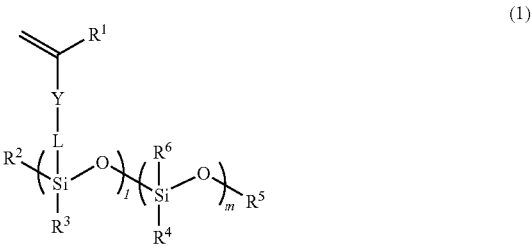

(1)

where $R^1$ represents a hydrogen atom, a methyl group, a methoxy group, an alkoxycarbonyl group, a cyano group, a fluorine atom, or a chlorine atom;

Y represents a single bond, *—COO—**, *—CONH—**, or *—O—** (* indicates the position at which the group bonds to =C($R^1$)—; and ** indicates the position at which the group bonds to L.), L represents a divalent linking group;

$R^2$ to $R^4$ each independently represents a halogen atom, a hydroxyl group, an unsubstituted alkoxy group, or an unsubstituted alkyl group;

$R^5$ represents a hydrogen atom or an unsubstituted alkyl group;

$R^6$ represents a substituted or unsubstituted alkyl group, or a substituted or unsubstituted aryl group; and l indicates a number that satisfies a numerical formula of l=100–m, and m indicates a number of from 0 to 50, and wherein the hydrolyzate and/or the partial condensate of the organosilane compound may be a hydrolyzate and/or a partial condensate of a mixture of plural types of the compounds represented by formula (1) having a specific l and a specific m.

2. The antireflection film of above 1, wherein the hydrolyzate and/or the partial condensate of the organosilane compound comprises 30% by mass or mass of a hydrolyzate and/or a partial condensate of the organosilane compound having a molecular weight of less than 1000.

3. The antireflection film of above 1 or 2, wherein the low-refractive layer comprises a binder having a functional group capable of crosslinking with $R^1$ in formula (1).

4. The antireflection film of any of above 1 to 3, wherein $R^6$ in formula (1) for the hydrolyzate and/or the partial condensate of organosilane is a fluoroalkyl group.

5. The antireflection film of any of above 1 to 4, which has an inner haze of from 1 to 40%.

6. The antireflection film of any of above 1 to 5, wherein at least one functional layer is any of a hard coat layer, an antiglare layer, a light-diffusive layer or an antistatic layer.

7. The antireflection film of any of above 1 to 6, wherein at least one functional layer is a hard coat layer having a pencil hardness of H or more.

8. The antireflection film of any of above 1 to 7, wherein at least one functional layer is an antiglare layer having a surface roughness Ra of from 0.1 to 0.5.

9. The antireflection film of any of above 1 to 8, wherein at least one functional layer is an antistatic layer having a surface resistivity log SR at 25° C. and 55% RH of at most 12 Ω/sq.

10. The antireflection film of any of above 1 to 9, wherein at least one functional layer is a light-diffusive layer that comprises at least one type of translucent particles having a mean particle size of from 0.1 to 5 μm dispersed in a translucent resin, the refractivity difference between the translucent particles and the translucent resin is from 0.02 to 0.2, and the translucent particles are in the light-diffusive layer in an amount of from 3 to 30% by mass of the total solid content of the layer.

11. The antireflection film of any of above 1 to 10, wherein each of the functional layer and the low-refractive layer comprises a binder which is one of a thermosetting resin and a UV-curable resin.

12. A polarizing plate wherein an antireflection film of any of above 1 to 11 is used as at least one of two protective films of the polarizing film.

13. The polarizing plate of above 12, wherein the other film than the antireflection film of the two protective films of the polarizing film is an optically-compensatory film that has an optically-anisotropic layer-containing optically-compensatory layer.

14. The polarizing plate of above 12 or 13, wherein at least one transparent support of the two protective films of the polarizing film is a cellulose acylate film that satisfies the following numerical formulae (I) and (II):

$$0 \leq Re(630) \leq 10, \text{ and } |Rth(630)| \leq 25, \quad (I)$$

$$|Re(400) - Re(700)| \leq 10, \text{ and } |Rth(400) - Rth(700)| \leq 35 \quad (II)$$

wherein Re(λ) represents an in-plane retardation value (unit: nm) at a wavelength of λ nm; and Rth(λ) represents a thickness-direction retardation value (unit: nm) at a wavelength of λ nm.

15. A display device having an antireflection film of any of above 1 to 11 or an polarizing plate of any of above 12 to 14, wherein the low-refractive layer is disposed on the viewing side of the device.

16. A TN, STN, VA, IPS or OCB-mode transmission-type, reflection-type or semitransmission-type liquid-crystal display device having at least one antireflection film of any of above 1 to 11, or at least one polarizing plate of any of above 12 to 14.

1 denotes an antireflection film; 2 denotes a transparent support; 3 denotes a hard coat layer; 4 denotes an antiglare hard coat layer; 5 denotes a low-refractive layer; 6 denotes a particles; 12 denotes a web; 13 denotes a slot die; 17 a denotes a tip lip; 18a denotes an upstream lip land; 18b denotes a downstream lip land; 40 denotes a vacuum chamber; 40a denotes a back plate; $I_{UP}$ denotes a land length of upstream lip land; and $I_{LO}$ denotes land length of downstream lip land.

DETAILED DESCRIPTION OF THE INVENTION

One embodiment of the invention is described with reference to the drawings showing a basic constitution of the antireflection film of the invention. In this description, the numerical range expressed by the wording "a number to another number" means the range that falls between the former number indicating the lowermost limit of the range and the latter number indicating the uppermost limit thereof.

Figure 1:
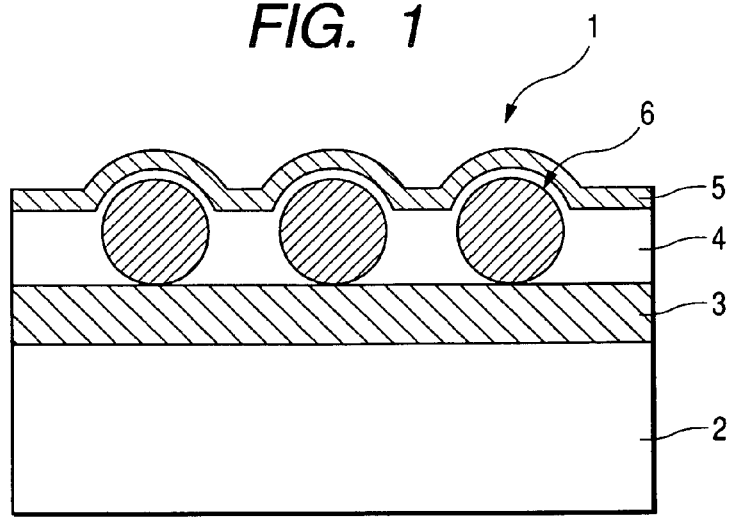
FIG. 1 is a schematic cross-sectional view showing the layer constitution of an antiglare antireflection film.

A cross-sectional view schematically shown in FIG. 1 is one example of an antireflection film of the invention. In this, the antireflection film 1 has a layer constitution comprising a transparent support 2, two functional layers (an antistatic layer 3, an antiglare hard coat layer 4), and a low-refractive layer 5 laminated in that order. The antiglare hard coat layer 4 contains mat particles 6 dispersed therein; and the part except the mat particles 6 of the antiglare hard coat layer 4 is preferably formed of a material having a refractive index of from 1.50 to 2.00, and the refractive index of the low-refractive layer is preferably from 1.20 to 1.49. In the invention, the functional layer may be such an antistatic layer or an antiglare hard coat layer, or may also be a non-antiglare hard coat layer or a light-diffusive layer. It may be one layer or may comprise plural layers, for example, from 2 to 4 layers. The low-refractive layer is disposed as the outermost layer of the film.

Preferably, the low-refractive layer satisfies the following numerical formula (I) for ensuring the low-refractive thereof $$(m\lambda/4) \times 0.7 < n_1 d_1 < (m\lambda/4) \times 1.3 \quad (I)$$

wherein m indicates a positive odd number; n1 indicates the refractive index of the low-refractive layer; and d1 indicates the layer thickness (nm) of the low-refractive layer. λ represents an wavelength (nm) of light, falling within a range of from 500 nm to 550 nm.

Satisfying the numerical formula (I) means the presence of m (this is a positive odd number, and is generally 1) that satisfies the numerical formula (I) within the above-mentioned wavelength range.

Preferably, the antireflection film of the invention has internal scatterability. The internal scatterability is generally represented by an internal haze. The internal haze is obtained by subtracting the surface haze of the film from the overall haze thereof that is generally measured. When the antireflection film of the invention that has internal scatterability is built in a display device as the outermost surface of the panel, then it is favorable since the optical unevenness of the other constitutive elements of the display device (e.g., brightness unevenness of light source, color unevenness of color filter) may be reduced. However, if the internal haze of the film is too high, then it may cause contrast reduction. Therefore, the internal haze is preferably from 1 to 50%, more preferably from 1 to 45%, even more preferably from 1 to 40%.

(Organosilane Compound)

At least one layer of the functional layers that constitute the antireflection film of the invention preferably contains at least one component of a hydrolyzate and/or a partial condensate of an organosilane compound (this may be hereinafter referred to as "sol component") in the coating liquid to form the layer from the viewpoint of the scratch resistance of the layer. Preferably, the sol component is added to both the low-refractive layer and the functional layer for satisfying both the antireflection capability and the scratch resistance of the film. After the coating liquid has been applied to a substrate, the sol component therein may be condensed to form a cured product during a heating and drying process, and it may be a part of the binder in the layer formed of the coating liquid. When the cured product has a polymerizing unsaturated bond, then it may form a binder having a three-dimensional structure through irradiation with active rays.

The sol component of the organosilane compound is represented by the following formula (1):

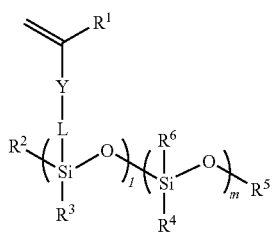

(1)

In formula (1), $R^1$ represents a hydrogen atom, a methyl group, a methoxy group, an alkoxycarbonyl group, a cyano group, a fluorine atom, or a chlorine atom. The alkoxycarbonyl group include a methoxycarbonyl group and an ethoxycarbonyl group. Preferably, $R^1$ is a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, even more preferably a hydrogen atom or a methyl group.

Y represents a single bond, *—COO—**, *—CONH—**, or *—O—**, preferably a single bond, *—COO—** or *—CONH—**, more preferably a single bond or *—COO—**, even more preferably *—COO—**. * indicates the position at which the group bonds to $=C(R^1)-$ in the formula; and ** indicates the position at which the group bonds to L therein.

L represents a divalent linking group. For example, it includes a substituted or unsubstituted alkylene group, a substituted or unsubstituted arylene group, a substituted or unsubstituted alkylene group having a linking group (e.g., ether, ester, amide) inside it, and a substituted or unsubstituted arylene group having a linking group inside it. Preferably, it is a substituted or unsubstituted alkylene group, a substituted or unsubstituted arylene group, or an alkylene group having a linking group inside it, more preferably an unsubstituted alkylene group, an unsubstituted arylene group, or an alkylene group having an ether or ester linking group inside it, even more preferably an unsubstituted alkylene group or an alkylene group having an ether or ester linking group inside it. The substituent for these includes a halogen atom, a hydroxyl group, a mercapto group, a carboxyl group, an epoxy group, an alkyl group and an aryl group, and these substituents may be further substituted.

l indicates a number (molar ratio in percentage) that satisfies a numerical formula of l=100−m, and m indicates a number of from 0 to 50. Preferably, m is a number (molar ratio in percentage) of from 0 to 40, more preferably a number of from 0 to 30. If m is larger than 50, then it is unfavorable since a solid deposit may be formed, the liquid may become cloudy, the pot life of the liquid may be short, the molecular weight of the compound is difficult to control (that is, the molecular weight thereof may increase), and the property of the polymerized product (e.g., the scratch resistance of the antireflection film) could not be improved since the content of the polymerizing group in the compound is small.

$R^2$ to $R^4$ each independently represent a halogen atom, a hydroxyl group, an unsubstituted alkoxy group, or an unsubstituted alkyl group. Preferably, $R^2$ to $R^4$ each are a chlorine atom, a hydroxyl group, an unsubstituted alkoxy group having from 1 to 6 carbon atoms, more preferably a hydroxyl group or an alkoxy group having from 1 to 3 carbon atoms, even more preferably a hydroxyl group or a methoxy group.

$R^5$ represents a hydrogen atom or an unsubstituted alkyl group, preferably a hydrogen atom or an alkyl group having from 1 to 3 carbon atoms, more preferably a hydrogen atom or a methyl group.

$R^6$ represents a substituted or unsubstituted alkyl group, or a substituted or unsubstituted aryl group. The alkyl group preferably has from 1 to 30 carbon atoms, more preferably from 1 to 16 carbon atoms, even more preferably from 1 to 6 carbon atoms. Examples of the alkyl group are methyl, ethyl, propyl, isopropyl, hexyl, decyl, hexadecyl. The aryl group includes phenyl and naphthyl, but is preferably a phenyl group. Not specifically defined, the substituent that may be in $R^6$ includes a halogen atom (e.g., fluorine, chlorine, bromine), a hydroxyl group, a mercapto group, a carboxyl group, an epoxy group, an alkyl group (e.g., methyl, ethyl, i-propyl, propyl, t-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl), an acylamino group (e.g., acetylamino, benzoylamino, acrylamino, methacrylamino). These substituents may be further substituted. For the substituent, also preferred is a polymerizing functional group except a vinyl-polymerizing group, for example, an epoxy group or an isocyanate group. The substituent for $R^6$ is preferably a hydroxyl group or an unsubstituted alkyl group, more preferably a hydroxyl group or an alkyl group having from 1 to 3 carbon atoms, even more preferably a hydroxyl group or a methyl group.

The compound of formula (1) is produced from one or more different types of silane compounds as the starting material for it. Examples of the silane compounds that may be the starting material for the compound of formula (1) are mentioned below, to which, however, the invention should not be limited.
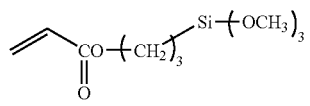 M-1
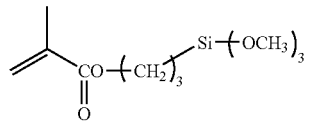 M-2
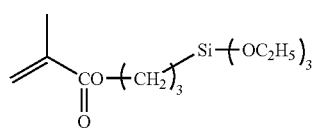 M-3
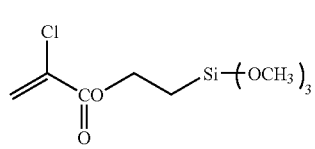 M-4
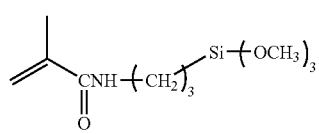 M-5
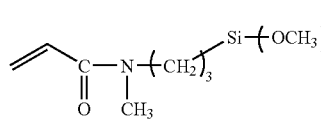 M-6
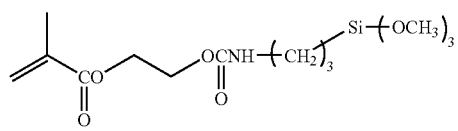 M-7
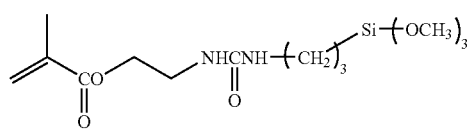 M-8
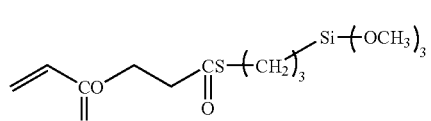 M-9
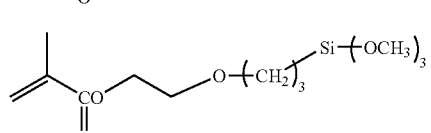 M-10
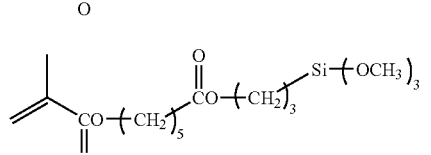 M-11
-continued
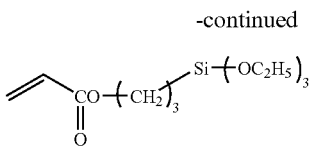 M-12
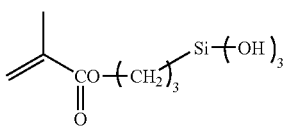 M-13
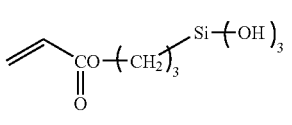 M-14
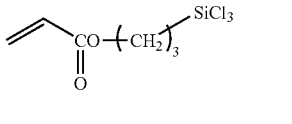 M-15
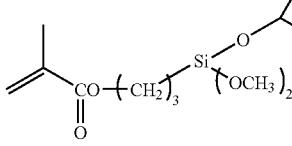 M-16
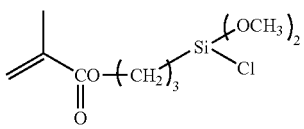 M-17
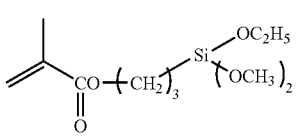 M-18
 M-19
 M-20
 M-21
 M-22
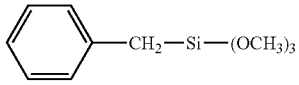 M-23
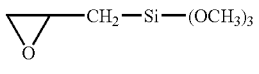 M-24
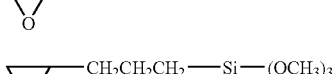 M-25
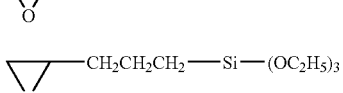 M-26
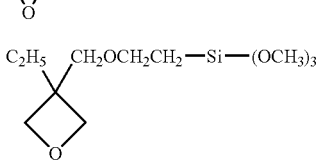 M-27

-continued

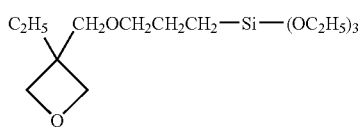
M-28

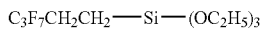
M-29

M-30

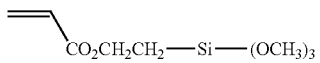
M-31

M-32

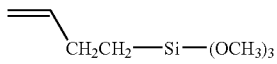
M-33

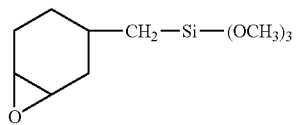
M-34

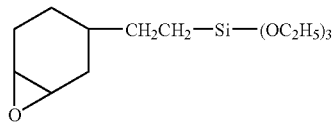
M-35

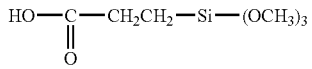
M-36

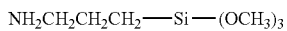
M-37

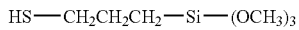
M-38

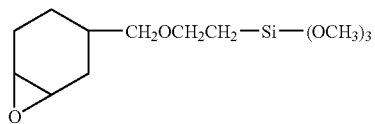
M-39

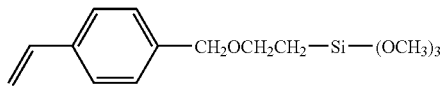
M-40

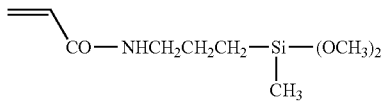
M-41

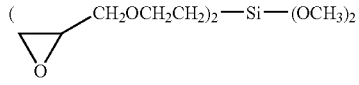
M-42

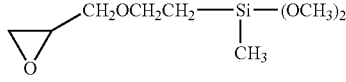
M-43

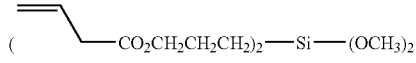
M-44

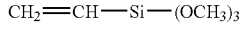
M-45

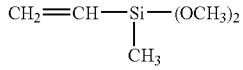
M-46

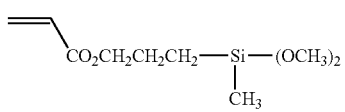
M-47

$CH_3—Si(OCH_3)_3$  M-48

$C_2H_5—Si(OCH_3)_3$  M-49

$t-C_4H_9—Si(OCH_3)_3$  M-50

Of those, especially preferred for the starting material are (M-1), (M-2), (M-25), (M-48) and (M-49).

When $R^6$ in formula (1) is a fluorine atom-containing group, then a hydrolyzate or a complete hydrolyzate of a fluoroalkyl group-containing silane compound may be used herein. This is favorable since a fluoroalkyl group may be introduced into the hydrolyzate and/or partial condensate of an organosilane for use in the invention.

The fluoroalkyl group-containing silane compound is preferably represented by the following formula (3):

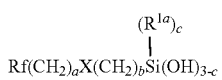
(3)

wherein Rf represents $C_nF_{2n+1}$, or a polyfluoroalkyl group optionally containing at least one ether bond of the following formula:

In this, n indicates an integer of from 1 to 20; m indicates an integer of 1 or more, preferably from 1 to 20, more preferably from 1 to 10. In formula (3), X represents a linking group of one or more of —$CH_2$—, —$CH_2O$—, —$NR^{2a}$—, —COO—, —$CONR^{2a}$—, —S—, —$SO_3$— and —$SO_2NR^{2a}$— (where $R^{2a}$ represents a hydrogen atom or an alkyl group having from 1 to 8 carbon atoms); $R^{1a}$ represents an alkyl group having from 1 to 4 carbon atom, an alkoxy group having from 1 to 4 carbon atoms, or a hydroxyl group; a indicates an integer of from 0 to 3; b indicates an integer of from 1 to 3; c indicates an integer of from 0 to 2.

Rf is $C_nF_{2n+1}$, or $CF_3CF_2CF_2O(CFCF_3CF_2O)_mCFCF_3$— (where n and m have the same meanings as above), and $C_nF_{2n+1}$, includes $CF_3$—, $C_2F_5$—, $C_3F_7$—, $C_4F_9$—, $C_6F_{13}$—, $C_8F_{17}$—, $C_{10}F_{21}$—, $C_{12}F_{25}$—, $C_{14}F_{29}$—, $C_{16}F_{33}$—, $C_{18}F_{37}$—, $C_{20}F_{41}$—.

Examples of the silane compound of formula (3) are mentioned below.

$Rf(CH_2)_2Si(OH)_3$ $Rf(CH_2)_2SiCH_3(OH)_2$ $Rf(CH_2)_2Si(OCH_3)(OH)_2$ $Rf(CH_2)_2Si(OCH_2CH_3)(OH)_2$ $Rf(CH_2)_2Si(CH_3)_2(OH)$

Rf(CH$_2$)$_2$Si(OCH$_3$)$_2$(OH)

Rf(CH$_2$)$_2$Si(OCH$_2$CH$_3$)$_2$(OH)

Rf(CH$_2$)$_3$Si(OH)$_3$

Rf(CH$_2$)$_3$SiCH$_3$(OH)$_2$

Rf(CH$_2$)$_3$Si(OCH$_3$)(OH)$_2$

Rf(CH$_2$)$_3$Si(OCH$_2$CH$_3$)(OH)$_2$

Rf(CH$_2$)$_3$Si(CH$_3$)$_2$(OH)

Rf(CH$_2$)$_3$Si(OCH$_3$)$_2$(OH)

Rf(CH$_2$)$_3$Si(OCH$_2$CH$_3$)$_2$(OH)

RfNH(CH$_2$)$_2$Si(OH)$_3$

RfNH(CH$_2$)$_2$SiCH$_3$(OH)$_2$

RfNH(CH$_2$)$_2$Si(OCH$_3$)(OH)$_2$

RfNH(CH$_2$)$_2$Si(OCH$_2$CH$_3$)(OH)$_2$

RfNH(CH$_2$)$_2$Si(CH$_3$)$_2$(OH)

RfNH(CH$_2$)$_2$Si(OCH$_3$)$_2$(OH)

RfNH(CH$_2$)$_2$Si(OCH$_2$CH$_3$)$_2$(OH)

RfNH(CH$_2$)$_2$NH(CH$_2$)$_2$Si(OH)$_3$

RfNH(CH$_2$)$_2$NH(CH$_2$)$_2$SiCH$_3$(OH)$_2$

RfNH(CH$_2$)$_2$NH(CH$_2$)$_2$Si(OCH$_3$)(OH)$_2$

RfNH(CH$_2$)$_2$NH(CH$_2$)$_2$Si(OCH$_2$CH$_3$)(OH)$_2$

RfNH(CH$_2$)$_2$NH(CH$_2$)$_2$Si(CH$_3$)$_2$(OH)

RfNH(CH$_2$)$_2$NH(CH$_2$)$_2$Si(OCH$_3$)$_2$(OH)

RfNH(CH$_2$)$_2$NH(CH$_2$)$_2$Si(OCH$_2$CH$_3$)$_2$(OH)

RfCONH(CH$_2$)$_2$Si(OH)$_3$

RfCONH(CH$_2$)$_2$SiCH$_3$(OH)$_2$

RfCONH(CH$_2$)$_2$Si(OCH$_3$)(OH)$_2$

RfCONH(CH$_2$)$_2$Si(OCH$_2$CH$_3$)(OH)$_2$

RfCONH(CH$_2$)$_2$Si(CH$_3$)$_2$(OH)

RfCONH(CH$_2$)$_2$Si(OCH$_3$)$_2$(OH)

RfCONH(CH$_2$)$_2$Si(OCH$_2$CH$_3$)$_2$(OH)

Of those, preferred are the following:

CF$_3$(CH$_2$)$_2$Si(OH)$_3$

CF$_3$(CH$_2$)$_2$SiCH$_3$(OH)$_2$

CF$_3$(CH$_2$)$_2$Si(OCH$_3$)(OH)$_2$

CF$_3$(CH$_2$)$_2$Si(CH$_3$)$_2$(OH)

CF$_3$(CH$_2$)$_2$Si(OCH$_3$)$_2$(OH)

C$_8$F$_{17}$(CH$_2$)$_2$Si(OH)$_3$

C$_8$F$_{17}$(CH$_2$)$_2$SiCH$_3$(OH)$_2$

C$_8$F$_{17}$(CH$_2$)$_2$Si(OCH$_3$)(OH)$_2$

C$_8$F$_{17}$(CH$_2$)$_2$Si(CH$_3$)$_2$(OH)

C$_8$F$_{17}$(CH$_2$)$_2$Si(OCH$_3$)$_2$(OH)

C$_3$F$_7$(CF(CF$_3$)CF$_2$O)$_3$CF(CF$_3$)CH$_2$O(CH$_2$)$_3$Si(OH)$_3$

C$_3$F$_7$(CF(CF$_3$)CF$_2$O)$_3$CF(CF$_3$)CH$_2$O(CH$_2$)$_3$SiCH$_3$(OH)$_2$

C$_3$F$_7$(CF(CF$_3$)CF$_2$O)$_3$CF(CF$_3$)CH$_2$O(CH$_2$)$_3$Si(OCH$_3$)(OH)$_2$

C$_3$F$_7$(CF(CF$_3$)CF$_2$O)$_3$CF(CF$_3$)CH$_2$O(CH$_2$)$_3$Si(OCH$_3$)$_2$(OH)

These compounds may be produced by adding a hydrolysis-corresponding amount of water to a fluoroalkyl group-containing halogenosilane compound or a fluoroalkyl group-containing alkoxysilane compound so as to hydrolyze it and then silanolating the resulting hydrolyzate.

Preferably, the vaporization of at least any one of the hydrolyzate and the partial condensate of an organosilane for use in the invention is suppressed for the purpose of stabilizing the quality of the coated product. Concretely, it is desirable that the vaporization of the compound in one hour at 105° C. is at most 5% by mass, more preferably at most 3% by mass, even more preferably at most 1% by mass.

The sol component for use in the invention is prepared through hydrolysis and/or partial condensation of the above-mentioned organosilane.

Of at least any one of the hydrolyzate and the partial condensate of organosilane for use in the invention, the weight-average molecular weight of any of the hydrolyzate and the partial condensate of a vinyl-polymerizing group-containing organosilane is, except for the component having a molecular weight of less than 300, preferably from 450 to 20000, more preferably from 500 to 10000, even more preferably from 550 to 5000, still more preferably from 600 to 3000.

Of the organosilane hydrolyzate and/or partial condensate component having a molecular weight of at least 300, the component having a molecular weight of larger than 20000 is preferably at most 10% by mass, more preferably at most 5% by mass, even more preferably at most 3% by mass. If the content of the component is larger than 10% by mass, then the cured film formed by curing a curable composition that contains a hydrolyzate and/or a partial condensate of such an organosilane may have poor transparency and poor adhesiveness to substrates.

The weight-average molecular weight and the molecular weight as referred to herein is determined through differential refractiometry with a GPC analyzer using a column of TSK-gel GMHxL, TSKgel G4000HxL or TSKgel G2000HxL (ail trade names by Tosoh) with a solvent of THF, as converted on the basis of a standard, polystyrene. The content of each component is represented by the peak area % of the molecular weight range thereof, based on the peak area, 100% of the component having a molecular weight of at least 300.

The degree of molecular weight distribution (weight-average molecular weight/number-average molecular weight) is preferably from 3.0 to 1.1, more preferably from 2.5 to 1.1, even more preferably from 2.0 to 1.1.

$^{29}$Si-NMR analysis of the hydrolyzate and the partial condensate of organosilane for use in the invention may confirm a condition where the hydrolyzable group in formula (1) is condensed as a form of —OSi.

When this is grouped into a case where three Si bonds are condensed as —OSi (T3), a case where two Si bonds are condensed as —OSi (T2), a case where one Si bond is condensed as —OSi (T1), and a case where no Si is condensed at all (T0), then the degree of condensation, α may be represented by a numeral formula (II):

$$\alpha = (T3 \times 3 + T2 \times 2 + T1 \times 1)/3/(T3+T2+T1+T0)$$

The degree of condensation is preferably from 0.2 to 0.95, more preferably from 0.3 to 0.93, even more preferably from 0.4 to 0.9.

If it is smaller than 0.1, then the hydrolysis and the condensation may be insufficient, and if so, the monomer component may increase and the curing will be therefore insufficient. On the other hand, if it is larger than 0.95, then the hydrolysis and the condensation may be done too much and therefore the hydrolyzable group may be consumed, and, as a result, the interaction between a binder polymer, a resin substrate and inorganic particles may lower and the organosilane hydrolyzate and/or partial condensate used may be ineffective.

The hydrolyzate and the partial condensate of an organosilane compound for use in the invention is described in detail hereinunder.

Hydrolysis and subsequent condensation of organosilane is generally effected in the presence of a catalyst. The catalyst includes inorganic acids such as hydrochloric acid, sulfuric acid, nitric acid; organic acids such as oxalic acid, acetic acid, butyric acid, maleic acid, citric acid, formic acid, methanesulfonic acid, toluenesulfonic acid; inorganic bases such as sodium hydroxide, potassium hydroxide, ammonia; organic bases such as triethylamine, pyridine; metal alkoxides such as aluminium triisopropoxide, zirconium tetrabutoxide, tetrabutyl titanate, dibutyl tin dilaurate; and metal chelate compounds with a center metal of Zr, Ti, Al or the like; and F-containing compounds such as KF, $NH_4F$.

One or more different types of the catalysts may be used either singly or as combined.

Hydrolysis/condensation of organosilane may be effected in the absence of a solvent or in a solvent. Preferably, it is effected in an organic solvent for uniformly mixing the components therein. For examples, preferably used are alcohols, aromatic hydrocarbons, ethers, ketones, esters.

Preferably, the solvent may dissolve both the organosilane and the catalyst. Also preferably, the organic solvent is used as a coating liquid or as a part of a coating liquid in view of the processability of the composition. Further preferably, the organic solvent does not detract from the solubility and the dispersibility of the fluoropolymer and other materials when mixed with them.

The alcohols are preferably monoalcohols or dialcohols; and the monoalcohols are preferably saturated aliphatic alcohols having from 1 to 8 carbon atoms.

Examples of the alcohols are methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether, ethylene glycol acetate monoethyl ether.

Examples of the aromatic hydrocarbons are benzene, toluene, xylene; examples of the ethers are tetrahydrofuran, dioxane; examples of the ketones are acetone, methyl ethyl ketone, methyl isobutyl ketone, diisobutyl ketone, cyclohexanone; examples of the esters are ethyl acetate, propyl acetate, butyl acetate, propylene carbonate.

One or more of these organic solvents may be used herein either singly or as combined. Not specifically defined, the solid concentration in the reaction may be generally from 1% to 100%.

Water is added to the organosilane in an amount of from 0.05 to 2 mols, preferably from 0.1 to 1 mol relative to one mol of the hydrolyzing group of the organosilane, and this is stirred in the presence or absence of a solvent and in the presence of a catalyst at 25 to 100° C.

In the invention, it is desirable that the hydrolysis is effected in the presence of at least one metal chelate compound that comprises, as a ligand, an alcohol of a formula $R^7OH$ (where $R^7$ is an alkyl group having from 1 to 10 carbon atoms) and a compound of a formula $R^8COCH2COR^9$ (where $R^8$ is an alkyl group having from 1 to 10 carbon atoms, and $R^9$ is an alkyl group having from 1 to 10 carbon atoms or an alkoxy group having from 1 to 10 carbon atoms), and a center metal selected from Zr, Ti or Al, with stirring at 25 to 100° C.

On the other hand, if an F-containing compound is used as the catalyst, then the F-containing compound has the ability to completely promote the hydrolysis and the condensation, and therefore the degree of polymerization may be determined by selecting the amount of water to be added, and this is favorable since any desired molecular weight may be predetermined. Specifically, for preparing an organosilane hydrolyzate and/or partial condensate having a mean degree of polymerization M, (M-1) mols of water may be used for M mols of the hydrolyzable organosilane.

Not specifically defined, the metal chelate compound may be any one that comprises, as a ligand, an alcohol of a formula $R^7OH$ (where $R^7$ is an alkyl group having from 1 to 10 carbon atoms) and a compound of a formula $R^8COCH_2COR^9$ (where $R^8$ is an alkyl group having from 1 to 10 carbon atoms, and $R^9$ is an alkyl group having from 1 to 10 carbon atoms or an alkoxy group having from 1 to 10 carbon atoms), and a center metal selected from Zr, Ti or Al, and any metal chelate compound of the type is preferably used in the invention. Falling within the range, two or more different types of such metal chelate compounds may be combined for use herein. Preferably, the metal chelate compound for use in the invention is selected from a group of compounds represented by $Zr(OR^7)p1(R^8COCHCOR^9)p2$, $Ti(OR^7)q1(R^8COCHCOR^9)q2$ and $Al(OR^7)r1(R^8COCHCOR^9)r2$, and these promote condensation of hydrolyzates and/or partial condensates of the above-mentioned organosilane compounds.

$R^7$ and $R^8$ in the metal chelate compound may be the same or different, each representing an alkyl group having from 1 to 10 carbon atoms, concretely, an ethyl group, an n-propyl group, an i-propyl group, an n-butyl group, a sec-butyl group, a t-butyl group, an n-pentyl group, or a phenyl group. $R^9$ represents an alkyl group having from 1 to 10 carbon atoms like the above, or represents an alkoxy group having from 1 to 10 carbon atoms, for example, a methoxy group, an ethoxy group, an n-propoxy group, an i-propoxy group, an n-butoxy group, a sec-butoxy group, or a t-butoxy group. p1, p2, q1, q2, r1 and r2 in the metal chelate compound each are an integer defined so as to satisfy p1+p2=4, q1+q2=4, r1+r2=3.

Specific examples of the metal chelate compounds are zirconium chelate compounds such as tri-n-butoxyethylacetacetate zirconium, di-n-butoxybis(ethylacetacetate)zirconium, n-butoxytris(ethylacetacetate)zirconium, tetrakis(n-propylacetacetate)zirconium, tetrakis(acetylacetacetate) zirconium, tetrakis(ethylacetacetate)zirconium; titanium chelate compounds such as diisopropoxy-bis(ethylacetacetate)titanium, diisopropoxy-bis(acetylacetate)titanium, diisopropoxy-bis(acetylacetone)titanium; aluminium chelate compounds such as diisopropoxyethylacetacetate aluminium, diisopropoxyacetylacetonate aluminium, isopropoxybis(ethylacetacetate)aluminium, isopropoxybis(acetylacetonate)aluminium, tris(ethylacetacetate)aluminium, tris(acetylacetonate)aluminium, monoacetylacetonate-bis(ethylacetacetate)aluminium.

Of those metal chelate compounds, preferred are tri-n-butoxyethylacetacetate zirconium, diisopropoxybis(acetylacetonate)titanium, diisopropoxyethylacetacetate aluminium, and tris(ethylacetacetate)aluminium. One or more of these metal chelate compounds may be used either singly or as combined. Partial hydrolyzates of these metal chelate compounds may also be used.

In the invention, the metal chelate compound is used preferably in a ratio thereof to the organosilane of from 0.01 to 50% by mass, more preferably from 0.1 to 50% by mass, even more preferably from 0.5 to 10% by mass. Using the metal chelate compound within the range as above enables rapid condensation of the organosilane compound to give a coating film of good durability, and in this case, in addition, the storage stability of the composition that contains the hydrolyzate/partial condensate of the organosilane compound and the metal chelate compound is good.

To the coating liquids for the functional layer and the low-refractive layer in the invention, preferably added is at least any one of a β-diketone compound and a β-ketoester compound, in addition to the composition that contains the sol component and the metal chelate compound mentioned above. This is described below.

At least any of β-diketone compounds and β-ketoester compounds of a formula $R^8COCH_2COR^9$ may be used in the invention. These serve as a stability improver in the composition for use in the invention. Specifically, it may be considered that the compound may coordinate with the metal atom in the above-mentioned metal chelate compound (at least any compound of zirconium, titanium and aluminium compounds) to thereby retard the action of the metal chelate compound that may promote the condensation of the hydrolyzate and partial condensate of the organosilane compound, and to thereby improve the storage stability of the composition. $R^8$ and $R^9$ that constitute the β-diketone compounds and the β-ketoester compounds may be the same as $R^8$ and $R^9$ that constitute the above-mentioned metal chelate compounds.

Specific examples of the β-diketone compounds and the β-ketoester compounds are acetylacetone, methyl acetacetate, ethyl acetacetate, n-propyl acetacetate, i-propyl acetacetate, n-butyl acetacetate, sec-butyl acetacetate, t-butyl acetacetate, 2,4-hexanedione, 2,4-heptanedione, 3,5-heptanedione, 2,4-octanedione, 2,4-nonanedione, 5-methylhexanedione. Of those, preferred are ethyl acetacetate and acetylacetone; and more preferred is acetylacetone. One or more such β-diketone compounds and β-ketoester compounds may be used herein either singly or as combined. The amount the β-diketone compound and the β-ketoester compound for use in the invention is preferably at least 2 mols, more preferably from 3 to 20 mols relative to 1 mol of the metal chelate compound. This is because, if the amount is smaller than 2 mols, then it is unfavorable since the storage stability of the composition may be poor.

The amount of the hydrolyzate and the partial condensate of organosilane compound to be in the composition is preferably smaller for the low-refractive layer that is relatively thin, but is preferably larger for the other thick functional layers. In consideration of the expression of the effect of the invention and of the refractivity of the film, the film shape and the film surface condition, the amount of the compound is preferably from 0.1 to 50% by mass, more preferably from 0.5 to 30% by mass, most preferably from 1 to 15% by mass of the total solid content of the layer that contains the compound (that is, the layer to which the compound is added).

The functional layers of the antireflection film of the invention are described.

The antireflection film of the invention has at least one functional layer and a low-refractive layer on a transparent support. In the invention, the functional layer may be any of an optical functional layer and a physical functional layer. The optical functional layer includes a high-refractive layer and a light-diffusive layer; and the physical functional layer includes a hard coat layer and an antistatic layer. Needless-to-say, one functional layer may serve both as an optical functional layer and a physical functional layer, and for example, it corresponds to an antiglare hard coat layer.

[Antistatic Layer]

For forming an antistatic layer, for example, herein employable is any known method of, for example, a method of applying a conductive coating liquid that contains conductive particles and a binder such as a reactive curable resin, onto a substrate, or a method of forming a conductive thin film through vapor deposition or sputtering of a metal or a metal oxide capable of forming a transparent film. The antistatic layer may be formed directly on a substrate film (transparent support) or via a primer layer for enhancing the adhesion of the layer to the substrate film. The antistatic layer may serve as a part of the antireflection film. In this case, when the layer is near to the outermost layer of the film, then it may ensure a good antistatic property even though it is thin.

Preferably, the thickness of the antistatic layer is from 0.01 to 10 μm, more preferably from 0.03 to 7 μm, even more preferably from 0.05 to 5 μm. Preferably, the surface resistivity (log SR) of the antistatic layer at 25° C. and 55% RH is at most 12 Ω/sq, more preferably at most 10 Ω/sq. Also preferably, however, the surface resistivity is at least 5 Ω/sq in order that the coating layer may have good transparency. Specifically, the surface resistivity of the antistatic layer at 25° C. and 55% RH is preferably from 5 to 12 Ω/sq, even more preferably from 5 to 10 Ω/sq.

The surface resistance of the antistatic layer may be determined according to a four-probe method or a method of JIS K6991.

When the antistatic layer has a surface resistivity falling within the above-mentioned range, the antireflection film may be transparent and has good dust resistance.

Preferably, the antistatic layer is an electron-conductive layer of which the surface resistivity changes little depending on the ambient temperature and humidity.

Also preferably, the antistatic layer is substantially transparent. Concretely, the haze of the antistatic layer is preferably at most 10%, more preferably at most 5%, even more preferably at most 3%, most preferably at most 1%. The light transmittance of the layer at a wavelength of 550 nm is preferably at least 50%, more preferably at least 60%, even more preferably at least 65%, most preferably at least 70%.

Preferably, the antistatic layer has high strength. Concretely, the strength of the antistatic layer is preferably H or more in terms of a pencil hardness under a load of 1 kg (as defined in JIS K5400), more preferably 2H or more, even more preferably 3H or more, most preferably 4H or more.

(Conductive Particles in Antistatic Layer)

The conductive particles are preferably inorganic particles (conductive inorganic particles).

Their specific surface area is preferably from 10 to 400 $m^2/g$, more preferably from 20 to 200 $m^2/g$, most preferably from 30 to 150 $m^2/g$.

Preferably, the conductive inorganic particles are formed of a metal oxide or nitride. Examples of the metal oxide or nitride include tin oxide, indium oxide, zinc oxide and titanium oxide. Above all, especially preferred are tin oxide and indium oxide. The conductive inorganic particles may comprise such a metal oxide or nitride as the principal ingredient thereof and may contain any other element. The principal ingredient is meant to indicate an ingredient of which the content (% by mass) is the largest of all the constitutive ingredients of the particles. Examples of the other elements are Ti, Zr, Sn, Sb, Cu, Fe, Mn, Pb, Cd, As, Cr, Hg, Zn, Al, Mg, Si, P, S, B, Nb, In, V and halogen atoms. For increasing the conductivity of tin oxide and indium oxide, it is desirable to add any of Sb, P, B, Nb, In, V and halogen atoms thereto. Especially preferred are Sb-containing tin oxide (ATO) and Sn-containing tin oxide (ITO). Preferably, the Sb content of ATO is from 3 to 20% by mass. Preferably, the Sn content of ITO is from 5 to 20% by mass.

Preferably, the mean particle size of the primary particles of conductive inorganic particles for use in the antistatic layer is from 1 to 150 nm, more preferably from 5 to 100 nm, even more preferably from 5 to 70 nm. The mean particle size of the conductive inorganic particles in the antistatic layer formed may be from 1 to 200 nm, preferably from 5 to 150 nm, more preferably from 10 to 100 nm, most preferably from 10 to 80 nm. The mean particle size of the conductive inorganic particles is a mean diameter of the particles whose mass is considered as the weight thereof, and it may be determined according to a light scattering process or electronic microscopy.

The conductive inorganic particles may be subjected to surface treatment. For the surface treatment, usable are inorganic compounds or organic compounds. Examples of the inorganic compound for the surface treatment include alumina and silica. Silica treatment is especially preferred. Examples of the organic compounds for the surface treatment include polyols, alkanolamines, stearic acid, silane coupling agents and titanate coupling agents. Most preferred are silane coupling agents. Two or more different types of surface treatment may be combined for use herein.

Regarding their shape, the conductive inorganic particles are preferably granular, spherical, cubic, conical or amorphous.

Two or more different types of conductive inorganic particles may be combined for use in the antistatic layer.

Preferably, the proportion of the conductive inorganic particles in the antistatic layer is from 20 to 90% by mass, more preferably from 25 to 85% by mass, even more preferably from 30 to 80% by mass.

The conductive inorganic particles may be used for forming the antistatic layer in the form of their dispersion. Preferably, the dispersion medium for the conductive inorganic particles is a liquid having a boiling point of from 60 to 170° C. Examples of the dispersion medium include water, alcohols (e.g., methanol, ethanol, isopropanol, butanol, benzyl alcohol), ketones (e.g., acetone, methyl ethyl ketone (MEK), methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenohydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran), ether alcohols (e.g., 1-methoxy-2-propanol). Especially preferred are toluene, xylene, methyl ethyl ketone, methyl isobutyl ketone, cyclohexanone and butanol. The conductive inorganic particles may be dispersed in a medium by the use of a disperser. Examples of the disperser are a sand grinder mill (e.g., pin-combined bead mill), a high-speed impeller mill, a pebble mill, a roller mill, an attritor, and a colloid mill. Especially preferred are a sand grinder mill and a high-speed impeller mill. If desired, the particles may be subjected to preliminary dispersion treatment. Examples of the disperser for the preliminary dispersion treatment are a ball mill, a three-roll mill, a kneader and an extruder.

(Binder in Antistatic Layer)

In the antistatic layer, a crosslinked polymer may be used as the binder therein. Preferably, the crosslinked polymer has an anionic group. The anionic group-having crosslinked polymer has a structure in which the backbone chain of the anionic group-having polymer is crosslinked. The anionic group has a function of maintaining the dispersed condition of conductive inorganic particles. The crosslinked structure may impart a film-forming capability to the polymer, therefore having a function of reinforcing the antistatic layer.

Examples of the polymer backbone chain include polyolefins (saturated hydrocarbons), polyethers, polyureas, polyurethanes, polyesters, polyamines, polyamides and melamine resins. Preferred are polyolefin backbone chains, polyether backbone chains and polyurea backbone chains; more preferred are polyolefin backbone chains and polyether backbone chains; and most preferred are polyolefin backbone chains.

The polyolefin backbone chain comprises a saturated hydrocarbon. The polyolefin backbone chain may be formed, for example, through addition polymerization reaction of an unsaturated polymerizing group. The polyether backbone chain comprises repetitive units as bonded to each other via an ether bond (—O—). The polyether backbone chain may be formed, for example, through ring-cleavage polymerization reaction of an epoxy group. The polyurea backbone chain comprises repetitive units as bonded to each other via an urea bond (—NH—CO—NH—). The polyurea backbone chain may be formed, for example, through polycondensation reaction of an isocyanate group and an amino group. The polyurethane backbone chain comprises repetitive units as bonded to each other via an urethane bond (—NH—CO—O—). The polyurethane backbone chain may be formed, for example, through polycondensation reaction of an isocyanate group and a hydroxyl group (including an N-methylol group). The polyester backbone chain comprises repetitive units as bonded to each other via an ester bond (—CO—O—). The polyester backbone chain may be formed, for example, through polycondensation of a carboxyl group (including an acid halide group) and a hydroxyl group (including an N-methylol group). The polyamine backbone chain comprises repetitive units as bonded to each other via an imino bond (—NH—). The polyamine backbone chain may be formed, for example, through ring-cleavage polymerization reaction of an ethyleneimine group. The polyamide backbone chain comprises repetitive units as bonded to each other via an amido bond (—NH—CO—). The polyamide backbone chain may be formed, for example, through reaction of an isocyanate group and a carboxyl group (including an acid halide group). The melamine resin backbone chain may be formed, for example, through polycondensation reaction of a triazine group (e.g., melamine) and an aldehyde (e.g., formaldehyde). The melamine resin has a crosslinked structure in the backbone chain thereof.

The anionic group may be directly bonded to the backbone chain of the polymer, or may be bonded thereto via a linking group. Preferably, the anionic group is bonded to the backbone chain as a side branch of the polymer via a linking group.

Examples of the anionic group are a carboxylic acid group (carboxyl), a sulfonic acid group (sulfo), and a phosphoric acid group (phosphono). Preferred are a sulfonic acid group and a phosphoric acid group.

The anionic group may be in the form of a salt thereof. The cation to form a salt with the anionic group is preferably an alkali metal ion. The proton of the anionic group may be dissociated.

The linking group for linking the anionic group to the polymer backbone chain is preferably a divalent group selected from —CO—, —O—, an alkylene group, an arylene group, and their combination.

The crosslinked structure is generally constructed by chemically bonding two or more backbone chains (preferably in a mode of covalent bonding). Preferably, however, the crosslinked structure in the antistatic layer has three or more backbone chains as bonded to each other in a mode of covalent bonding. Preferably, the crosslinked structure comprises a divalent or more polyvalent group selected from —CO—, —O—, —S—, a nitrogen atom, a phosphorus atom, an aliphatic residue, an aromatic residue and their combination.

The anionic group-having crosslinked polymer is preferably a copolymer having anionic group-having repetitive units and crosslinked structure-having repetitive units. The proportion of the anionic group-having repetitive units in the copolymer is preferably from 2 to 96% by mass, more preferably from 4 to 94% by mass, most preferably from 6 to 92% by mass. The repetitive unit may have two or more anionic groups. The proportion of the crosslinked structure-having repetitive units in the copolymer is preferably from 4 to 98% by mass, more preferably from 6 to 96% by mass, most preferably from 8 to 94% by mass.

The anionic group-having repetitive units of the crosslinked polymer may have both an anionic group and a crosslinked structure. They may contain any other repetitive units (repetitive units having neither an anionic group nor a crosslinked structure).

The other repetitive units are preferably repetitive units having an amino group or a quaternary ammonium group, and repetitive units having a benzene ring. The amino group and the quaternary ammonium group have a function of maintaining the dispersed condition of inorganic particles, like the anionic group. The amino group, the quaternary ammonium group and the benzene ring may exhibit the same effect when they are in the anionic group-having repetitive units or the crosslinked structure-having repetitive units.

In the amino group or quaternary ammonium group-having repetitive units, the amino group or the quaternary ammonium group may be directly bonded to the backbone chain of the polymer, or may be bonded thereto via a linking group. Preferably, the amino group or the quaternary ammonium group is bonded to the backbone chain as a side branch of the polymer via a linking group. The amino group or the quaternary ammonium group is preferably a secondary amino group, a tertiary amino group or a quaternary ammonium group, more preferably a tertiary amino group or a quaternary ammonium group. The group bonding to the nitrogen atom of the secondary amino group, the tertiary amino group or the quaternary ammonium group is preferably an alkyl group, more preferably an alkyl group having from 1 to 12 carbon atoms, even more preferably an alkyl group having from 1 to 6 carbon atoms. The counter ion of the quaternary ammonium group is preferably a halide ion. The linking group of linking the amino group or the quaternary ammonium group to the polymer backbone chain is preferably a divalent group selected from —CO—, —NH—, —O—, an alkylene group, an arylene group and their combination. When the crosslinked anionic group-having polymer contains repetitive units having an amino group or a quaternary ammonium group, then the proportion of the units in the polymer is preferably from 0.06 to 32% by mass, more preferably from 0.08 to 30% by mass, most preferably from 0.1 to 28% by mass.

The binder mentioned above may be combined with a reactive organosilicon compound as in JP-A 2003-39586, such as those mentioned below. The reactive organosilicon compound may be used in a range of from 10 to 100% by weight of the total of the binder and the reactive organosilicon compound. In particular, when an ionizing radiation-curable organosilicon compound of the following (3) is used, then it may form an antistatic layer, serving as a resin component by itself Examples of the reactive organosilicon compound are mentioned below.

(1) Silicon Alkoxide:

This is a compound represented by RmSi(OR')n, in which R and R' each represent an alkyl group having from 1 to 10 carbon atoms, and m and n each indicate an integer, satisfying m+n=4. For example, it includes tetramethoxysilane, tetraethoxysilane, tetra-isopropoxysilane, tetra-n-propoxysilane, tetra-n-butoxysilane, tetra-sec-butoxysilane, tetra-tert-butoxysilane, tetrapentaethoxysilane, tetrapenta-isopropoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, hexyltrimethoxysilane.

(2) Silane Coupling Agent:

For example, this includes γ-(2-aminoethyl)aminopropyltrimethoxysilane, γ-(2-aminoethyl)aminopropylmethyldimethoxysilane, β-(3,4-epoxycyclohexyl)ethyltrimethoxysilane, γ-aminopropyltriethoxysilane, γ-methacryloxypropyltrimethoxysilane, N-β-(N-vinylbenzylaminoethyl)-γ-aminopropyltrimethoxysilane hydrochloride, γ-glycidoxypropyltrimethoxysilane, aminosilane, methyltrimethoxysilane, vinyltriacetoxysilane, γ-mercaptopropyltrimethoxysilane, γ-chloropropyltrimethoxysilane, hexamethyldisilazane, vinyltris(β-methoxyethoxy)silane, octadecyldimethyl[3-(trimethoxysilyl)propyl]ammonium chloride, methyltrichlorosilane, dimethyldichlorosilane.

(3) Ionizing Radiation-Curable Silicon Compound:

This is an organosilicon compound having plural groups capable of crosslinking through exposure to ionizing radiation, for example, having a polymerizing double bond-having group and having a molecular weight of at most 5,000. The reactive organosilicon compound of the type includes a vinyl-semiterminated functional polysilane, a vinyl-fullterminated functional polysilane, a vinyl-semiterminated functional polysiloxane, a vinyl-fullterminated functional polysiloxane, and their reaction products, a vinyl-functional polysilane and a vinyl-functional polysiloxane.

Other examples of the compound are (meth)acryloxysilane compounds such as 3-(meth)acryloxypropyltrimethoxysilane, 2-(meth)acryloxypropylmethyldimethoxysilane.

The antistatic layer may be formed, for example, by applying a coating liquid, which is prepared by dissolving the above-mentioned components in a solvent, onto a support, drying it and optionally exposing it to ionizing radiation or to heat so as to crosslink or polymerizing it.

[Antiglare Hard Coat Layer]

The antiglare hard coat layer comprises a binder for imparting a hard coat property to the film and contains mat particles for imparting an antiglare property thereto, and preferably contains an inorganic filler for increasing the refractivity of the film, for preventing the film from shrinking by crosslinking and for increasing the strength of the film.

(Binder in Antiglare Hard Coat Layer)

The binder in the antiglare hard coat layer is preferably a polymer having a saturated hydrocarbon chain or a polyether chain as the backbone chain thereof, more preferably a polymer having a saturated hydrocarbon chain as the backbone chain thereof. Also preferably, the binder polymer in the antiglare hard coat layer has a reactive crosslinking group.

As the binder polymer having a saturated hydrocarbon chain as the backbone chain thereof, preferred is a polymer of an ethylenic unsaturated monomer (binder precursor). As the binder polymer having a saturated hydrocarbon chain as the backbone chain thereof and having a reactive crosslinking group, preferred is a (co)polymer of a monomer having at least two ethylenic unsaturated groups.

The monomer having at least two ethylenic unsaturated groups include esters of polyalcohols and (meth)acrylic acids (e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,2,3-cyclohexane tetramethacrylate, polyurethane polyacrylate, polyester polyacrylate), vinylbenzenes and their derivatives (e.g., 1,4-divinylbenzene, 2-acryloylethyl 4-vinylbenzoate, 1,4-divinylcyclohexanone), vinylsulfones (e.g., divinylsulfone), acrylamides (e.g., methylenebisacrylamide) and methacrylamides. Two or more such monomers may be combined for use herein.

Polymerization of these ethylenic unsaturated group-having monomers may be attained by irradiating them with ionizing radiation or by heating them in the presence of a photoradical initiator or a thermal radical initiator.

Accordingly, a coating liquid that contains an ethylenic unsaturated group-having monomer, a photoradical initiator or a thermal radical initiator, and mat particles such as inorganic particles is prepared, and the coating liquid is applied onto a transparent support, and then cured through polymerization by ionizing radiation or by heat to thereby form the intended antiglare hard coat layer.

The photoradical polymerization initiator includes acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums. Examples of acetophenones include 2,2-diethoxyacetophenone, p-dimethylacetophenone, 1-hydroxydimethylphenyl ketone, 1-hydroxycyclohexylphenyl ketone, 2-methyl-4-methylthio-2-morpholinopropiophenone, 2-benzyl-2-dimethylamino-1-(4-morpholinophenyl)butanone. Examples of benzoins include benzoin benzenesulfonates, benzoin toluenesulfonates, benzoin methyl ether, benzoin ethyl ether, benzoin isopropyl ether. Examples of benzophenones include benzophenone, 2,4-dichlorobenzophenone, 4,4-dichlorobenzophenone, p-chlorobenzophenone. One example of phosphine oxides is 2,4,6-trimethylbenzoyldiphenylphosphine oxide.

Various examples of the compounds are described in the Newest UV Curing Technology (p. 159, issued by Kazuhiro Takausu, published by Gijutsu Joho Kyokai, 1991), and these are useful in the invention.

Preferred examples of commercially-available, photocleaving photoradical polymerization initiators are Ciba Speciality Chemicals' Irgacure (651, 184, 907).

In addition, two different photopolymerization initiators may be combined for use herein, as in JP-A 6-41468.

Preferably, the photopolymerization initiator is used in an amount of from 0.1 to 15 parts by mass relative to 100 parts by mass of the polyfunctional monomer, more preferably from 1 to 10 parts by mass.

An optical sensitizer may be added to the photopolymerization initiator. Examples of the optical sensitizer are n-butylamine, triethylamine, tri-n-butyl phosphine, Michler's ketone, and thioxanthone.

The thermal radical initiator includes organic or inorganic peroxides, and organic azo and diazo compounds.

Concretely, the organic peroxides include benzoyl peroxide, halogenobenzoyl peroxide, lauroyl peroxide, acetyl peroxide, dibutyl peroxide, cumene hydroperoxide, butyl hydroperoxide; the inorganic peroxides include hydrogen peroxide, ammonium persulfate, potassium persulfate; the azo compounds include 2-azobisisobutyronitrile, 2-azobispropionitrile, 2-azobiscyclohexane-dinitrile; and the diazo compounds include diazoaminobenzene, and p-nitrobenzene-diazonium.

The polymer having a polyether backbone chain is preferably a ring-cleaved polymer of a polyfunctional epoxy compound. Ring-cleavage polymerization of a polyfunctional epoxy compound may be effected through exposure to ionizing radiation or to heat in the presence of an optical acid generator or a thermal acid generator.

Accordingly, a coating liquid comprising a polyfunctional epoxy compound, an optical acid generator or a thermal acid generator, mat particles, and preferably an inorganic filler is prepared, and the coating liquid is applied onto a transparent support, and then polymerized and cured through exposure to ionizing radiation or to heat to form the intended antiglare hard coat layer thereon.

In place of or in addition to the monomer that has two or more ethylenic unsaturated groups, a monomer that has a crosslinking functional group may be used so as to introduce the crosslinking functional group into the polymer, and through the reaction of the crosslinking functional group, a crosslinked structure may be introduced into the binder polymer.

Examples of the crosslinking functional group are an isocyanate group, an epoxy group, an aziridine group, an oxazoline group, an aldehyde group, a carbonyl group, a hydrazine group, a carboxyl group, a methylol group, and an active methylene group. Vinylsulfonic acids, acid anhydrides, cyanoacrylate derivatives, melamines, etherified methylols, esters and urethanes, and metal alkoxides such as tetramethoxysilane may also be used as monomers for introducing a crosslinked structure into the polymer. A functional group that may be crosslinkable as a result of decomposition reaction, such as a blocked isocyanate group may also be used. Accordingly, in the invention, the crosslinking functional group may not be one that is directly reactive, but may be one that becomes reactive as a result of decomposition.

The binder polymer having such a crosslinking functional group may be, after applied onto a support, heated to form the intended crosslinked structure.

For making the film has a higher refractivity, it is desirable that the ethylenic unsaturated monomer structure contains an aromatic ring or at least one atom selected from a halogen atom (except fluorine atom), a sulfur atom, a phosphorus atom and a nitrogen atom.

Examples of the high-refractive monomer are bis(4-methacryloylthiophenyl)sulfide, vinylnaphthalene, vinylphenyl sulfide, 4-methacryloxyphenyl-4'-methoxyphenyl thioether. Two or more these monomers may also be combined for use herein.

The amount of the binder in the antiglare hard coat layer may be from 20 to 95% by mass of the solid content of the coating composition for the layer.

(Mat Particles)

The antiglare hard coat layer contains mat particles that are larger than the filler particles therein and have a mean particle size of from 1 to 10 μm, preferably from 1.5 to 7.0 μm, for example, inorganic compound particles or resin particles, and that are for imparting an antiglare property to the layer.

Preferred examples of the mat particles are inorganic compound particles such as silica particles, $TiO_2$ particles; and resin particles such as acrylic particles, crosslinked acrylic particles, polystyrene particles, crosslinked styrene particles, melamine resin particles, benzoguanamine resin particles. Above all, preferred are crosslinked styrene particles, crosslinked acrylic particles, silica particles.

Regarding their shape, the mat particles usable herein may be spherical or amorphous.

Two or more different types of mat particles having a different particle size may be combined for use herein. The mat particles having a larger particle size may impart an antiglare property to the film; and those having a smaller particle size may impart other optical properties thereto. For example, when an antireflection film is stuck to a high-definition display panel of 133 ppi or more, then the resulting structure is desired to be free from any optical quality failure such as glaring. Glaring is caused by the expansion or reduction of pixels owing to the roughness of the film surface (the roughness contributes to resistance to glaring), thereby losing the brightness uniformity. However, when other mat particles having a smaller particle size than that of the antiglare mat particles and having a different refractivity than that of the binder are combined with the antiglare mat particles in the layer, then the antiglare property of the layer may be greatly improved.

Regarding the particle size distribution thereof, the mat particles are most preferably monodispersed particles. It is desirable that all the constitutive particles may have the same particle size as nearly as possible. For example, when particles having a larger particle size by at least 20% than the mean particle size thereof are referred to as coarse particles, then it is desirable that the proportion of such coarse particles in the mat particles for use in the invention is at most 1% by number of all the mat particles, more preferably at most 0.1%, even more preferably at most 0.01%. The mat particles having such a particle size distribution may be obtained by classifying the particles produced in an ordinary manner; and a mat agent having a more preferred particle size distribution may be obtained by increasing the classification frequency and by enhancing the classification degree.

The mat particles are added to the antiglare hard coat layer in such a manner that their amount in the layer could be preferably from 10 to 2000 mg/m², more preferably from 100 to 1400 mg/m².

The particle size distribution of the mat particles may be determined according to a Coulter counter method in terms of a particle number distribution thereof (Inorganic Filler)

Preferably, the antiglare hard coat layer contains, in addition to the above-mentioned mat particles, an inorganic filler of at least one metal oxide selected from titanium, zirconium, aluminium, indium, zinc, tin and antimony and having a mean particle size of at most 0.2 μm, more preferably at most 0.1 μm, even more preferably at most 0.06 μm in order to increase the refractivity of the layer.

On the contrary, it is desirable that the antiglare hard coat layer containing high-refractive mat particles contains silicon oxide which is for increasing the refractivity difference from the mat particles and for keeping the refractivity of the layer low. The preferred particle size of silicon oxide is the same as that of the inorganic filler mentioned above.

Examples of the inorganic filler usable in the antiglare hard coat layer are $TiO_2$, $ZrO_2$, $Al_2O_3$, $In_2O_3$, $ZnO$, $SnO_2$, $Sb_2O_3$, ITO, $SiO_2$. $TiO_2$ and $ZrO_2$ are especially preferred in view of their ability to increase the refractivity of the layer. Preferably, the inorganic filler is subjected to surface treatment with a silane coupling agent or a titanium coupling agent. For the treatment, preferably used is a surface-treating agent that may give a functional group capable of reacting with a binder species, to the filler surface.

The amount of the inorganic filler to be added to the layer is preferably from 10 to 90% by mass, more preferably from 20 to 80% by mass, even more preferably from 30 to 75% by mass of the total mass of the antiglare hard coat layer.

Since the filler's particle size is sufficiently smaller than the wavelength of light, the filler does not cause light scattering therearound, and the dispersion formed by dispersing the filler in a binder polymer behaves as an optically uniform substance as a whole.

The refractive index of the part except the mat particles of the antiglare hard coat layer is preferably from 1.50 to 2.00, more preferably from 1.50 to 1.80. In order to control the refractivity within the range as above, the type and the blend ratio of the binder and the inorganic filler shall be suitably determined.

Preferably, the thickness of the antiglare hard coat layer is from 1 to 10 μm, more preferably from 1.2 to 8 μm.

[Light-Diffusive Layer]

An object of the light-diffusive layer in the antireflection film is for enlarging the viewing angle (especially the downward viewing angle) of a liquid-crystal display device comprising the film, and for preventing the contrast reduction, the gradation or black-white reversal or the color change even when the viewing angle in the watching direction has changed.

We, the present inventors have confirmed that the scattered light intensity distribution as determined with a goniophotometer may correlate with the viewing angle-improving effect of the film. Specifically, when the light emitted by a backlight is diffused to a higher degree by the light-diffusive film disposed on the surface of the polarizing plate on the viewing side, then the viewing angle characteristics are more bettered. However, if the light is too much diffused, then it may cause some problems in that the backward scattering may increase and the front brightness may decrease, or the scattering may be too great and the image sharpness may be thereby lowered. Accordingly, it is necessary to control the scattered light intensity distribution to fall within a predetermined range. Given that situation, we, the present inventors have further studied and, as a result, have found that, in order to attain the desired visibility characteristic, the scattered light intensity at a light-outgoing angle of 30° in a scattered light profile, which is specifically correlated with the viewing angle-improving effect of displays, is preferably from 0.01% to 0.2%, more preferably from 0.02% to 0.15%, even more preferably from 0.03% to 0.1% relative to the light intensity at a light-outgoing angle of 0°.

The scattered light profile can be formed by analyzing the light-scattering film by the use of an automatically angle-varying photometer, GP-5 Model by Murakami Color Technology Laboratory.

Preferably, the light-diffusive layer comprises a binder of translucent resin, an inorganic filler and at least one type of translucent particles. The binder and the inorganic filler may be the same as those in the above-mentioned antiglare hard coat layer; and the translucent particles may be the same as the above-mentioned mat particles.

Preferably, the translucent particles have a mean particle size of from 0.1 to 5 μm. The translucent particles and the inorganic filler are dispersed in a translucent resin, and the refractivity difference between the translucent particles and the translucent resin is preferably from 0.01 to 0.2.

Preferably, the translucent particles are in the light-diffusive layer in an amount of from 3 to 30% by mass of the total solid content of the layer. The translucent particles that are in the layer in that ratio bring about good viewing angle characteristics.

The amount of the binder of the light-diffusive layer may be from 5 to 80% by mass of the solid content of the coating composition of the layer.

Preferably, the thickness of the light-diffusive layer is from 1 to 10 μm, more preferably from 1.2 to 8 μm.

[Hard Coat Layer]

The hard coat layer is preferably a non-antiglare, or that is, flat hard coat layer for imparting physical strength to the antireflection film. This may be formed on the surface of a transparent support. In particular, it is desirable that the layer is provided between a transparent support and the above-mentioned functional layer (antistatic layer, antiglare hard coat layer, light-diffusive layer).

Preferably, the hard coat layer is formed through crosslinking reaction or polymerization of an ionizing radiation-curable compound. For example, a coating composition containing an ionizing radiation-curable polyfunctional monomer or oligomer is applied onto a transparent support, on which the polyfunctional monomer or oligomer is crosslinked or polymerized to form the intended hard coat layer.

The functional group of the ionizing radiation-curable polyfunctional monomer or oligomer is preferably a photopolymerizable, electron ray-polymerizable or radiation-polymerizable functional group, more preferably a photopolymerizable functional group.

The photopolymerizable functional group may be an unsaturated polymerizable functional group such as a (meth) acryloyl group, a vinyl group, a styryl group, an allyl group. Above all, preferred is a (meth)acryloyl group.

Examples of the photopolymerizable functional group-having photopolymerizable polyfunctional monomer are those mentioned hereinabove for the antiglare hard coat layer; and the monomer is preferably polymerized by the use of a photopolymerization initiator and an optical sensitizer. Preferably, the photopolymerization reaction is effected through exposure of the hard coat layer that has been formed and dried, to UV rays.

The hard coat layer may contain an oligomer and/or a polymer having a weight-average molecular weight of at least 500, added thereto for providing an anti-brittle property.

The oligomer and the polymer include (meth)acrylate-type, cellulosic and styrenic polymers, as well as urethane acrylates and polyester acrylates. Preferred are poly(glycidyl (meth)acrylate) and poly(allyl(meth)acrylate) having a functional group in the side branch thereof The amount of the oligomer and/or the polymer in the hard coat layer is preferably from 5 to 80% by mass of the total mass of the hard coat layer, more preferably from 25 to 70% by mass, even more preferably from 35 to 65% by mass.

The amount of the binder in the hard coat layer is preferably from 30 to 95% by mass of the solid content of the coating composition for the layer.

Preferably, the hard coat layer contains inorganic particles having a mean particle size of at most 200 nm as primary particles thereof. The mean particle size as referred to herein is a mass-average particle size. Inorganic particles having a mean particle size of at most 200 nm as primary particles may be in the hard coat layer not detracting from the transparency of the layer.

The inorganic particles have a function of increasing the hardness of the hard coat layer and a function of preventing the curing shrinkage of the coating layer. In addition, they are added to the layer for the purpose of controlling the refractivity of the hard coat layer.

Examples of the inorganic particles are those mentioned hereinabove for the high-refractive layer, and in addition, particles of silicon dioxide, aluminium oxide, calcium carbonate, barium sulfate, talc, kaolin, calcium sulfate, titanium dioxide, zirconium oxide, tin oxide, ITO, zinc oxide. Preferred are silicon dioxide, titanium dioxide, zirconium oxide, aluminium oxide, tin oxide, ITO, zinc oxide.

Preferably, the mean particle size of the inorganic particles is from 5 to 200 nm as the primary particles thereof, more preferably from 10 to 150 nm, even more preferably from 20 to 100 nm, still more preferably from 20 to 50 nm.

In the hard coat layer, the inorganic particles are preferably dispersed as fine as possible.

The particle size of the inorganic particles in the hard coat layer is preferably from 5 to 300 nm in terms of the mean particle size thereof, more preferably from 10 to 200 nm, even more preferably from 20 to 150 nm, still more preferably from 20 to 80 nm.

Preferably, the content of the inorganic particles in the hard coat layer is from 10 to 90% by mass of the total mass of the hard coat layer, more preferably from 15 to 80% by mass, even more preferably from 15 to 75% by mass.

The thickness of the hard coat layer may be suitably designed depending on the use of the film. Preferably, the thickness of the hard coat layer is from 0.2 to 10 μm, more preferably from 0.5 to 7 μm, even more preferably from 0.7 to 5 μm.

Preferably, the strength of the hard coat layer is at least "H" in terms of the pencil hardness in the pencil hardness test according to JIS K5400, more preferably at least 2H, most preferably at least 3H.

Also preferably, the amount of abrasion of the hard coat layer is as small as possible in the test piece before and after a Taber's test according to JIS K5400.

In forming the hard coat layer through crosslinking reaction or polymerization reaction of an ionizing radiation-curable compound, the oxygen concentration during the crosslinking reaction or polymerization reaction is preferably at most 10% by volume. When the hard coat layer is formed in an atmosphere having an oxygen concentration of at most 10% by volume, then the layer may have good physical strength and good chemical resistance.

Preferably, the layer is formed through crosslinking reaction or polymerization reaction of an ionizing radiation-curable compound in an atmosphere having an oxygen concentration of at most 6% by volume, more preferably at most 4% by volume, even more preferably at most 2% by volume, most preferably at most 1% by volume.

For making the reaction atmosphere have an oxygen concentration of at most 10% by volume, preferably employable is a method of purging air (having a nitrogen concentration of about 79% by volume and an oxygen concentration of about 21% by volume) with any other gas, more preferably with nitrogen (nitrogen purging).

Preferably, the hard coat layer is formed by applying a coating composition for the layer that contains inorganic particles, onto the surface of a transparent support.

[Low-Refractive Layer]

The low-refractive layer is described below.

The low-refractive layer is formed by applying a coating liquid for the layer that contains a binder and inorganic particles, onto the functional layer as above, and curing it thereon.

Preferably, the refractive index of the low-refractive layer of the antireflection film of the invention is from 1.20 to 1.46, more preferably from 1.25 to 1.46, even more preferably from 1.30 to 1.46.

(Inorganic Particles)

Preferably, the low-refractive layer contains hollow-structured inorganic particles for preventing the increase in the refractivity thereof.

As the hollow inorganic particles, preferred is hollow-structured silica. Preferably, the hollow silica particles have a refractive index of from 1.17 to 1.40, more preferably from 1.17 to 1.35, most preferably from 1.17 to 1.30. The refractivity as referred to herein for the particles means the refractivity of the entire particles. In hollow silica particles, therefore, the refractivity of the particles does not mean the refractivity of the silica shell alone. In this case, when the radius of the hollow of the particles is represented by a and the radius of the particle shell is by b, then the porosity x of the particles to be represented by the following numerical formula (III) is preferably from 10 to 60%, more preferably from 20 to 60%, most preferably from 30 to 60%.

$$x=(4\pi a^3/3)/(4\pi b^3/3)\times 100 \quad (III)$$

When the refractivity of the hollow silica particles is further lowered and the porosity thereof is further increased, then the thickness of the shell may be thin and the mechanical strength of the particles may be low. Therefore, from the viewpoint of the scratch resistance of the layer, low-refractive particles having a refractive index of lower than 1.17 are impracticable.

The refractivity of the hollow silica particles is determined with an Abbe's refractometer (by Atago).

A method for producing hollow silica is described, for example, in JP-A 2001-233611, 2002-79616.

The amount of the hollow silica to be in the layer is preferably from 1 mg/m² to 100 mg/m², more preferably from 5 mg/m² to 80 mg/m², even more preferably from 10 mg/m² to 60 mg/m². Containing hollow silica within the range as above, the low-refractive layer may have good scratch resistance, its surface roughness may be reduced, and therefore the appearance of the film including the dark tightness thereof as well as the integrated sphere reflectance of the film may be bettered.

Preferably, the mean particle size of the hollow silica is from 30% to 150%, more preferably from 35% to 80%, even more preferably from 40% to 60% of the thickness of the low-refractive layer. Accordingly, when the thickness of the low-refractive layer is 100 nm, then the particle size of the hollow silica is preferably from 30 nm to 150 nm, more preferably from 35 nm to 80 nm, even more preferably from 40 nm to 60 nm.

Using the silica particles having a particle size that falls within the range as above is favorable in that the refractivity of the layer may be lowered, and the surface roughness of the low-refractive layer may be reduced, and therefore the appearance of the film including the dark tightness thereof as well as the integrated sphere reflectance of the film may be bettered. The silica particles may be crystalline or amorphous, and are preferably monodispersed. Regarding their form, the particles are most preferably spherical, but may be amorphous with no problem.

The mean particle size of the hollow silica may be determined through electronic microscopy.

In the invention, non-porous silica particles may be used by themselves or as combined with the hollow silica. Preferably, the non-porous silica has a particle size of from 30 nm to 150 nm, more preferably from 35 nm to 80 nm, most preferably from 40 nm to 60 nm.

Preferably, at least one type of silica particles having a mean particle size of less than 25% of the thickness of the low-refractive layer (these are referred to as "small-size silica particles") are combined with the silica particles having the above-mentioned particle size (these are referred to as "large-size silica particles").

Since the small-size silica particles may exist in the space between the large-size silica particles, they may serve as a fixer for the large-size silica particles.

The mean particle size of the small-size silica particles is preferably from 1 nm to 20 nm, more preferably from 5 nm to 15 nm, even more preferably from 10 nm to 15 nm. Using the silica particles of the type is preferred in point of the cost of the materials and of the effect of the particles as fixer.

The silica particles may be processed for physical surface treatment such as plasma discharge treatment or corona discharge treatment, or for chemical surface treatment with surfactant or coupling agent, in order to ensure their dispersion stability in dispersions or coating liquids and in order to enhance their affinity and bonding ability to binder components. More preferably, a coupling agent is used for the treatment. The coupling agent is preferably an alkoxymetal compound (e.g., titanium coupling agent, silane coupling agent). Above all, treatment with a silane coupling agent having an acryloyl group or a methacryloyl group is especially effective.

The coupling agent is used for surface treatment as a surface-treating agent for the inorganic filler in the low-refractive layer before a coating liquid for the layer is prepared, but it is preferably added to the coating liquid for the layer as an additive thereto while the coating liquid is prepared, and it is thereby added to the layer.

It is desirable that the silica particles are previously dispersed in a medium before their surface treatment for reducing the load of the surface treatment.

Preferably, the thickness of the low-refractive layer is from 50 to 200 nm, more preferably from 70 to 100 nm. The haze of the low-refractive layer is preferably at most 3%, more preferably at most 2%, most preferably at most 1%. Concretely, the strength of the low-refractive layer is preferably H or more in terms of a pencil hardness under a load of 500 g, more preferably 2H or more, most preferably 3H or more.

For improving the stain resistance of the optical film, it is desirable that the contact angle of the film surface to water is at least 90 degrees, more preferably at least 95 degrees, even more preferably at least 100 degrees.

The binder in the low-refractive layer may be the same as that for the above-mentioned antiglare hard coat layer.

In the invention, a hydrolyzate and a partial condensate of an organosilane compound exist in the functional layer that underlies the low-refractive layer, and it is desirable that the binder in the low-refractive layer has a functional group capable of crosslinking with the polymerizing functional group that the hydrolyzate and the partial condensate of the organosilane compound have. The functional group is, for example, a (meth)acryloyl group in formula (1), or is a hydroxyl group when $R^6$ in formula (1) is an epoxy group.

The low-refractive binder may be a fluoropolymer. Preferably, the fluoropolymer has a dynamic friction factor of from 0.03 to 0.30 and a contact angle to water of from 85 to 120°, and can crosslink when exposed to heat or to ionizing radiation.

The fluoropolymer usable in the low-refractive layer includes hydrolyzed and dehydrated condensates of perfluoroalkyl group-having silane compounds (e.g., (heptadecafluoro-1,1,2,2-tetrahydrodecyl)triethoxysilane), and also fluorocopolymers having, as the constitutive components thereof, fluoromonomer units other constitutive units for imparting crosslinkability thereto.

Examples of the fluoromonomer units are fluoro-olefins (e.g., fluoroethylene, vinylidene fluoride, tetrafluoroethylene, perfluoro-octylethylene, hexafluoropropylene, perfluoro-2,2-dimethyl-1,3-dioxol), partially or completely fluorinated alkyl ester derivatives of (meth)acrylic acid (e.g., Biscoat 6FM (by Osaka Yuki Kagaku), M-2020 (by Daikin)), and completely or partially fluorinated vinyl ethers. Preferred are perfluoro-olefins; and more preferred is hexafluoropropylene from the viewpoint of the refractivity, solubility, transparency and availability thereof.

The constitutive units for imparting crosslinkability to the polymer include constitutive units formed through polymerization of a monomer that intrinsically has a self-crosslinking functional group in the molecule, such as glycidyl (meth) acrylate or glycidyl vinyl ether; and constitutive units formed through polymerization of a monomer having a carboxyl group, a hydroxyl group, an amino group or a sulfo group (e.g., (meth)acrylic acid, methylol (meth)acrylate, hydroxyalkyl (meth)acrylate, allyl acrylate, hydroxyethyl vinyl ether, hydroxybutyl vinyl ether, maleic acid, crotonic acid), followed by introduction thereinto a crosslinking reactive group such as (meth)acryloyl group through polymerization reaction (for example, the group may be introduced according to a method of reacting acrylic acid chloride on a hydroxyl group).

Except the above-mentioned fluoromonomer units and constitutive units for imparting crosslinkability thereto, the copolymer may be further copolymerized with any other monomer not having a fluorine atom to thereby introduce any other polymer units thereinto, from the viewpoint of the solubility of the copolymer in solvent and of the transparency of the film formed. Not specifically defined, the comonomer includes, for example, olefins (e.g., ethylene, propylene, isoprene, vinyl chloride, vinylidene chloride), acrylates (e.g., methyl acrylate, ethyl acrylate, 2-ethylhexyl acrylate), methacrylates (e.g., methyl methacrylate, ethyl methacrylate, butyl methacrylate, ethylene glycol dimethacrylate), styrene derivatives (e.g., styrene, divinylstyrene, vinyltoluene, α-methylstyrene), vinyl ethers (e.g., methyl vinyl ether, ethyl vinyl ether, cyclohexyl vinyl ether), vinyl esters (e.g., vinyl acetate, vinyl propionate, vinyl cinnamate), acrylamides (e.g., N-tert-butylacrylamide, N-cyclohexylacrylamide), methacrylamides, acrylonitrile derivatives.

A curing agent having a polymerizing unsaturated group may be suitably added to the polymer, for example, as in JP-A 10-25388 and 10-147739. It may be desirable to combine the polymer with a compound having a fluorine-containing, polyfunctional polymerizing unsaturated group, as in JP-A 2002-145952. Examples of the compound having a polyfunctional polymerizing unsaturated group may be the same as the polyfunctional monomers described hereinabove for the hard coat layer. These compounds are especially preferably combined with the polymer for use in the invention, since they may exhibit an excellent synergistic effect for improving scratch resistance of the film when a polymerizing unsaturated group-having compound is used for the polymer body.

When the polymer could not have a sufficient curing property by itself, then the necessary curing capability may be imparted thereto by adding a crosslinking compound to the polymer. For example, when a polymer body has a hydroxyl group, then it is desirable to use various amino compounds as a curing agent for it. The amino compound that is used as a crosslinking compound is a compound having either or both of a hydroxyalkylamino group and an alkoxyalkylamino group in an amount of at least two of the groups in total. Concretely, for example, it includes melamine compounds, urea compounds, benzoguanamine compounds, and glycoluryl compounds.

The melamine compounds are generally known as compounds having a skeleton of a triazine ring with a nitrogen atom bonding thereto, concretely including melamine, alkylated melamine, methylolmelamine, alkylated methylmelamine. Preferably, the compounds have either or both of a methylol group and an alkoxylated methyl group in an amount of at least two of the groups in total in one molecule. Concretely, preferred are methylolated melamines to be obtained through reaction of melamine and formaldehyde under a basic condition, alkoxylated methylmelamines, and their derivatives; and more preferred are alkoxylated methylmelamines as they ensure good storage stability and good reactivity of curable resin compositions comprising it. The methylolated melamine and the alkoxylated melamine that are usable herein as a crosslinking compound are not specifically defined. For example, various resinous substances obtainable according to the method described in Plastic Material Lecture [8] Urea/Melamine Resins (by Nikkan Kogyo Shinbun) are employable herein.

The urea compounds include urea, and in addition to it, polymethylolated urea and its derivatives, alkoxylated methylurea, urone ring-having methylolated urone and alkoxylated methylurone. For the urea derivatives and other compounds, also usable are various resinous substances described in the above-mentioned reference.

In the low-refractive layer in the invention, usable is a compound capable of generating a radical or an acid through exposure to ionizing radiation or to heat.

The photoradical initiator and the thermal radical initiator usable for the low-refractive layer may be the same as those described hereinabove for the binder for the antiglare hard coat layer.

(Thermal Acid Generator)

Examples of the thermal acid generator are various aliphatic sulfonic acids and their salts; various aliphatic carboxylic acids and their salts such as citric acid, acetic acid, maleic acid; various aromatic carboxylic acids and their salts such as benzoic acid, phthalic acid; alkylbenzenesulfonic acids and their ammonium salts, amine salts, various metal salts; phosphoric acid, organic acids, phosphates.

Some commercial products are available, such as Catalyst 4040, Catalyst 4050, Catalyst 600, Catalyst 602, Catalyst 500, Catalyst 296-9 (all by Nippon Cytec Industries); Nacure Series 155, 1051, 5076, 4054J, and blocked-type Nacure Series 2500, 5222, X49-110, 3525, 4167 (all by King).

The proportion of the thermal acid generator to be added to the curable resin composition is preferably from 0.01 to 10 parts by mass, more preferably from 0.1 to 5 parts by mass relative to 100 parts by mass of the composition. When the amount of the generator in the curable resin composition falls within the range, then the storage stability of the composition is good and the scratch resistance of the coating film formed of the composition is also good.

(Optical Acid Generator)

The optical acid generator includes, for example, (1) various onium salts such as iodonium salts, sulfonium salts, phosphonium salts, diazonium salts, ammonium salts, pyridinium salts; (2) sulfone compounds such as β-ketoesters, β-sulfonylsulfones and their α-diazo compounds; (3) sulfonates such as alkylsulfonates, haloalkyl sulfonates, arylsulfonates, iminosulfonates; (4) sulfonimide compounds; (5) diazomethane compounds. The proportion of the optical acid generator to be added to the curable resin composition is preferably from 0.01 to 10 parts by mass, more preferably from 0.1 to 5 parts by mass relative to 100 parts by mass of the composition.

Fluoropolymers that are especially useful in the invention are random copolymers of perfluoro-olefins and vinyl ethers or vinyl esters. In particular, it is desirable that they have a group capable of crosslinking by itself (e.g., radical-reactive group such as (meth)acryloyl group; ring-cleaving polymerizing group such as epoxy group, oxetanyl group). Preferably, the crosslinking group-containing polymerization units account for from 5 to 70 mol %, more preferably from 30 to 60 mol % of all the polymerization units of the polymer.

In formula (4), X represents a hydrogen atom or a methyl group. From the viewpoint of the curing reactivity of the polymer, X is preferably a hydrogen atom.

In formula (4), A represents a repetitive unit derived from a vinyl monomer, and, not specifically defined, it may be any constitutive component of a monomer copolymerizable with hexafluoropropylene. From the viewpoint of the adhesiveness of the polymer to substrates, the Tg thereof (this contributes to the film hardness), the solubility thereof in solvent, the transparency thereof, the lubricity thereof, and the dust resistance and the stain resistance thereof, the unit A may be suitably selected. Depending on the object of the polymer, one or more different types of vinyl monomers may form the repetitive unit A.

Preferred examples of the monomer are vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether, allyl vinyl ether; vinyl esters such as vinyl acetate, vinyl propionate, vinyl butyrate; (meth)acrylates such as methyl (meth)acrylate, ethyl (meth)acrylate, hydroxyethyl (meth) acrylate, glycidyl methacrylate, allyl (meth)acrylate, (meth) acryloyloxypropyltrimethoxysilane; styrene derivatives such as styrene, p-hydroxymethylstyrene; unsaturated carboxylic acids and their derivatives such as crotonic acid, maleic acid, itaconic acid. More preferred are vinyl ether derivatives and vinyl ester derivatives; and even more preferred are vinyl ether derivatives.

x, y and z each indicate the mol % of the constitutive components, and satisfy the following: $30 \leq x \leq 60$, $5 \leq y \leq 70$, $0 \leq z \leq 65$. Preferably, $35 \leq x \leq 55$, $30 \leq y \leq 60$, $0 \leq z \leq 20$; more preferably $40 \leq x \leq 55$, $40 \leq y \leq 55$, $0 \leq z \leq 10$. $x+y+z=100$.

A more preferred embodiment of the fluorocopolymer for use in the invention is a polymer of the following formula (5):

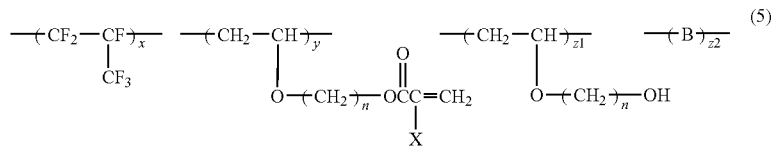

One preferred embodiment of the fluorocopolymer is a polymer of the following formula (4):

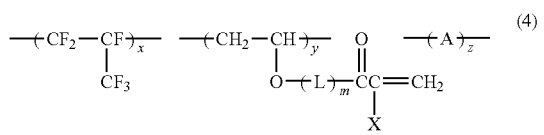

In formula (4), L represents a linking group having from 1 to 10 carbon atoms, preferably from 1 to 6 carbon atoms, more preferably from 2 to 4 carbon atoms, and it may have a linear structure, or a branched structure, or a cyclic structure, and it may contain a hetero atom selected from O, N and S.

Preferred examples of L are *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—O—**, *—CONH—$(CH_2)_3$—O—**, *—$CH_2CH(OH)CH_2$—O—**, *—$CH_2CH_2OCONH(CH_2)_3$—O—** (in which * indicates the linking site on the polymer backbone structure side; and ** indicates the linking site on the (meth)acryloyl group side). m indicates 0 or 1.

In formula (5), X, x and y have the same meanings as in formula (1), and their preferred ranges are also the same as therein.

n indicates an integer of $2 \leq n \leq 10$, preferably $2 \leq n \leq 6$, more preferably $2 \leq n \leq 4$.

B represents a repetitive unit derived from a vinyl monomer, and it may be composed of a single composition or multiple compositions. For its examples, referred to are those mentioned hereinabove for A in formula (4).

z1 and z2 each indicate the mol % of the repetitive units, satisfying the following: $0 \leq z1 \leq 65$ and $0 \leq z2 \leq 65$. Preferably, $0 \leq z1 \leq 30$ and $0 \leq z2 \leq 10$; more preferably $0 \leq z1 \leq 10$ and $0 \leq z2 \leq 5$. $x+y+z1+z2=100$.

The fluorocopolymers of formula (4) or (5) can be produced, for example, by introducing a (meth)acryloyl group into a copolymer that contains a hexafluoropropylene component and a hydroxyalkyl vinyl ether component, according to any of the above-mentioned methods.

Preferred examples of the fluorocopolymers useful in the invention are mentioned below, to which, however, the invention should not be limited.

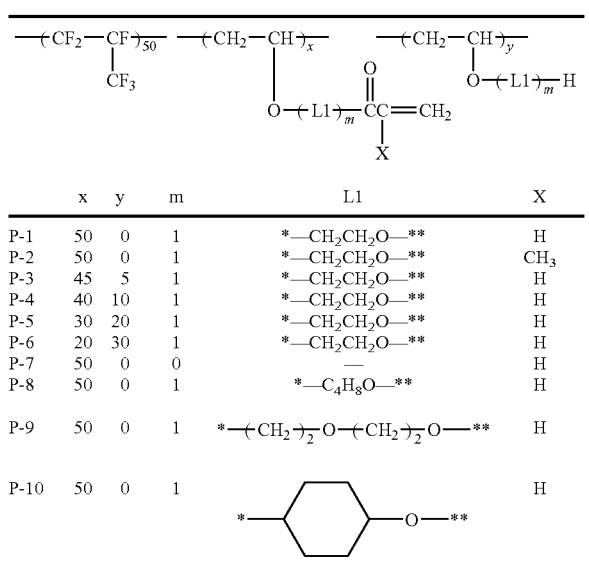

| | x | y | m | L1 | X |
|---|---|---|---|---|---|
| P-1 | 50 | 0 | 1 | *—CH$_2$CH$_2$O—** | H |
| P-2 | 50 | 0 | 1 | *—CH$_2$CH$_2$O—** | CH$_3$ |
| P-3 | 45 | 5 | 1 | *—CH$_2$CH$_2$O—** | H |
| P-4 | 40 | 10 | 1 | *—CH$_2$CH$_2$O—** | H |
| P-5 | 30 | 20 | 1 | *—CH$_2$CH$_2$O—** | H |
| P-6 | 20 | 30 | 1 | *—CH$_2$CH$_2$O—** | H |
| P-7 | 50 | 0 | 0 | — | H |
| P-8 | 50 | 0 | 1 | *—C$_4$H$_8$O—** | H |
| P-9 | 50 | 0 | 1 | *—(CH$_2$)$_2$—O—(CH$_2$)$_2$—O—** | H |
| P-10 | 50 | 0 | 1 | *—⟨cyclohexyl⟩—O—** | H |

*indicates the polymer backbone chain side; and
**indicates the (meth)acryloyl group side.

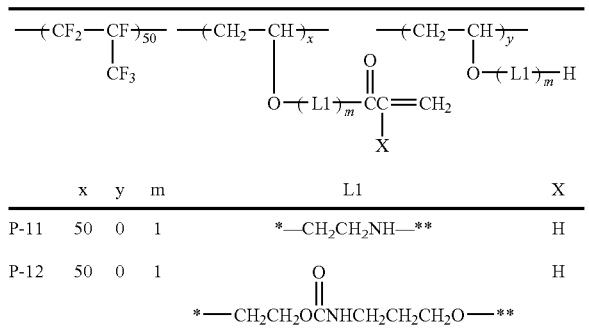

| | x | y | m | L1 | X |
|---|---|---|---|---|---|
| P-11 | 50 | 0 | 1 | *—CH$_2$CH$_2$NH—** | H |
| P-12 | 50 | 0 | 1 | *—CH$_2$CH$_2$OCNHCH$_2$CH$_2$CH$_2$O—** | H |

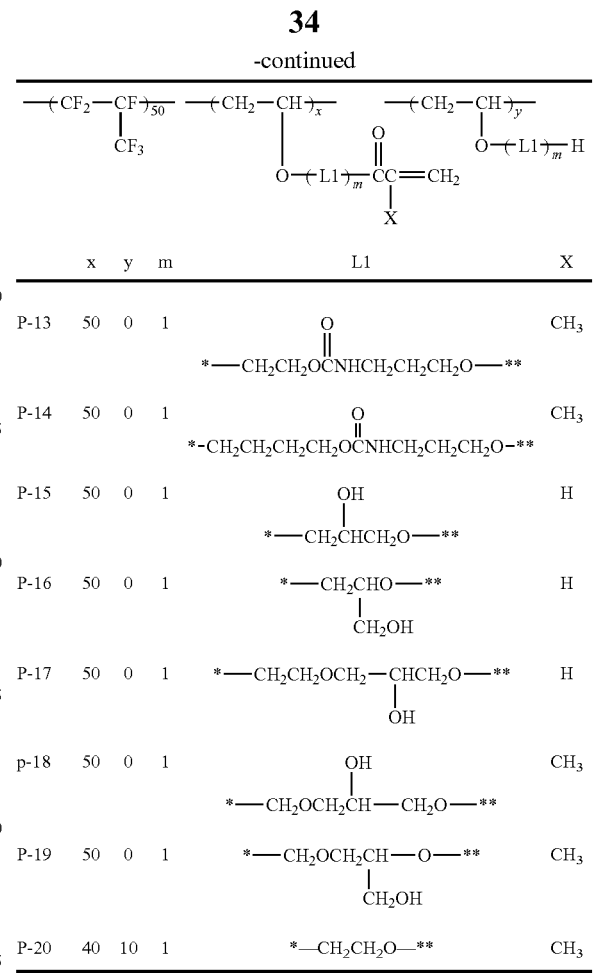

| | x | y | m | L1 | X |
|---|---|---|---|---|---|
| P-13 | 50 | 0 | 1 | *—CH$_2$CH$_2$OCNHCH$_2$CH$_2$CH$_2$O—** | CH$_3$ |
| P-14 | 50 | 0 | 1 | *—CH$_2$CH$_2$CH$_2$CH$_2$OCNHCH$_2$CH$_2$CH$_2$O—** | CH$_3$ |
| P-15 | 50 | 0 | 1 | *—CH$_2$CHCH$_2$O—** (OH) | H |
| P-16 | 50 | 0 | 1 | *—CH$_2$CHO—** (CH$_2$OH) | H |
| P-17 | 50 | 0 | 1 | *—CH$_2$CH$_2$OCH$_2$—CHCH$_2$O—** (OH) | H |
| p-18 | 50 | 0 | 1 | *—CH$_2$OCH$_2$CH—CH$_2$O—** (OH) | CH$_3$ |
| P-19 | 50 | 0 | 1 | *—CH$_2$OCH$_2$CH—O—** (CH$_2$OH) | CH$_3$ |
| P-20 | 40 | 10 | 1 | *—CH$_2$CH$_2$O—** | CH$_3$ |

*indicates the polymer backbone chain side; and
**indicates the (meth)acryloyl group side.

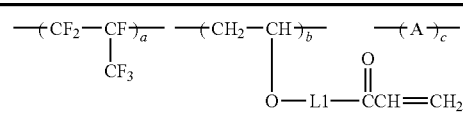

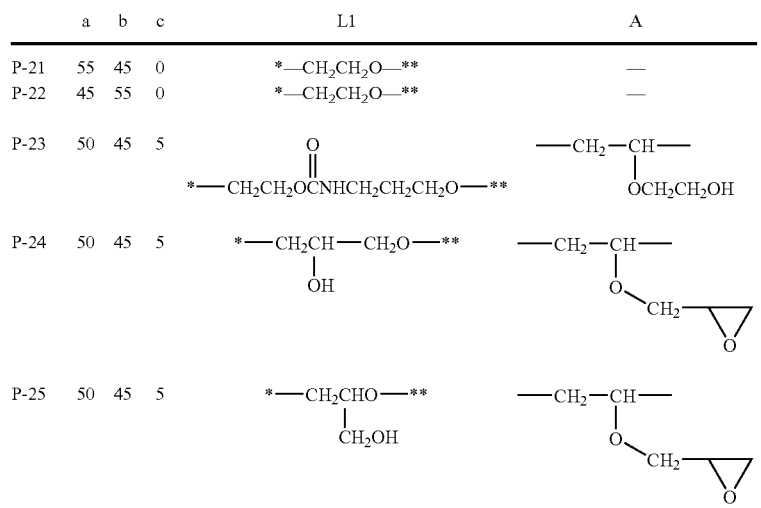

| | a | b | c | L1 | A |
|---|---|---|---|---|---|
| P-21 | 55 | 45 | 0 | *—CH$_2$CH$_2$O—** | — |
| P-22 | 45 | 55 | 0 | *—CH$_2$CH$_2$O—** | — |
| P-23 | 50 | 45 | 5 | *—CH$_2$CH$_2$OCNHCH$_2$CH$_2$CH$_2$O—** | —CH$_2$—CH— (OCH$_2$CH$_2$OH) |
| P-24 | 50 | 45 | 5 | *—CH$_2$CH—CH$_2$O—** (OH) | —CH$_2$—CH— (O—CH$_2$—epoxide) |
| P-25 | 50 | 45 | 5 | *—CH$_2$CHO—** (CH$_2$OH) | —CH$_2$—CH— (O—CH$_2$—epoxide) |

-continued

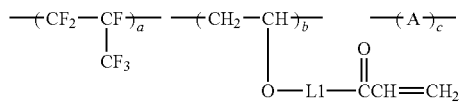

| | a | b | c | L1 | A |
|---|---|---|---|---|---|
| P-26 | 50 | 40 | 10 | *—CH₂CH₂O—** | —CH₂—CH(OCH₂CH₃)— |
| P-27 | 50 | 40 | 10 | *—CH₂CH₂O—** | —CH₂—CH(O-cyclohexyl)— |
| P-28 | 50 | 40 | 10 | *—CH₂CH₂O—** | —CH(CH₃)—CH(COOH)— |

*indicates the polymer backbone chain side; and
**indicates the acryloyl group side.

$$-(CF_2-CF)_x-(CH_2-CH)_y-(CH_2-CH)_{z1}-(B)_{z2}-$$
with CF₃ branch; y-unit has O—(CH₂)ₙOC(=O)C(X)=CH₂; z1-unit has O—(CH₂)ₙ—H

| | x | y | z1 | z2 | n | X | B |
|---|---|---|---|---|---|---|---|
| P-29 | 50 | 40 | 5 | 5 | 2 | H | —CH₂—CH(O—CH₂CH₃)— |
| P-30 | 50 | 35 | 5 | 10 | 2 | H | —CH₂—CH(O—C(CH₃)₃)— |
| P-31 | 40 | 40 | 10 | 10 | 4 | CH₃ | —CH₂—CH(O-cyclohexyl-H)— |

$$-(CF_2-CF)_{50}-(Y)_a-(Z)_b-$$
with CF₃ branch

| | a | b | Y | Z |
|---|---|---|---|---|
| P-32 | 45 | 5 | —CH(CH₃)—CH(CO₂CH₂CHCH₂OC(=O)C(CH₃)=CH₂)— with OH | —CH(CH₃)—CH(COOH)— |
| P-33 | 40 | 10 | —CH₂—CH(CO₂H)—CH—CH(CONHCH₂CH₂OC(=O)CH=CH₂)— | —CH—CH— with O=C—O—C=O (maleic anhydride) |

-continued $$-(CH_2-CH)_x- \quad -(CH_2-CH)_y- \quad -(CH_2-CH)_z-$$
$$\quad\quad | \quad\quad\quad\quad | \quad\quad\quad\quad\quad | $$
$$\quad O=C \quad\quad O=C \quad\quad\quad O=C$$
$$\quad\quad | \quad\quad\quad\quad | \quad\quad\quad\quad\quad | $$
$$\quad O \quad\quad\quad O \quad O \quad\quad\quad\quad O$$
$$\quad\quad \backslash Rf \quad \backslash L-\overset{\|}{C}CH=CH_2 \quad \backslash L-H$$

| | x | y | z | Rf | L |
|---|---|---|---|---|---|
| P-34 | 60 | 40 | 0 | —$CH_2CH_2C_8F_{17}$-n | —$CH_2CH_2O$— |
| P-35 | 60 | 30 | 10 | —$CH_2CH_2C_4F_8$H-n | —$CH_2CH_2O$— |
| P-36 | 40 | 60 | 0 | —$CH_2CH_2C_6F_{12}$H | —$CH_2CH_2CH_2CH_2O$— |

$$-(CH_2-CH)_x- \quad -(CH_2-CH)_y- \quad -(CH_2-CH)_z- \quad\quad O$$
$$\quad\quad | \quad\quad\quad\quad | \quad\quad\quad\quad\quad | \quad\quad\quad\quad \|$$
$$\quad O \quad\quad\quad\quad\quad\quad\quad\quad\quad\quad\quad\quad O-(CH_2)_n-OCCH=CH_2$$
$$\quad\quad \backslash Rf \quad\quad O$$
$$\quad\quad\quad\quad\quad O-(CH_2)_n-O\overset{\|}{C}CH=CH_2$$

| | x | y | z | n | Rf |
|---|---|---|---|---|---|
| P-37 | 50 | 50 | 0 | 2 | —$CH_2C_4F_8$H-n |
| P-38 | 40 | 55 | 5 | 2 | —$CH_2C_4F_8$H-n |
| P-39 | 30 | 70 | 0 | 4 | —$CH_2C_8F_{17}$-n |
| P-40 | 60 | 40 | 0 | 2 | —$CH_2CH_2C_8F_{16}$H-n |

The above-mentioned fluoropolymers may be produced by polymerization to be effected through exposure to ionizing radiation or to heat in the presence of an optical acid generator or a thermal acid generator.

The reactive crosslinking group-having binder in the low-refractive layer is preferably a binder having, as the reactive crosslinking group thereof, any of a (meth)acryloyl group, an epoxy group or an isocyanate group, more preferably a binder having a (meth)acryloyl group as the reactive crosslinking group thereof The copolymer for use in the invention may be produced by preparing a precursor such as a hydroxyl group-containing polymer in various polymerization methods of, for example, solution polymerization, precipitation polymerization, suspension polymerization, bulk polymerization or emulsion polymerization, and then introducing a (meth)acryloyl group into it according to the above-mentioned polymer reaction. The methods may be carried out in any known mode of batch, semi-continuous or continuous polymerization.

To start the polymerization, employable is a method of using a radical initiator, or a method of exposing the system to light or radiation. The polymerization methods and the polymerization initiation methods are described, for example, in Teiji Tsuruta, *Methods of Polymer Synthesis*, revised edition (published by Nikkan Kogyo Shinbun, 1971); Takayuki Ohtsu & Masaetsu Kinoshita, *Experimental Methods of Polymer Synthesis* (published by Kagaku Dojin, 1972, pp. 124-154).

Of the above-mentioned polymerization methods, especially preferred is a solution polymerization method that uses a radical initiator. The solvent usable in the solution polymerization method includes, for example, ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, 1-butanol. One or more such various organic solvents may be used either singly or as combined, or a mixed solvent thereof with water may also be used.

The polymerization temperature must be set in relation to the molecular weight of the polymer to be produced and to the type of the initiator used. It may be from 0° C. or lower to 100° C. or higher, but is preferably from 50 to 100° C.

The reaction pressure may be determined suitably, but generally falls between 1 and 100 kg/cm$^2$, preferably between 1 and 30 kg/cm$^2$. The reaction time may fall between 5 and 30 hours or so.

The reprecipitation solvent for the polymer produced is preferably isopropanol, hexane or methanol.

The mass-average molecular weight of the polymer preferred for use in the invention may be at least 5,000, preferably from 10,000 to 500,000, most preferably from 15,000 to 200,000. Using polymers having a different molecular weight, as combined, is effective for improving the coating film surface condition and for improving the scratch resistance of the film.

The low-refractive layer-forming composition may have a liquid form, and it may be produced by using the above-mentioned binder and inorganic particles as the indispensable constitutive components thereof and optionally dissolving various additives and a radical polymerization initiator in a suitable solvent.

The low-refractive layer-forming composition is applied onto the functional group, drying it and crosslinking or polymerizing it through exposure to ionizing radiation or to heat to thereby form the intended low-refractive layer.

From the viewpoint of the film hardness of the low-refractive layer, it is not advantageous to add a curing agent or the like additive to the layer. However, from the viewpoint of the interfacial adhesiveness thereof to the high-refractive layer adjacent thereto, a small amount of a curing agent may be added to the low-refractive layer. The curing agent includes, for example, polyfunctional (meth)acrylate compounds, polyfunctional epoxy compounds, polyisocyanate compounds, aminoplasts, polybasic acids and their anhydrides. When the curing agent is added, its amount is preferably from 0 to 30% by mass, more preferably from 0 to 20% by mass, even more preferably from 0 to 10% by mass of the total solid content of the low-refractive layer film.

For making the layer have stain resistance, waterproofness, chemical resistance and lubricity, any known silicone-type or fluorine-containing stain-resistant agent or lubricant may be suitably added to the layer. When the additive is added to the low-refractive layer, its amount is preferably from 0.01 to 20% by mass, more preferably from 0.05 to 10% by mass, even more preferably from 0.1 to 5% by mass of the total solid content of the layer.

Preferred examples of the silicone compound are those having a substituent at terminals and/or in side branches of a compound chain that contains multiple dimethylsilyloxy units as repetitive units. The compound chain containing repetitive dimethylsilyloxy units may contain any other constitutive units than dimethylsilyloxy units. Preferably, the compound contains multiple substituents that may be the same or different. Examples of preferred substituents are those containing any of an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group, and amino group. Though not specifically defined, the molecular weight of the compound is preferably at most 100,000, more preferably at most 50,000, even more preferably from 3000 to 30,000, most preferably from 10,000 to 20,000. Also not specifically defined, the silicone atom content of the silicone compound is preferably at least 18.0% by mass, more preferably from 25.0 to 37.8% by mass, most preferably from 30.0 to 37.0% by mass. Examples of the preferred silicone compounds are Shin-etsu Chemical's X-22-174DX, X-22-2426, X-22-164B, X-22-164C, X-22-170DX X-22-176D, X-22-1821 (all trade names), Chisso's FM-0725, FM-7725, FM-4411, FM-5521, FM-6621, FM-1121, and Gelest's DMS-U22, RMS-033, RMS-083, UMS-182, DMS-H21, DMS-H31, HMS-301, FMS121, FMS123, FMS131, FMS141, FMS221 (all trade names), to which, however, the invention should not be limited.

The fluorine-containing compound is preferably a fluoroalkyl group-having compound. Preferably, the fluoroalkyl group has from 1 to 20 carbon atoms, more preferably from 1 to 10 carbon atoms, and it may have a linear structure (e.g., $-CF_2CF_3$, $CH_2(CF_2)_4H$, $-CH_2(CF_2)_8CF_3$, $-CH_2CH_2(CF_2)_4$), or a branched structure (e.g., $-CH(CF_3)_2$, $-CH_2CF(CF_3)_2$, $-CH(CH_3)CF_2CF_3$, $-CH(CH_3)(CF_2)_5CF_2H$), or an alicyclic structure (preferably 5-membered or 6-membered, e.g., a perfluorocyclohexyl group, a perflurocyclopentyl group, or an alkyl group substituted with any of these); or it may have an ether bond (e.g., $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$). One molecule of the compound may have multiple fluoroalkyl groups.

Preferably, the fluorine-containing compound contains a substituent that contributes to the formation of a bond to the low-refractive layer film or to the compatibility with the film. Also preferably, the compound has multiple substituents of the type, which may be the same or different. Examples of the preferred substituent are an acryloyl group, a methacryloyl group, a vinyl group, an aryl group, a cinnamoyl group, an epoxy group, an oxetanyl group, a hydroxyl group, a polyoxyalkylene group, a carboxyl group, and an amino group. The fluorine-containing compound may be a copolymer or a co-oligomer with a compound not containing a fluorine atom, and its molecular weight is not specifically defined. Also not specifically defined, the fluorine atom content of the fluorine-containing compound is preferably at least 20% by mass, more preferably from 30 to 70% by mass, most preferably from 40 to 70% by mass. Examples of the preferred fluorine-containing compounds are Daikin Chemical Industry's R-2020, M-2020, R-3833, M-3833 (all trade names), Dai-Nippon Ink's Megafac F-171, F-172, F-179A, Diffenser MCF-300 (all trade names), to which, however, the invention should not be limited.

Preferably, the fluoropolymer for use in the invention has a polysiloxane structure introduced thereinto for the purpose of making the polymer have stain resistance. The method of introducing a polysiloxane structure into the polymer is not specifically defined. For it, for example, preferably employed herein are a method of introducing a polysiloxane block copolymerization component into the polymer by the use of a silicone-macroazo initiator as in JP-A 6-93100, 11-189621, 11-228631, 2000-313709; and a method of introducing a polysiloxane graft copolymerization component thereinto by the use of a silicone macromer as in JP-A 2-251555, 2-308806. Especially preferred compounds are the polymer in Example 1 in JP-189621, polymers modified from it in some degree in point of its composition, JSR's JN-7228A and JTA-113, the polymers in Examples 2 and 3; and copolymers A-2 and A-3 in JP-A 2-251555. Preferably, the polysiloxane component accounts for from 0.5 to 10% by mass, more preferably from 1 to 5% by mass of the polymer.

For making the layer have dust-resistant and antistatic properties, a dust-resistant or antistatic agent such as known cationic surfactants or polyoxyalkylene compounds may also be added to the layer. The dust-resistant agent and the antistatic agent may be a part of the function of the constitutive units of the above-mentioned silicone compounds and fluorine-containing compounds. When these are added to the layer as additives thereto, their amount is preferably from 0.01 to 20% by mass, more preferably from 0.05 to 10% by mass, even more preferably from 0.1 to 5% by mass of the total solid content of the low-refractive layer. Examples of preferred compounds for the agents are Dai-Nippon Ink's Megafac F-150 (trade name) and Toray-Dow Corning's SH-3748 (trade name), but these are not limitative.

Hereinunder described is the solvent to be used in coating liquids for the functional layers (e.g., antiglare hard coat layer, light-diffusive layer, high-refractive layer, hard coat layer) and the low-refractive layer in the antireflection film of the invention.

For the coating solvent, for example, usable is a solvent having a boiling point of not higher than 100° C. It includes, hydrocarbons such as hexane (boiling point 68.7° C.), heptane (98.4° C.), cyclohexane (80.7° C.), benzene (80.1° C.); halogenohydrocarbons such as dichloromethane (39.8° C.), chloroform (61.2° C.), carbon tetrachloride (76.8° C.), 1,2-dichloroethane (83.5° C.), trichloroethylene (87.2° C.); ethers such as diethyl ether (34.6° C.), diisopropyl ether (68.5° C.), dipropyl ether (90.5° C.), tetrahydrofuran (66° C.); esters such as ethyl formate (54.2° C.), methyl acetate (57.8° C.), ethyl acetate (77.1° C.), isopropyl acetate (89° C.); ketones such as acetone (56.1° C.), 2-butanone (=methyl ethyl ketone, 79.6° C.); alcohols such as methanol (64.5° C.), ethanol (78.3° C.), 2-propanol (82.4° C.), 1-propanol (97.8° C.); cyano compounds such as acetonitrile (81.6° C.), propionitrile (97.4° C.); and carbon disulfide (46.2° C.).

Also usable is a solvent having a boiling point of 100° C. or higher. It includes, for example, octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (=MIBK, 115.9° C.), 1-butanol (117.7° C.), N,N-methylformamide (153° C.), N,N-dimethylacetamide (166° C.), dimethyl sulfoxide (189° C.). Preferred are toluene, cyclohexanone, 2-methyl-4-pentanone.

Of those, preferred are ketones, aromatic hydrocarbons and esters; more preferred are ketones. Of the ketones, especially preferred is 2-butanone.

When a ketone solvent is used, it may be a single ketone or a mixed solvent with any other. When the mixed solvent is used, then the proportion of the ketone solvent is preferably at least 10% by mass of all the solvents in the coating composition, more preferably at least 30% by mass, even more preferably at least 60% by mass.

In the antireflection film of the invention, the coating liquids for the functional layer and the low-refractive layer may be prepared by diluting the constitutive components of the layer with the solvent having the above-mentioned composition. Preferably, the concentration of the coating liquid is suitably controlled in consideration of the viscosity of the liquid and of the specific gravity of the layer material. Preferably, it is from 0.1 to 80% by mass, more preferably from 1 to 60% by mass.

The solvents for the functional layers and the low-refractive layer may have the same composition or may have a different composition.

In the invention, a dispersion stabilizer is preferably used in the layer-forming coating liquid for preventing the inorganic particles and the inorganic filler from aggregating and depositing therein. For the dispersion stabilizer, usable are polyvinyl alcohol, polyvinyl pyrrolidone, cellulose derivatives, polyamides, phosphates, polyethers, surfactants, silane coupling agents, titanium coupling agents. In particular, the above-mentioned silane coupling agents are preferred as effective for enhancing the strength of the cured films.

[Transparent Support]

For the transparent support of the antireflection film of the invention, preferred is a plastic film. The polymer to form the plastic film includes cellulose acylates (e.g., triacetyl cellulose, diacetyl cellulose, typically Fiji Photo Film's TAC-TD80U, TD80UF), polyamides, polycarbonates, polyesters (e.g., polyethylene terephthalate, polyethylene naphthalate), polystyrenes, polyolefins, norbornene resins (Arton: trade name by JSR), amorphous polyolefins (Zeonex: trade name by Nippon Zeon). Of those, preferred are triacetyl cellulose, polyethylene terephthalate, polyethylene naphthalate; and more preferred is triacetyl cellulose.

Single-layered or multi-layered cellulose acylate films may be used herein. The single-layered cellulose acylate film may be produced according to a drum-casting or band-casting process as in JP-A 7-11055. The latter multi-layered cellulose acylate film may be produced according to a co-casting process as in JP-A 61-94725 and JP-B 62-43846. Briefly, starting flakes are dissolved in a solvent of halogenohydrocarbons (e.g., dichloromethane), alcohols (e.g., methanol, ethanol, butanol), esters (e.g., methyl formate, methyl acetate), ethers (e.g., dioxane, dioxolane, diethyl ether), and various additives of plasticizer, UV absorbent, antioxidant, lubricant and peeling promoter are optionally added thereto to prepare a solution (dope). The dope is cast onto a support of a horizontal endless metal belt or a rotary drum, through a dope supply unit (die). In this stage, a single dope is cast onto it to form a single-layered film; or a high-concentration cellulose ester dope is co-cast along with low-concentration dopes on both sides thereof, onto the support to form a multi-layered film thereon. Then, after the film has been dried in some degree on the support and has become tough, it is peeled away from the support, and then led through a drying zone by the use of a conveyor system so that the solvent is evaporated away from it.

Dichloromethane is one typical example of the solvent to dissolve triacetyl cellulose in the manner as above. However, from the viewpoint of the global environment protection and the working environment safety, it is desirable that the solvent does not substantially contain a halogenohydrocarbon such as dichloromethane. The wording "does not substantially contain" means that the proportion of the halogenohydrocarbon in the organic solvent is less than 5% by mass (preferably less than 2% by mass).

When a dope of triacetyl cellulose is prepared by the use of a solvent not substantially containing dichloromethane, then a specific dissolution method mentioned below is indispensable.

A first dissolution method is referred to as a cooling dissolution method, and this is described. With stirring, triacetyl cellulose is gradually added to a solvent at around room temperature (−10 to 40° C.). Next, the mixture is cooled to a temperature falling between −100 and −10° C. (preferably between −80 and −10° C., more preferably between −50 and −20° C., most preferably between −50 and −30° C.). The cooling may be attained, for example, in a dry ice/methanol bath (−75° C.) or in a cooled diethylene glycol solution (−30 to −20° C.). Thus cooled, the triacetyl cellulose/solvent mixture is solidified. Then, this is heated at a temperature falling between 0 and 200° C. (preferably between 0 and 150° C., more preferably between 0 and 120° C., most preferably between 0 and 50° C.), whereupon this becomes a solution of triacetyl cellulose fluid in the solvent. The heating may be attained by keeping the mixture at room temperature or by heating it in a hot bath.

A second method is referred to as a high-temperature dissolution method, and this is described. With stirring, triacetyl cellulose is gradually added to a solvent at around room temperature (−10 to 40° C.). Preferably, the triacetyl cellulose solution is prepared by adding triacetyl cellulose to a mixed solvent of different solvents and is previously swollen. In this method, the solution concentration of triacetyl cellulose is preferably at most 30% by mass, but is more preferably as high as possible from the viewpoint of the drying efficiency in film formation. Next, the organic solvent mixture is heated at 70 to 240° C. under a pressure of from 0.2 MPa to 30 MPa (preferably at 80 to 220° C., more preferably at 100 to 200° C., most preferably at 100 to 190° C.). Next, since the hot solution could not be applied to a substrate directly as it is, it must be cooled to a temperature not higher than the lowermost boiling point of the solvent used. In general, it is cooled to a temperature falling between −10 and 50° C. and its pressure is restored to an ordinary pressure. The cooling may be attained merely by keeping the high-pressure high-temperature container or the line that contains the triacetyl cellulose solution therein at room temperature, but preferably, the device may be cooled with a coolant such as cold water. Cellulose acetate films not substantially containing a halogenohydrocarbon such as dichloromethane, and their production methods are described in Hatsumei Kyokai's Disclosure Bulletin No. 2001-1745 (issued Mar. 15, 2001).

When the antireflection film of the invention is used in a liquid-crystal display device, then it is disposed as the outermost surface of the display panel by providing an adhesive layer on one surface of the film. The antireflection film of the invention may be combined with a polarizing plate. When the transparent support is formed of triacetyl cellulose, then the triacetyl cellulose may serve as a protective film for protecting the polarizing film of a polarizing plate, and therefore, it is desirable that the antireflection film of the invention is directly used as a protective film from the viewpoint of the production cost.

When the antireflection film of the invention is disposed as the outermost surface of a display panel by providing an adhesive layer on one side thereof, or when it is used as a protective film for a polarizing plate directly as it is, then it is desirable that, after an outermost layer is formed on the transparent support, it is subjected to saponification treatment for ensuring sufficient adhesiveness of the film. The saponification may be attained in any known method, for example, by dipping the film in an alkali solution for a suitable period of time. After dipped in an alkali solution, it is desirable that the film is well rinsed with water so that the alkali component does not remain in the film, or the film is dipped in a dilute acid so as to neutralize the alkali component.

Through the saponification treatment, the surface of the transparent support on the side opposite to the other side having the outermost layer is hydrophilicated.

The hydrophilicated surface is especially effective for improving the adhesiveness thereof to a polarizing film that principally comprises polyvinyl alcohol. In addition, since dust in air hardly adheres to the hydrophilicated surface, little dust may penetrate into the space between a polarizing film and the antireflection film while the two are stuck together, and therefore the hydrophilicated surface is effective for preventing spot defects caused by air dust.

Preferably, the saponification treatment is so effected that the contact angle to water of the surface of the transparent support opposite to the other surface thereof having an outermost layer is at most 40°, more preferably at most 30°, even more preferably at most 20°.

Concretely, for the alkali saponification treatment, any method may be selected from the following two methods (1) and (2). The method (1) is advantageous in that it may be attained in one and the same process for ordinary triacetyl cellulose films. However, the method (1) has some problems in that the antireflection film surface is also saponified and therefore the surface is alkali-hydrolyzed and the film is thereby deteriorated, and that, when the saponification treatment liquid remains on the treated film, then it may form stains thereon. To such cases, the method (2) is favorable, though it comprises a specific step.

(1) After an antireflection layer is formed on a transparent support, this is dipped at least once in an alkali solution, whereby the back of the film is saponified.

(2) Before or after an antireflection layer is formed on a transparent support, an alkali solution is applied onto the surface of the antireflection film opposite to the other surface thereof to be coated with the antireflection layer, and then this is heated, rinsed with water and/or neutralized, whereby only the back of the film is saponified.

[Coating Method]

The antireflection film of the invention may be produced according to the method mentioned below, to which, however, the invention should not be limited.

Coating liquids containing the constitutive components for the coating layers are prepared. The coating liquid for a functional layer is applied onto a transparent support according to a dipping method, an air knife-coating method, a curtain-coating method, a roller-coating method, a wire bar-coating method, a gravure-coating method or a die-coating method, and then heated and dried. For this, preferred is a microgravure-coating method, a wire bar-coating method or a die-coating method; and more preferred is a die-coating method.

Most preferably, the coating is attained by the use of a die specifically designed in the manner mentioned below.

Next, this is exposed to light or heated, and the monomer to form the functional layer is thereby polymerized and cured. Accordingly, the intended functional layer is formed. If desired, plural functional layers may be formed.

Next, a coating liquid for low-refractive layer is applied onto the functional layer in the same manner as above, and this is exposed to light or heated and the intended low-refractive layer is thereby formed. According to the method, the antireflection film of the invention may be fabricated.

[Constitution of Die Coater]

Figure 2:
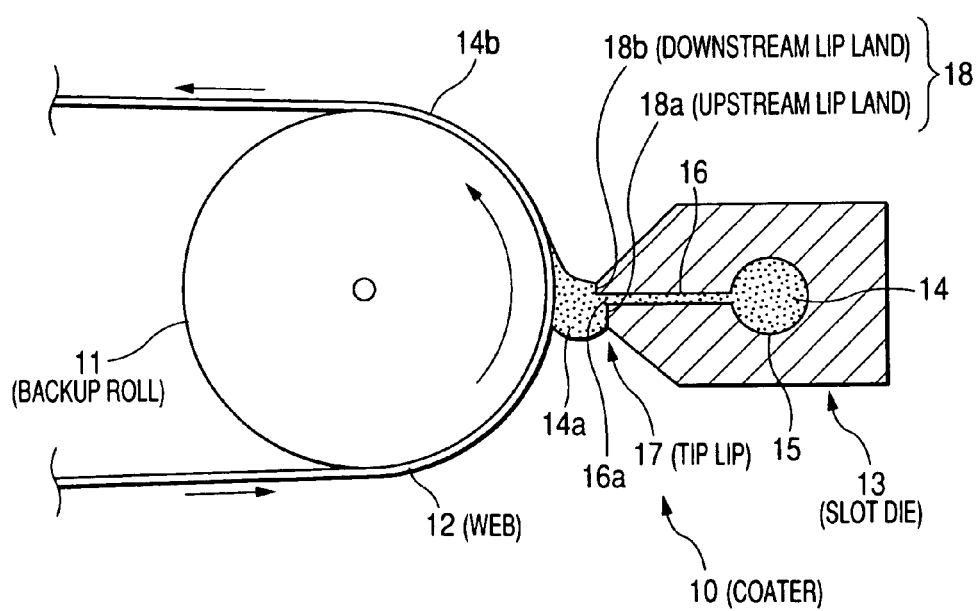
FIG. 2 is a cross-sectional view of a slot die coater used in carrying out the invention.

FIG. 2 is a cross-sectional view of a coater with a slot die, which is used in carrying out the invention. The coater 10 jets out a coating liquid 14 as a bead 14a, through the slot die 13 onto the web 12 continuously running as supported by a backup roll 11, whereby a coating film 14b is formed on the web 12.

A pocket 15 and a slot 16 are formed inside the slot die 13. The cross section of the pocket 15 is formed of a curve and a line. For example, as in FIG. 2, it may be nearly circular or semicircular. The pocket 15 is a space for holding a coating liquid therein, and is so designed that its cross section is expanded in the cross direction of the slot die 13, and, in general, its effective extension length is equal to or somewhat larger than the coating width.

The supply of the coating liquid 14 to the pocket 15 is effected from the side face of the slot die 13 or from the face center on the side opposite to the side of the slot opening 16a. A stopper is provided to the pocket 15 so as to prevent the coating liquid 14 from leaking out.

The slot 16 is a passage for the coating liquid 14 from the pocket 15 to the web 12, and like the pocket 15, it has a cross-section profile in the cross direction of the slot die 13. The opening 16a positioned on the web side is generally so controlled that its width may be nearly the same as the coating width, by the use of a width control plate (not shown). At the slot tip, the angle between the slot 16 and the tangential line in the web-running direction of the backup roll 11 is preferably from 30° to 90°.

The tip lip 17 of the slot die 13 at which the opening 16a of the slot 16 is positioned is tapered, and the tapered tip is leveled to be a land 18. Of the land 18, the upstream in the running direction of the web 12 relative to the slot 16 is referred to as an upstream lip land 18a, and the downstream is as a downstream lip land 18b.

Figure 3A:
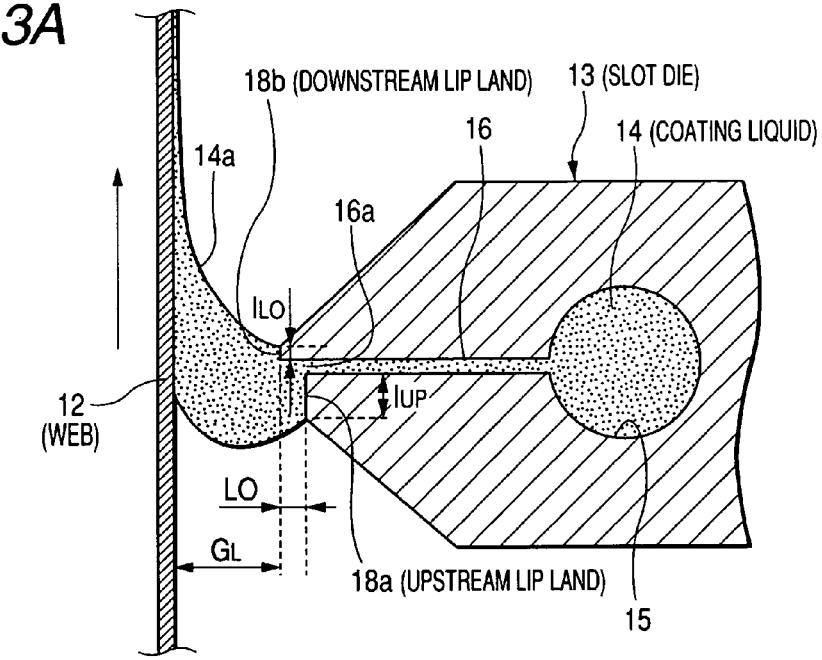
FIG. 3A is a cross-sectional view of a slot die used in carrying out the invention.
Figure 3B:
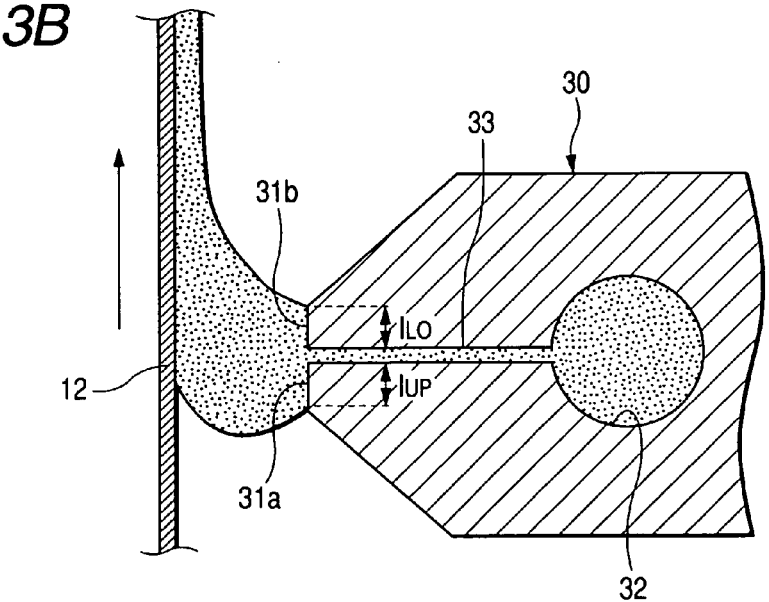
FIG. 3B is a cross-sectional view of an ordinary slot die.

FIGS. 3A and 3B shows the cross-sectional profile of the slit die 13, as compared with that of an ordinary one. FIG. 3A shows the slit die 13; and FIG. 3B shows an ordinary slot die 30. In the ordinary slot die 30, the distance between the web 12 and the upstream lip land 31a is the same as that between the web 12 and the downstream lip land 31b. In FIG. 3B, the reference numeral 32 indicates a pocket and 33 indicates a slot. As opposed to this, in the slot die 13, the downstream lip land length $I_{LO}$ is short, and accordingly, it enables accurate coating to form a wet film thickness of 20 μm or less.

Though not specifically defined, the land length $I_{UP}$ of the upstream lip land 18a is preferably from 100 μm to 1 mm. The land length $I_{LO}$ of the downstream lip land 18b may be from 30 μm to 100 μm, preferably from 30 μm to 80 μm, more preferably from 30 μm to 60 μm.

In case where the downstream lip land length $I_{LO}$ is shorter than 30 μm, then the edge or the land of the tip lip 17 may be readily chipped and the coating film may have streaks, and at last the coating may be impossible. If so, in addition, there may occur other problems in that the wet line position on the downstream side may be difficult to set and the coating liquid may often spread broadly on the downstream side. The wetting expansion of the coating liquid on the downstream side means unevenness of the wetting line, and it has heretofore been known that this may cause a problem of defect formation such as formation of streaks on the coated surface.

On the other hand, if the downstream lip land length $I_{LO}$ is longer than 100 μm, then it is impossible to form beads themselves and, as a result, it is impossible to form a thin layer.

The downstream lip land 18b has an overbite shape that is nearer to the web 12 than the upstream lip land 18a, and therefore the degree of reduced pressure around the lip may be further reduced and it is possible to form beads suitable for thin-film formation. The difference between the distance from the downstream lip land 18b to the web 12 and the distance from the upstream lip land 18a to the web 12 (this is hereinafter referred to as "overbite length LO") is preferably from 30 μm to 120 μm, more preferably from 30 μm to 100 μm, most preferably from 30 μm to 80 μm.

When the slot die 13 has such an overbite shape, then the gap $G_L$ between the tip lip 17 and the web 12 is the gap between the downstream lip land 18b and the web 12.

Figure 4:
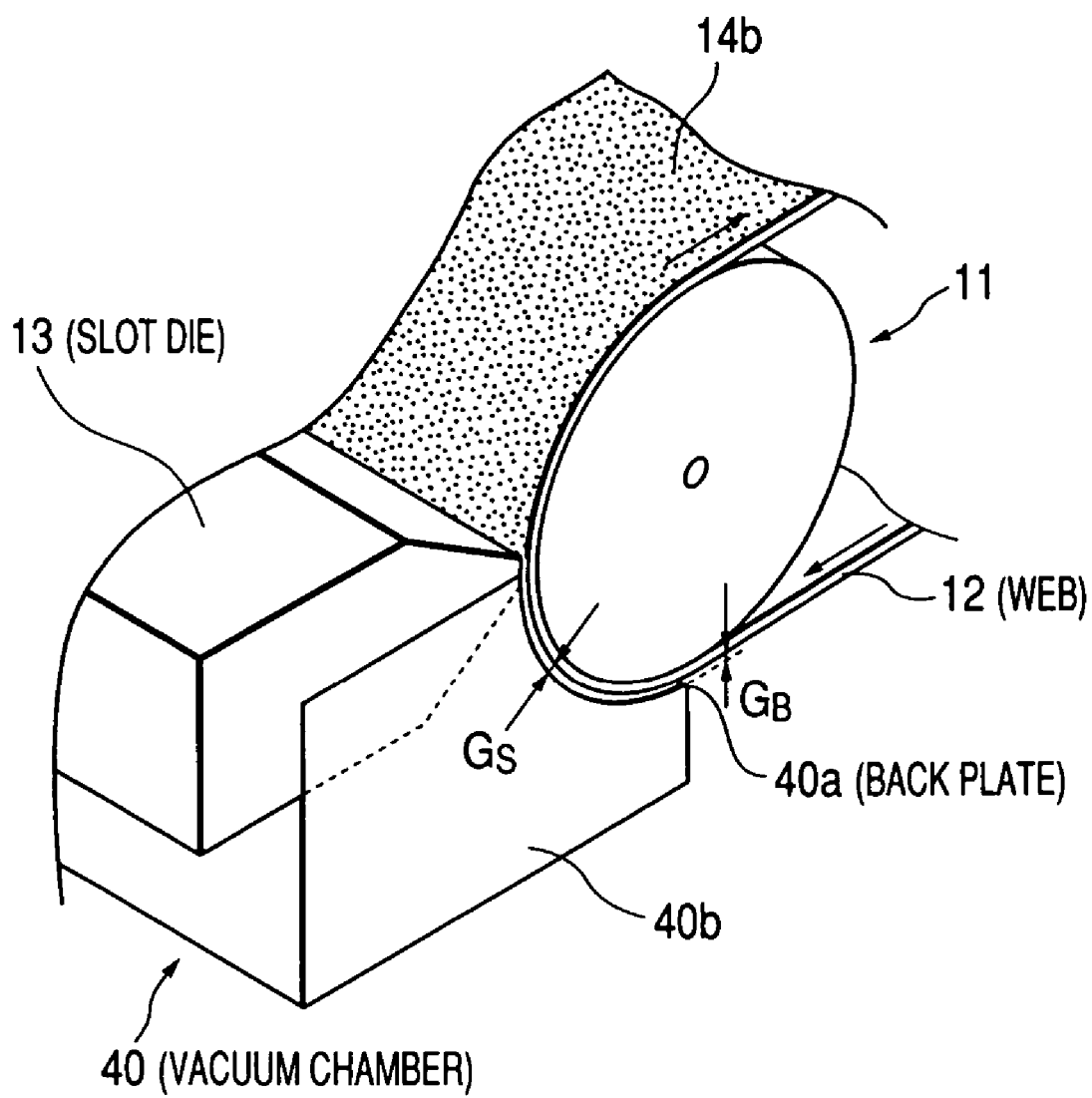
FIG. 4 is a perspective view showing a slot die and its peripheral devices used in carrying out the invention.

FIG. 4 is a perspective view showing the slot die and around it, used in the coating process in carrying out the invention. On the side opposite to the running direction side of the web 12, disposed is a vacuum chamber 40 at the non-contact position in order that sufficient pressure reduction control may be attained for the bead 14a. The vacuum chamber 40 comprises a back plate 40a and a side plate 40b for keeping its operation efficiency, and there exist gaps $G_B$ and $G_S$ between the back plate 40a and the web 12 and between the side plate 40b and the web 12, respectively.

Figure 5:
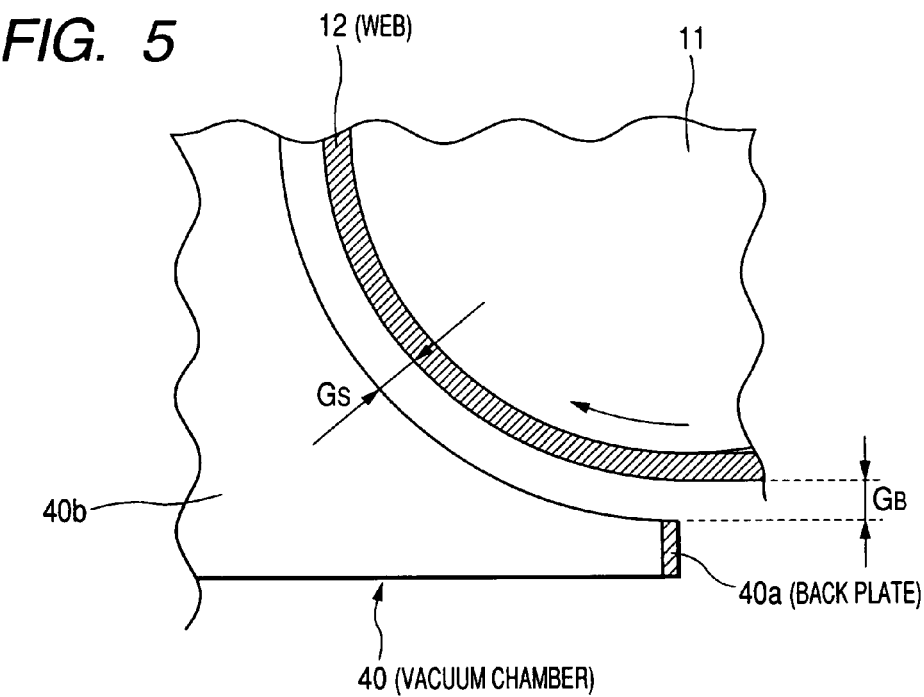
FIG. 5 is a cross-sectional view of a web and a vacuum chamber in a coating device used in carrying out the invention.
Figure 6:
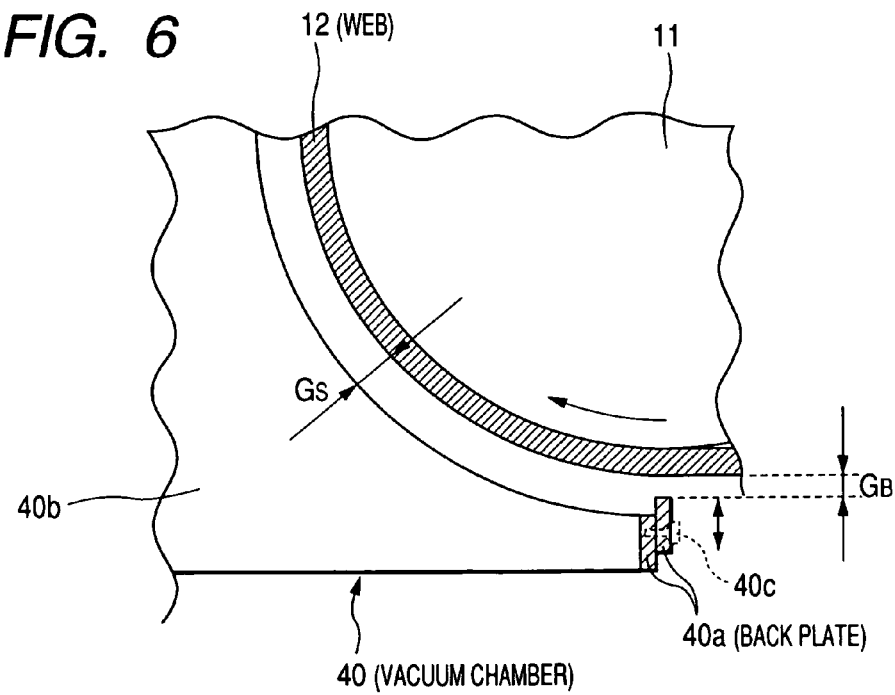
FIG. 6 is a cross-sectional view of a web and a vacuum chamber in a coating device, as another embodiment of the invention.

FIG. 5 and FIG. 6 each show a cross section of the vacuum chamber 40 and the web 12 that are in adjacent to each other. The side plate 40b and the back plate 40a may be integrated with the chamber body, as in FIG. 5; or they may be so designed that they are fitted to each other via a screw 40c or the like in order that the gap could be varied as in FIG. 6.

In any structure, the distance between the back plate 40a and the web 12, and the gap actually formed between the side plate 40b and the web 12 are defined as gaps $G_B$ and $G_S$, respectively. The gap $G_B$ between the back plate 40a of the vacuum chamber 40 and the web 12 is the distance between the uppermost edge of the back plate 40a and the web 12, when the vacuum chamber 40 is positioned below the web 12 and the slot die 13 as in FIG. 4.

Preferably, the vacuum chamber is so positioned that the gap $G_B$ between the back plate 40a and the web 12 could be larger than the gap $G_L$ between the tip lip 17 of the slot die 13 and the web 12. In that condition, the change in the pressure reduction around the beads owing to the eccentricity of the backup roll 11 can be prevented.

For example, when the gap $G_L$ between the tip lip 17 of the slot die 13 and the web 12 is from 30 μm to 100 μm, then the gap $G_B$ between the back plate 40a and the web 12 is preferably from 100 μm to 500 μm.

<Materials, Accuracy>

When the length of the tip lip 17 in the web-running direction on the web-running side of the web 12 is larger, then it is more unfavorable to bead formation; and when the length varies at any sites in the cross direction of the slot die, then the beads may be unstable owing to some external disturbance. Accordingly, it is desirable that the length fluctuation range in the cross direction of the slot die is controlled to fall within at most 20 μm.

Regarding the material of the tip lip 17 of the slot die, if the tip lip is formed of a material like stainless steel, then it may be deformed during the stage of die working, and, in that condition, even though the length in the web-running direction of the slot die tip lip 17 is controlled to be from 30 to 100 μm as so mentioned hereinabove, the accuracy of the tip lip 17 could not be satisfactory.

Accordingly, for ensuring high working accuracy, it is important that an ultra-hard material such as that described in Japanese Patent No. 2817053 is used for it. Concretely, it is desirable that at least the tip lip 17 of the slot die is formed of an ultra-hard alloy with carbide crystals bonding to each other and having a mean particle size of at most 5 μm.

The ultra-hard alloy comprises, for example, carbide crystal grains such as tungsten carbide (WC) bonding to each other with a bonding metal of cobalt, in which the bonding metal may be titanium, tantalum, niobium or their mixture. Preferably, the mean particle size of the WC crystals is at most 3 μm.

For realizing high-accuracy coating in forming the layer, the fluctuation of the gap between the length of the land of the tip lip 17 on the web-running direction side and the web, in the cross direction of the slot die is also an important factor. It is desirable that a good combination of the two factors, or that is, a straightness within a range capable of suppressing the gap fluctuation in some degree is attained. Preferably, the straightness of the tip lip 17 and the backup roll 11 may be such that the fluctuation range of the gap in the cross direction of the slot die could be at most 5 μm.

<Coating Speed>

When the accuracy of the backup roll and the tip lip as above is attained, then the coating system preferably employed in the invention enables a stable film thickness in a high-speed coating mode. In addition, since the coating system as above is a pre-metering system, it readily ensures a stable film thickness even in a high-speed coating mode. For the coating liquid that is used in a small amount to form a coating layer, the coating system employed herein is good since it enables high-speed coating to give a stable film thickness. Any other coating system may also be employed herein, but in a dip coating process, vibration of the coating liquid in a liquid tank is inevitable, and it may cause stepwise coating unevenness. In a reverse roll-coating process, the coating rolls used may be decentered or deflected thereby also causing stepwise coating unevenness. In addition, since these coating methods are post-metering methods, they could hardly ensure a stable film thickness. It is desirable that the coating liquid is applied at a speed of 25 m/min or more according to the above-mentioned coating method, from the viewpoint of the producibility.

A microgravure-coating method is employable in the invention, and this is described. A gravure roll having a diameter of from about 10 to 100 mm, preferably from about 20 to 50 mm, and having a gravure pattern engraved on the entire surface thereof is rotated below the support in the direction opposite to the traveling direction of the support, and using a doctor blade, the excess coating liquid is scraped away from the surface of the gravure roll, and a predetermined amount of the coating liquid is transferred onto the lower face of the support of which the upper face is kept free, and the coating liquid is thus applied to the support. A rolled transparent support is continuously unrolled, and on one side of the thus-unrolled support, formed is at least one layer of a hard coat layer and a low-refractive layer containing a fluoropolymer, according to the microgravure-coating method.

The coating condition in the microgravure-coating method is as follows: The number of lines of the gravure pattern engraved on the gravure roll is preferably from 50 to 800 lines/inch, more preferably from 100 to 300 lines/inch; the depth of the gravure pattern is preferably from 1 to 600 μm, more preferably from 5 to 200 μm; the number of revolution of the gravure roll is preferably from 3 to 800 rpm, more preferably from 5 to 200 rpm, and the support traveling speed is preferably from 0.5 to 100 m/min, more preferably from 1 to 50 m/sec.

A polarizing plate principally comprises two protective films between which a polarizing film is sandwiched on both surfaces thereof. Preferably, the antireflection film of the invention is used as at least one of the two protective films between which a polarizing film is sandwiched on both surfaces thereof. As the antireflection film of the invention serves also as a protective film, the production cost of polarizing plates may be reduced. When the antireflection film of the invention is used as the outermost layer of such a polarizing plate, then external light reflection on a panel with the polarizing plate may be prevented and the polarizing plate may have good scratch resistance and good stain resistance.

The polarizing film for use herein may be any known one, or may be cut out from a long polarizing film of which the absorption axis is neither parallel nor vertical to the machine direction of the film. A long polarizing film of which the absorption axis is neither parallel nor vertical to the machine direction thereof may be fabricated according to the method mentioned below.

Briefly, a long polymer film continuously fed out from a production line is, while held at its both edges by holding units, stretched under tension to be a polarizing film. Concretely, the film is stretched at least by 1.1 to 20.0 times in the cross direction of the film in the manner as follows: The running speed difference in the machine direction between the holding units at the edges of the film being stretched is within 3%; and the film-running direction is so curved, with the edges of the film being kept held, that the angle between the film-running direction at the outlet in the step of holding the edges of the film, and the substantially-stretching direction of the film could be from 20 to 70°. In particular, the angle is preferably 45° from the viewpoint of the producibility of the stretched film.

The stretching method for polymer films is described in detail in JP-A 2002-86554, paragraphs [0020] to [0030].

It is also desirable that the other film than the antireflection film of the two protective films for the polarizing film is an optically-compensatory film that has an optically-anisotropic layer-containing optically-compensatory layer. The optically-compensatory film (retardation film) is effective for improving the viewing angle characteristics of the display panel of liquid-crystal display devices.

For the optically-compensatory film, herein usable is any known one. For broadening the viewing angle of display devices, preferred is an optically-compensatory film that has an optically-compensatory layer of a compound having discotic structure units, in which the angle formed by the discotic compound and the support varies in the depth direction of the layer, as in JP-A 2001-100042.

Preferably, the angle increases with the increase in the distance to the optically-anisotropic layer from the side of the support surface.

Preferably, the transparent support of at least one of the two protective films of the polarizing film satisfies the following formulae (I) and (II) for better display improving effect in the oblique direction of the liquid-crystal display panel:

$$0 \leq Re_{(630)} \leq 10, \text{ and } |Rth_{(630)}| \leq 25 \qquad (I)$$

$$|Re_{(400)} - Re_{(700)}| \leq 10, \text{ and } |Rth_{(400)} - Rth_{(700)}| \leq 35 \qquad (II)$$

wherein $Re(\lambda)$ represents an in-plane retardation value (unit: nm) at a wavelength of $\lambda$ nm; and $Rth(\lambda)$ represents a thickness-direction retardation value (unit: nm) at a wavelength of $\lambda$ nm.

The antireflection film of the invention may be used in image display devices such as liquid-crystal displays (LCD), plasma display panels (PDP), electroluminescent displays (ELD) and cathode-ray tube displays (CRT). Since the antireflection film of the invention has a transparent support, the side of the transparent support of the film may be fitted to the image display panel of an image-display device comprising it.

In case where the antireflection film of the invention is used as a surface-protective film on one side of a polarizing film, then it is favorable for transmission-mode, reflection-mode or semitransmission-mode liquid-crystal display devices such as twisted nematic (TN)-mode, super-twisted nematic (STN)-mode, vertical alignment (VA)-mode, in-plain switching (IPS)-mode, or optically-compensatory bent cell (OCB)-mode devices.

The VA-mode liquid-crystal cell includes, in addition to (1) a narrow-sense VA-mode liquid-crystal cell where rod-shaped liquid-crystalline molecules are aligned substantially vertically in the absence of voltage application thereto but are aligned substantially horizontally in the presence of voltage application thereto (as in JP-A 2-176625); (2) a multi-domain VA-mode (MVA-mode) liquid crystal cell for viewing angle enlargement (as in SID97, Digest of Tech. Papers (preprint) 28 (1997), 845), (3) an n-ASM-mode liquid-crystal cell where rod-shaped liquid-crystalline molecules are substantially vertically aligned in the absence of voltage application thereto but are aligned for twisted multi-domain alignment in the presence of voltage application thereto (as in a preprint in the Japan Liquid-Crystal Discussion Meeting, 58-59 (1998)), and (4) a survival-mode liquid crystal cell (as announced in LCD International 98).

The OCB-mode liquid-crystal cell is for a liquid-crystal display device in which rod-shaped liquid-crystalline molecules are aligned substantially in the opposite direction (symmetrically) in the upper part and the lower part of the liquid-crystal cell, or that is, the liquid-crystal cell has a bent alignment mode. This is disclosed in U.S. Pat. Nos. 4,583,825 and 5,410,422. In this, the rod-shaped liquid-crystalline molecules are symmetrically aligned in the upper part and the lower part of the liquid-crystal cell, and the bent alignment-mode liquid-crystal cell of the type has a self-optically-compensatory function. Accordingly, the liquid-crystal mode is referred to as an OCB (optically-compensatory bent) liquid-crystal mode. The bent alignment-mode liquid-crystal display device has the advantage of rapid response speed.

As a whole including the bent alignment-mode liquid-crystal cell and the optically-anisotropic layer-containing polarizing plate, it is desirable that the optical characteristics of the devices satisfy the following formula (I') in measurement at any wavelength of 450 nm, 550 nm or 630 nm, for better display improving effect in the oblique direction of the liquid-crystal display panel, more preferably, the polarizing plate comprising the optical film of the invention as the protective film thereof satisfies the following formula (I').

$$0.05 < (\Delta n \times d)/(Re \times Rth) < 0.20 \qquad (I')$$

wherein $\Delta n$ indicates the intrinsic birefringence of the rod-shaped liquid-crystalline molecules in the liquid-crystal cell;

d indicates the thickness (nm) of the liquid-crystal layer of the liquid-crystal cell; Re indicates the in-plane retardation of the entire optically-anisotropic layer; and Rth indicates the retardation in the thickness direction of the entire optically-anisotropic layer.

In the ECB-mode liquid-crystal cell, rod-shaped liquid-crystalline molecules are substantially horizontally aligned in the absence of voltage application thereto, and the cell mode is most popularly used in color TFT liquid-crystal display devices. This is described in many references, for example, as in "EL, PDP, LCD Displays" issued by Toray Research Center (2001).

Especially in TN-mode or IPS-mode liquid-crystal display devices, an optically-compensatory film having a viewing angle-enlarging effect is used as one of the two protective films for a polarizing film on the other side thereof opposite to the side coated with the antireflection film of the invention, as in JP-A 2001-100043, and this is an especially favorable embodiemnt of a polarizing plate as its thickness is the same as the thickness of one polarizing plate and it enjoys both an antireflection effect and a viewing angle-enlarging effect.

EXAMPLES

The invention is described in more detail with reference to the following Examples, to which, however, the invention should not be limited. In the Examples, "part" and "%" are all by mass, unless otherwise specifically indicated.

(Production of Perfluoro-olefin Copolymer (1))

Perfluoro-olefin Copolymer (1):

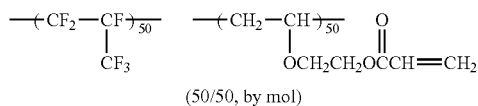

(50/50, by mol)

40 ml of ethyl acetate, 14.7 g of hydroxyethyl vinyl ether and 0.55 g of dilauryl peroxide were fed into a 100-ml stainless autoclave equipped with a stirrer, and the system was degassed and purged with nitrogen gas. 25 g of hexafluoropropylene (HFP) was introduced into the autoclave and heated up to 65° C. The pressure when the inner temperature of the autoclave reached 65° C. was 5.4 kg/cm². While the temperature was kept as such, the reaction was continued for 8 hours; and when the pressure reached 3.2 kg/cm², heating the system was stopped and this was left cooled. After the inner temperature lowered to room temperature, the unreacted monomer was expelled away, then the autoclave was opened, and the reaction liquid was taken out. Thus obtained, the reaction liquid was poured into a great excessive amount of hexane, the solvent was removed through decantation, and the precipitated polymer was taken out. The polymer was dissolved in a small amount of ethyl acetate and reprecipitated twice from hexane to thereby completely remove the remaining monomer. After dried, 28 g of the polymer was obtained. Next, 20 g of the polymer was dissolved in 100 ml of N,N-dimethylacetamide, 11.4 g of acrylic acid chloride was dropwise added thereto with cooling with ice, and then this was stirred at room temperature for 10 hours. Ethyl acetate was added to the reaction liquid, washed with water, and the organic layer was extracted out and concentrated. The resulting polymer was reprecipitated from hexane to obtain 19 g of the perfluoro-olefin copolymer (1). The polymer had a refractive index of 1.421.

(Preparation of Sol a-1)

In a reactor equipped with a stirrer and a reflux condenser, 120 parts of methyl ethyl ketone, 100 parts of acryloyloxypropyltrimethoxysilane (KBM-5103, produced by Shinetsu Chemical Industry), and 3 parts of diisopropoxyaluminiumethyl acetacetate were mixed, and 30 parts of ion-exchanged water was added to it and reacted at 60° C. for 4 hours, and then this was cooled to room temperature to obtain a sol (a-1). Its mass-average molecular weight was 1800. Of those over oligomer components in this, the components having a molecular weight of from 1000 to 20000 accounted for 100%. The degree of condensation, α in the above-mentioned numerical formula (II), of the sol, as calculated through $^{29}$Si-NMR, was 0.88. The gas chromatography of the sol confirmed the absence of the starting compound, acryloyloxypropyltrimethoxysilane, in the sol.

(Preparation of Sol a-2)

A transparent sol (a-2) was prepared in the same manner as that for the organosilane sol (a-1), for which, however, 120 parts of methyl ethyl ketone in preparation of sol (a-1) was changed to 120 parts of cyclohexanone, and after the reaction, the reaction mixture was cooled to room temperature, and 6 parts of acetylacetone was added to it. Its mass-average molecular weight was 1600. Of those over oligomer components in this, the components having a molecular weight of from 1000 to 20000 accounted for 100%. The degree of condensation, α of the sol, as determined through $^{29}$Si-NMR, was 0.82. The gas chromatography of the sol confirmed the absence of the starting compound, acryloyloxypropyltrimethoxysilane, in the sol.

(Preparation of Sol a-3)

187 g (0.80 mols) of acryloxypropyltrimethoxysilane, 27.2 g (0.20 mols) of methyltrimethoxysilane, 320 g (10 mols) of methanol and 0.06 g (0.001 mols) of KF were fed into a 1000-ml reactor equipped with a thermometer, a nitrogen-introducing duct and a dropping funnel, and 15.1 g (0.86 mols) of water was gradually dropwise added thereto with stirring at room temperature. After the addition, this was stirred at room temperature for 3 hours, and then heated with stirring under methanol reflux for 2 hours. After this, the low-boiling-point component was removed through evaporation under reduced pressure, and the residue was filtered to obtain 120 g of a sol (a-3). Its GPC confirmed that the thus-obtained substance has a mass-average molecular weight of 1500, and of those over oligomer components in this, the components having a molecular weight of from 1000 to 20000 accounted for 30%.

Its 1H-NMR confirmed that the substance obtained herein has a structure of the following formula:

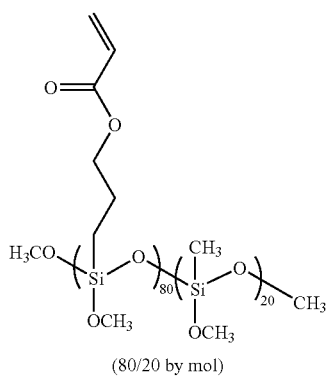

(80/20 by mol)

The degree of condensation, α of the sol, as determined through $^{29}$Si-NMR, was 0.56. The analytic data confirmed that the major part of the silane coupling agent sol has a linear structure.

The gas chromatography of the sol confirmed that the residual ratio of the starting compound, acryloyloxypropyltrimethoxysilane, in the sol is at most 5%.

In the same manner, sols (a-4) to (a-6), (a-8) and (a-9) shown in Table 1 below were prepared by varying the type and the amount of the silane coupling agent or the catalyst used.

(Preparation of Sol a-7)

230 g of ion-exchanged water and 0.2 g of 35% hydrochloric acid were fed into a 0.5-liter flask equipped with a stirrer, a condenser and a thermometer. With stirring, 22.4 g (0.056 mols) of $C_6F_{13}(CH_2)_2SiCH_3(OH)_2$, 12 g (0.056 mols) of acryloxypropyltrimethoxysilane, 168 g of methyl isobutyl ketone and 0.42 g (0.001 mols) of dibutoxy-(bis-2,4-pentadionate)titanium were added to it, and heated up to 80° C. In that condition, this was reacted as it was for 1 hour, and a pale yellow transparent solution was thus obtained. Its solid concentration was 18.0%. Its molecular weight, as determined through GPC, was about 1,000.

Composition of Coating Liquid for Antistatic Layer AS:

| | |
|---|---|
| Pertron C-4456-S7 | 100 g |
| Cyclohexanone | 30 g |
| MEK | 10 g |
| KBM-5103 | 1.5 g |

The coating liquid was filtered through a polypropylene filter having a pore size of 10 μm to prepare a coating liquid for antistatic layer.

Composition of Coating Liquid A-1 for Antiglare Hard Coat Layer:

| | |
|---|---|
| PET-30 | 50.0 g |
| Irgacure 184 | 2.0 g |
| SX-350 (30%) | 1.5 g |
| Crosslinked acryl-styrene particles | 13.0 g |
| FP-132 | 0.75 g |
| KBM-5103 | 10.0 g |
| Toluene | 38.5 g |

TABLE 1

| amount added (g) | Sol (a-1) | Sol (a-2) | Sol (a-3) | Sol (a-4) | Sol (a-5) | Sol (a-6) | Sol (a-7) | Sol (a-8) | Sol (a-9) |
|---|---|---|---|---|---|---|---|---|---|
| acryloxypropyltrimethoxysilane | 100 | 100 | 187 | 164 | 117 | 164 | 12 | 187 | 234 |
| methyltrimethoxysilane | — | — | 27.2 | — | 34 | — | — | 27.2 | — |
| tetraethoxysilane | — | — | — | 62.4 | — | — | — | — | — |
| acryloxypropylmethyldimethoxysilane | — | — | — | — | 54.5 | — | — | — | — |
| γ-glycidoxypropyltrimethoxysilane | — | — | — | — | — | 70.8 | — | — | — |
| $C_6F_{13}(CH_2)_2SiCH_3(OH)_2$ | — | — | — | — | — | — | 22.4 | — | — |
| aluminium diisopropoxide ethyl acetate | 3 | 3 | — | — | — | — | — | — | — |
| dibutoxy-(bis-2,4-pentadionate)titanium | — | — | — | — | — | — | 0.42 | — | — |
| KF | — | — | 0.06 | — | 0.06 | 0.06 | — | 0.06 | 0.06 |
| NH$_4$F | — | — | — | 0.04 | — | — | — | — | — |
| H$_2$O | 30 | 30 | 15.1 | 13 | 10.5 | 14 | 230 | 7.2 | 14 |
| mass-average molecular weight | 1800 | 1600 | 1500 | 1300 | 1600 | 850 | 1000 | 420 | 820 |
| proportion of components having molecular weight of less than 1000 | 5% | 5% | 70% | 70% | 65% | 70% | 50% | 90% | 70% |
| condensation ratio, α | 0.88 | 0.82 | 0.56 | 0.48 | 0.52 | 0.5 | 0.71 | 0.23 | 0.52 |
| proportion of residual monomer | 0% | 0% | <5% | <5% | <5% | <5% | <3% | <10% | <5% |

(Production of Fluororesin-Containing Polymer (FP-8))

39.93 g of 1H,1H,7H-dodecafluoroheptyl acrylate, 1.1 g of dimethyl 2,2'-azobisisobutyrate and 30 g of 2-butanone were put into a reactor equipped with a stirrer and a reflux condenser, and heated at 78° C. for 6 hours in a nitrogen atmosphere to complete the reaction of the components. The mass-average molecular weight of the product was $2.9 \times 10^4$.

The coating liquid was filtered through a polypropylene filter having a pore size of 30 μm to prepare a coating liquid (A-1) for antiglare hard coat layer.

(Composition of Coating Liquids A-2 to A-10 for Antiglare Hard Coat Layer)

Coating liquids (A-2) to (A-10) for antiglare hard coat layer were prepared in the same manner as that for the coating liquid (A-1), for which, however, 10.0 g of KBM-5103 used in the coating liquid (A-1) for antiglare hard coat layer was changed to the indicated amount of the sol as in Table 2.

TABLE 2

| amount added (g) | Coating Liquid for Antiglare Hard Coat Layer | | | | | | | | | |
| | A-1 | A-2 | A-3 | A-4 | A-5 | A-6 | A-7 | A-8 | A-9 | A-10 |
|---|---|---|---|---|---|---|---|---|---|---|
| KBM-5103 | 10 | — | — | — | — | — | — | — | — | — |
| sol (a-2) | — | — | 30 | — | — | — | — | — | — | — |
| sol (a-3) | — | — | — | 9.5 | — | — | — | — | — | — |
| sol (a-4) | — | — | — | — | 8.5 | — | — | — | — | — |
| sol (a-5) | — | — | — | — | — | 10 | — | — | — | — |
| sol (a-6) | — | — | — | — | — | — | 10.5 | — | — | — |
| sol (a-7) | — | — | — | — | — | — | — | 10 | — | — |
| sol (a-8) | — | — | — | — | — | — | — | — | 9 | — |
| sol (a-9) | — | — | — | — | — | — | — | — | — | 10 |

(Composition of Coating Liquid A-11 for Antiglare Hard Coat Layer)

A coating liquid (A-11) for antiglare hard coat layer was prepared in the same manner as that for the coating liquid (A-3), for which, however, the amount of SX-350 to be in the coating liquid was changed from 1.5 g to 15 g.

Composition for Coating Liquid B-1 for Light-Diffusive Layer:

| | |
|---|---|
| Desolight Z7404 | 100 g |
| DPHA | 30 g |
| KBM-51-3 | 10 g |
| KE-P150 | 9.0 g |
| MXS-300 | 3.5 g |
| MEK | 30 g |
| MIBK | 15 g |

The coating liquid was filtered through a polypropylene filter having a pore size of 30 μm to prepare a coating liquid (B-1) for light-diffusive layer.

(Composition of Coating Liquids B-2 to B-10 for Light-Diffusive Layer)

Coating liquids (B-2) to (B-10) for light-diffusive layer were prepared in the same manner as that for the coating liquid (B-1), for which, however, 10.0 g of KBM-5103 used in the coating liquid (B-1) for light-diffusive layer was changed to the indicated amount of the sol as in Table 3.

TABLE 3

| amount added (g) | Coating Liquid for Light-Diffusive Layer | | | | | | | | | |
|---|---|---|---|---|---|---|---|---|---|---|
| | B-1 | B-2 | B-3 | B-4 | B-5 | B-6 | B-7 | B-8 | B-9 | B-10 |
| KBM-5103 | 10 | — | — | — | — | — | — | — | — | — |
| sol (a-2) | — | — | 30 | — | — | — | — | — | — | — |
| sol (a-3) | — | — | — | 9.5 | — | — | — | — | — | — |
| sol (a-4) | — | — | — | — | 8.5 | — | — | — | — | — |
| sol (a-5) | — | — | — | — | — | 10 | — | — | — | — |
| sol (a-6) | — | — | — | — | — | — | 10.5 | — | — | — |
| sol (a-7) | — | — | — | — | — | — | — | 10 | — | — |
| sol (a-8) | — | — | — | — | — | — | — | — | 9 | — |
| sol (a-9) | — | — | — | — | — | — | — | — | — | 10 |

(Composition of Coating Liquid B-11 for Light-Diffusive Layer)

A coating liquid (B-11) for light-diffusive layer was prepared in the same manner as that for the coating liquid (B-3), for which, however, the amount of KEP-150 to be in the coating liquid was changed from 9.0 g to 18.0 g.

Composition for Coating Liquid C-1 for Low-Refractive Layer:

| | |
|---|---|
| Opster JTA (6%) | 13.0 g |
| MEK-ST-L (30%) | 1.0 g |
| Sol (a-1) | 0.5 g |
| MEK | 5.0 g |
| Cyclohexanone | 0.5 g |

Composition for Coating Liquid C-2 for Low-Refractive Layer:

| | |
|---|---|
| Opster JN (6%) | 10 g |
| MEK-ST (30%) | 0.5 g |
| MEK-ST-L (30%) | 0.5 g |
| Sol (a-1) | 0.2 g |
| MEK | 1.5 g |
| Cyclohexanone | 0.4 g |

Composition for Coating Liquid C-3 for Low-Refractive Layer:

| | |
|---|---|
| Opster JTA (6%) | 78.3 g |
| Hollow silica (18.2%) | 21.4 g |
| MEK-ST-L | 3.0 g |
| Sol (a-1) | 1.7 g |
| MEK | 4.8 g |
| Cyclohexanone | 5.8 g |

Composition for Coating Liquid C-4 for Low-Refractive Layer:

| | |
|---|---|
| DPHA | 3.0 g |
| Hollow silica (18.2%) | 40.0 g |
| RMS-033 | 0.7 g |
| Irgacure 907 | 0.2 g |
| Sol (a-1) | 6.0 g |
| MEK | 290.0 g |
| Cyclohexanone | 9.0 g |

Composition for Coating Liquid C-5 for Low-Refractive Layer:

| | |
|---|---|
| DPHA | 1.5 g |
| P-1 | 5.5 g |
| Hollow silica (18.2%) | 20.0 g |
| RMS-033 | 0.7 g |
| Irgacure 907 | 0.2 g |
| Sol (a-1) | 6.0 g |
| MEK | 305.0 g |
| Cyclohexanone | 9.0 g |

After stirred, the liquid was filtered through a polypropylene filter having a pore size of 1 μm to prepare the coating liquid for low-refractive layer.

The compounds used herein are mentioned below.

Pertron C-4456-S7: ATO-dispersed hart coat agent (solid concentration 45%, by Nippon Pernox).

KBM-5103: silane coupling agent (acryloxypropyltrimethoxysilane, by Shin-etsu Chemical Industry).

PET-30: mixture of pentaerythritol acrylate and pentaerythritol tetraacrylate (by Nippon Kayaku).

DPHA: mixture of dipentaerythritol pentaacrylate and dipentaerythritol hexaacrylate (by Nippon Kayaku).

Irgacure 184: polymerization initiator (by Ciba Speciality Chemicals).

SX-350: crosslinked polystyrene particles having a mean particle size of 3.5 μm (refractive index 1.60, by Sohken Chemical; 30% toluene dispersion, used after dispersed in a Polytron disperser at 10,000 rpm for 20 minutes).

Crosslinked acryl-styrene particles: having a mean particle size of 3.5 μm (refractive index 1.55, by Sohken Chemical; 30% toluene dispersion, used after dispersed in a Polytron disperser at 10,000 rpm for 20 minutes).

FP-8: fluorine-containing surface-modifying agent.

Desolight Z7404: $ZrO_2$ particles-containing hard coat agent (refractive index 1.62, solid concentration 60.4%, by JSR).

KEP-150: silica particles having a mean particle size of 1.5 μm (refractive index 1.46, by Nippon Shokubai, 30% MEK dispersion, used after dispersed in a Polytron disperser at 10,000 rpm for 20 minutes).

MXS-300: PMMA particles having a mean particle size of 3 μm (refractive index 1.49, by Nippon Shokubai, 30% MIBK dispersion, used after dispersed in a Polytron disperser at 10,000 rpm for 20 minutes).

Opster JN: prepared by dissolving 80 g of the fluoropolymer described in Example 1 in JP-A 11-189621, 15 g of a curing agent, Cymel 303 (by Nippon Cytec Industries), 2.0 g of a curing catalyst, Catalyst 4050 (Nippon Cytec Industries) in MEK to a concentration of 6% (refractive index 1.42, solid concentration 6%, by JSR).

Opster JTA: prepared by dissolving 80 g of the HBVE-increased fluoropolymer described in Example 1 in JP-A 11-189621, 20 g of a curing agent, Cymel 303 (by Nippon Cytec Industries), 2.0 g of a curing catalyst, Catalyst 4050 (Nippon Cytec Industries) in MKE to a concentration of 6% (refractive index 1.44, solid concentration 6%, by JSR).

P-1: perfluoro-olefin copolymer (1).

MEK-ST: colloidal silica dispersion (mean particle size 10 to 20 nm, solid concentration 30%, by Nissan Chemical).

MEK-ST-L: colloidal silica dispersion (this is the same type as MEK-ST but differs from it in point of the particle size thereof, particle size 45 nm, solid concentration 30%, by Nissan Chemical).

Hollow silica: KBM-5103 surface-modified hollow silica sol (degree of surface modification, 30% by mass to silica, CS-60 IPA, refractive index 1.31, mean particle size 60 nm, shell thickness 10 nm, solid concentration 18.2%, by Shokubai Kasei Kogyo).

X22-164C: reactive silicone (by Shin-etsu Chemical Industry).

RMS-033: reactive silicone (by Gelest).

Irgacure 907: photopolymerization initiator (by Ciba Speciality Chemicals).

Example 1

Production and Evaluation of Antireflection Films, Samples of the Invention 4 to 31, 104 to 131, and Comparative Samples 1 to 3, 101 to 103

(1) Formation of Antistatic Layer:

A roll of triacetylcellulose film having a thickness of 80 μm (TAC-TD80U, by Fuji Photo Film) was unrolled, and the coating liquid for antistatic layer was applied thereon, and dried at 60° C. for 150 seconds, and then exposed to UV rays from a 160 W/cm air-cool metal halide lamp (produced by Eyegraphics) under nitrogen purging. The illuminance was 400 mW/cm$^2$ and the irradiation dose was 250 mJ/cm$^2$. Thus, an antistatic layer having a thickness of 1 μm was formed on the film.

(2) Formation of Functional Layer:

The coating liquid for the functional layer shown in Table 1 and Table 2 (antiglare hard coat layer or light-diffusive layer) was applied onto the antistatic layer of the film, or directly onto the unrolled, 80-μm thick triacetylcellulose film (TAC-TD80U, by Fuji Photo Film) not coated with the antistatic layer, using a microgravure roll having a gravure pattern of 135 lines/inch to a depth of 60 μm and having a diameter of 50 mm, and a doctor blade, at a film traveling speed of 10 m/min. This was dried at 60° C. for 150 seconds, and then exposed to UV rays from a 160 W/cm air-cool metal halide lamp (produced by Eyegraphics) under nitrogen purging, whereby the coating layer was cured. The illuminance was 400 mW/cm$^2$ and the irradiation dose was 250 mJ/cm$^2$, Thus, a functional layer of an antiglare hard coat layer (thickness 6 μm) or a light-diffusive layer (thickness, 3.4 μm) was formed, and the film was wound up.

(3) Formation of Low-Refractive Layer:

The triacetyl cellulose film coated with the antistatic layer and the functional layer, or with the functional layer was again unrolled, and the coating liquid for low-refractive layer was applied thereon, using a microgravure roll having a gravure pattern of 200 lines/inch to a depth of 30 μm and having a diameter of 50 mm, and a doctor blade, at a film traveling speed of 20 m/min. This was dried at 120° C. for 75 seconds, and then further dried for 10 minutes, and then exposed to UV rays from a 240 W/cm air-cool metal halide lamp (produced by Eyegraphics) under nitrogen purging, whereby the coating layer was cured. The illuminance was 400 mW/cm$^2$ and the irradiation dose was 240 mJ/cm$^2$. Thus, a low-refractive layer having a thickness of 100 nm was formed, and the film was wound up.

(Fabrication of Antireflection Film Samples)

According to the method as above, antireflection film samples were fabricated as in Tables 4 and 5.

TABLE 4

| Sample No. | | Coating Liquid for antistatic layer | Coating Liquid for antiglare hard coat layer | Coating Liquid for low-refractive layer | Vaporization Test | Adhesiveness | Steel Wool Abrasion Resistance |
|---|---|---|---|---|---|---|---|
| 1 | comparative example | — | A-1 | C-1 | D | D | B |
| 2 | comparative example | — | A-2 | C-1 | B | B | E |
| 3 | comparative example | — | A-11 | C-1 | A | A | B |
| 4 | the invention | — | A-3 | C-1 | A | A | B |
| 5 | the invention | — | A-4 | C-1 | B | B | B |
| 6 | the invention | — | A-5 | C-1 | B | B | B |
| 7 | the invention | — | A-6 | C-1 | B | B | B |

TABLE 4-continued

| Sample No. | | | | | | | | |
|---|---|---|---|---|---|---|---|---|
| 8 | the invention | — | A-7 | C-1 | B | B | A | |
| 9 | the invention | — | A-8 | C-1 | B | A | B | |
| 10 | the invention | — | A-9 | C-1 | C | C | B | |
| 11 | the invention | — | A-10 | C-1 | B | B | D | |
| 12 | the invention | AS | A-4 | C-1 | B | B | B | |
| 13 | the invention | AS | A-5 | C-1 | B | B | C | |
| 14 | the invention | AS | A-6 | C-1 | B | B | B | |
| 15 | the invention | AS | A-7 | C-1 | B | B | A | |
| 16 | the invention | AS | A-8 | C-1 | B | A | B | |
| 17 | the invention | — | A-4 | C-3 | B | B | B | |
| 18 | the invention | — | A-5 | C-3 | B | B | C | |
| 19 | the invention | — | A-6 | C-3 | B | B | B | |
| 20 | the invention | — | A-7 | C-3 | B | B | A | |
| 21 | the invention | — | A-8 | C-3 | B | A | B | |
| 22 | the invention | AS | A-4 | C-4 | B | B | B | |
| 23 | the invention | AS | A-5 | C-4 | B | B | C | |
| 24 | the invention | AS | A-6 | C-4 | B | B | B | |
| 25 | the invention | AS | A-7 | C-4 | B | B | A | |
| 26 | the invention | AS | A-8 | C-4 | B | A | B | |
| 27 | the invention | — | A-4 | C-5 | B | B | B | |
| 28 | the invention | — | A-5 | C-5 | B | B | C | |
| 29 | the invention | — | A-6 | C-5 | B | B | B | |
| 30 | the invention | — | A-7 | C-5 | B | B | A | |
| 31 | the invention | — | A-8 | C-5 | B | A | B | |

| Sample No. | | Wet Cotton Bud Abrasion Resistance | Rubber Eraser Abrasion Resistance | Mean Reflectance (%) | Haze (%) | Inner Haze (%) | Surface Resistivity (log SR) 25° C., 60% RH | Dust Resistance | Contact Angle, Fingerprint Resistance | Glaring |
|---|---|---|---|---|---|---|---|---|---|---|
| 1 | comparative example | B | B | 1.9 | 38 | 28 | 15 | B | A | A |
| 2 | comparative example | F | C | 1.9 | 32 | 22 | 15 | B | A | A |
| 3 | comparative example | B | B | 2.1 | 65 | 55 | 15 | B | A | D |
| 4 | the invention | B | B | 2.1 | 35 | 25 | 15 | B | A | A |
| 5 | the invention | B | B | 1.9 | 37 | 27 | 15 | B | A | A |
| 6 | the invention | B | B | 1.9 | 36 | 26 | 15 | B | A | A |
| 7 | the invention | B | B | 1.9 | 35 | 25 | 15 | B | A | A |
| 8 | the invention | A | A | 1.9 | 39 | 29 | 15 | B | A | A |
| 9 | the invention | B | B | 2 | 37 | 27 | 15 | B | A | A |
| 10 | the invention | B | B | 1.9 | 36 | 26 | 15 | B | A | A |
| 11 | the invention | B | B | 1.9 | 32 | 22 | 15 | B | A | A |
| 12 | the invention | B | B | 1.9 | 37 | 27 | 11 | A | A | A |
| 13 | the invention | C | C | 1.9 | 36 | 26 | 11 | A | A | A |
| 14 | the invention | B | B | 1.9 | 35 | 25 | 11 | A | A | A |
| 15 | the invention | A | A | 1.9 | 39 | 29 | 11 | A | A | A |
| 16 | the invention | B | B | 2 | 37 | 27 | 11 | A | A | A |
| 17 | the invention | B | B | 1.5 | 37 | 27 | 15 | B | A | A |
| 18 | the invention | C | C | 1.5 | 36 | 26 | 15 | B | A | A |
| 19 | the invention | B | B | 1.5 | 35 | 25 | 15 | B | A | A |
| 20 | the invention | A | A | 1.5 | 39 | 29 | 15 | B | A | A |
| 21 | the invention | B | B | 1.6 | 37 | 27 | 15 | B | A | A |
| 22 | the invention | B | B | 1.7 | 37 | 27 | 11 | A | A | A |
| 23 | the invention | C | C | 1.7 | 36 | 26 | 11 | A | A | A |
| 24 | the invention | B | B | 1.7 | 35 | 25 | 11 | A | A | A |
| 25 | the invention | A | A | 1.7 | 39 | 29 | 11 | A | A | A |
| 26 | the invention | B | B | 1.8 | 37 | 27 | 11 | A | A | A |
| 27 | the invention | B | B | 1.6 | 37 | 27 | 15 | B | A | A |
| 28 | the invention | C | C | 1.6 | 36 | 26 | 15 | B | A | A |
| 29 | the invention | B | B | 1.6 | 35 | 25 | 15 | B | A | A |
| 30 | the invention | A | A | 1.6 | 39 | 29 | 15 | B | A | A |
| 31 | the invention | B | B | 1.7 | 37 | 27 | 15 | B | A | A |

TABLE 5

| Sample No. | | Coating Liquid for antistatic layer | Coating Liquid for light-diffusive layer | Coating Liquid for low-refractive layer | Vaporization Test | Adhesiveness | Steel Wool Abrasion Resistance |
|---|---|---|---|---|---|---|---|
| 101 | comparative example | — | B-1 | C-2 | D | D | B |
| 102 | comparative example | — | B-2 | C-2 | B | B | E |
| 103 | comparative example | — | B-11 | C-2 | A | A | B |
| 104 | the invention | — | B-3 | C-2 | A | A | B |
| 105 | the invention | — | B-4 | C-2 | B | B | B |
| 106 | the invention | — | B-5 | C-2 | B | B | B |
| 107 | the invention | — | B-6 | C-2 | B | B | B |
| 108 | the invention | — | B-7 | C-2 | B | B | A |
| 109 | the invention | — | B-8 | C-2 | B | A | B |
| 110 | the invention | — | B-9 | C-2 | C | C | B |

TABLE 5-continued

| Sample No. | | | | | | | | |
|---|---|---|---|---|---|---|---|---|
| 111 | the invention | — | B-10 | C-2 | B | B | B | D |
| 112 | the invention | AS | B-4 | C-2 | B | B | B | B |
| 113 | the invention | AS | B-5 | C-2 | B | B | B | C |
| 114 | the invention | AS | B-6 | C-2 | B | B | B | B |
| 115 | the invention | AS | B-7 | C-2 | B | B | B | A |
| 116 | the invention | AS | B-8 | C-2 | B | B | A | B |
| 117 | the invention | — | B-4 | C-3 | B | B | B | B |
| 118 | the invention | — | B-5 | C-3 | B | B | B | C |
| 119 | the invention | — | B-6 | C-3 | B | B | B | B |
| 120 | the invention | — | B-7 | C-3 | B | B | B | A |
| 121 | the invention | — | B-8 | C-3 | B | B | A | B |
| 122 | the invention | AS | B-4 | C-4 | B | B | B | B |
| 123 | the invention | AS | B-5 | C-4 | B | B | B | C |
| 124 | the invention | AS | B-6 | C-4 | B | B | B | B |
| 125 | the invention | AS | B-7 | C-4 | B | B | B | A |
| 126 | the invention | AS | B-8 | C-4 | B | B | A | B |
| 127 | the invention | — | B-4 | C-5 | B | B | B | B |
| 128 | the invention | — | B-5 | C-5 | B | B | B | C |
| 129 | the invention | — | B-6 | C-5 | B | B | B | B |
| 130 | the invention | — | B-7 | C-5 | B | B | B | A |
| 131 | the invention | — | B-8 | C-5 | B | B | A | B |

| Sample No. | | Wet Cotton Bud Abrasion Resistance | Rubber Eraser Abrasion Resistance | Mean Reflectance (%) | Haze (%) | Inner Haze (%) | Surface Resistivity (log SR) 25° C., 60% RH | Dust Resistance | Contact Angle, Fingerprint Resistance | Glaring |
|---|---|---|---|---|---|---|---|---|---|---|
| 101 | comparative example | B | B | 1.2 | 48 | 46 | 15 | B | A | A |
| 102 | comparative example | F | D | 1.2 | 42 | 40 | 15 | B | A | A |
| 103 | comparative example | B | B | 1.2 | 60 | 58 | 15 | B | A | D |
| 104 | the invention | B | B | 1.2 | 45 | 43 | 15 | B | A | A |
| 105 | the invention | B | B | 1.2 | 47 | 45 | 15 | B | A | A |
| 106 | the invention | B | B | 1.2 | 46 | 44 | 15 | B | A | A |
| 107 | the invention | B | B | 1.2 | 45 | 43 | 15 | B | A | A |
| 108 | the invention | A | A | 1.2 | 49 | 47 | 15 | B | A | A |
| 109 | the invention | B | B | 1.3 | 47 | 45 | 15 | B | A | A |
| 110 | the invention | B | B | 1.2 | 46 | 44 | 15 | B | A | A |
| 111 | the invention | B | B | 1.2 | 42 | 40 | 15 | B | A | A |
| 112 | the invention | B | B | 1.2 | 47 | 45 | 11 | A | A | A |
| 113 | the invention | C | C | 1.2 | 46 | 44 | 11 | A | A | A |
| 114 | the invention | B | B | 1.2 | 45 | 43 | 11 | A | A | A |
| 115 | the invention | A | A | 1.2 | 49 | 47 | 11 | A | A | A |
| 116 | the invention | B | B | 1.3 | 47 | 45 | 11 | A | A | A |
| 117 | the invention | B | B | 0.8 | 47 | 45 | 15 | B | A | A |
| 118 | the invention | C | C | 0.8 | 46 | 44 | 15 | B | A | A |
| 119 | the invention | B | B | 0.8 | 45 | 43 | 15 | B | A | A |
| 120 | the invention | A | A | 0.8 | 49 | 47 | 15 | B | A | A |
| 121 | the invention | B | B | 0.9 | 47 | 45 | 15 | B | A | A |
| 122 | the invention | B | B | 1 | 47 | 45 | 11 | A | A | A |
| 123 | the invention | C | C | 1 | 46 | 44 | 11 | A | A | A |
| 124 | the invention | B | B | 1 | 45 | 43 | 11 | A | A | A |
| 125 | the invention | A | A | 1 | 49 | 47 | 11 | A | A | A |
| 126 | the invention | B | B | 1.1 | 47 | 45 | 11 | A | A | A |
| 127 | the invention | B | B | 0.9 | 47 | 45 | 15 | B | A | A |
| 128 | the invention | C | C | 0.9 | 46 | 44 | 15 | B | A | A |
| 129 | the invention | B | B | 0.9 | 45 | 43 | 15 | B | A | A |
| 130 | the invention | A | A | 0.9 | 49 | 47 | 15 | B | A | A |
| 131 | the invention | B | B | 1 | 47 | 45 | 15 | B | A | A |

(Saponification of Antireflection Film)

After fabricated, the film samples were treated as follows: An aqueous solution (1.5 mol/liter) of sodium hydroxide was prepared, and kept at 55° C. An aqueous solution (0.01 mol/liter) of diluted sulfuric acid was prepared and kept at 35° C. The antireflection film fabricated as above was dipped in the aqueous sodium hydroxide solution for 2 minutes, and then in water to fully wash out the aqueous sodium hydroxide solution. Next, this was dipped in the aqueous diluted sulfuric acid solution for 1 minute and then in water to fully wash out the aqueous diluted sulfuric acid solution. Finally, the sample was well dried at 120° C.

According to the process, saponified antireflection films (samples of the invention 4 to 31, and 104 to 131, and comparative samples 1 to 3, and 101 to 103) were produced.

(Evaluation of Antireflection Film)

Thus obtained, the antireflection film samples were tested for the matters mentioned below. The results are shown in Tables 4 and 5.

(1) Evaluation for Vaporization:

The theoretically calculated solid concentration (I) of each sol is compared with the actually-measured solid concentration (II) thereof, as derived from the weight change in drying the sol at 130° C. for 2 hours; and based on the difference between the two, the sol is evaluated as follows:

A: less than 3%.
B: from 3% to less than 5%.
C: from 5% to less than 10%.
D: 10% or more.

(2) Evaluation for Adhesiveness:

Using a knife cutter, the surface of the antireflection film on the side thereof coated with the antireflection layer is cut with 11 vertical cutting and 11 horizontal cutting lines to thereby form 100 square crosscuts in total. A polyester adhesive tape (No. 31B by Nitto Denko) is stuck under pressure to it, and the sample is subjected to an adhesiveness test. The same test was repeated three times at the same site of one sample. The sample is checked for the presence or absence of peeled crosscuts, and is evaluated according to the following four criteria:
- A: No crosscut peeled.
- B: At most two of 100 crosscuts peeled.
- C: From 3 to 10 of 100 crosscuts peeled.
- D: More than 10 of 100 crosscuts peeled.

(3) Evaluation for Steel Wool Abrasion Resistance:

Using a rubbing tester, each film sample is subjected to an abrasion test under the condition mentioned below.
- Test environment condition: 25° C., 60% RH.
- Rubber: Steel wool (Nippon Steel Wool's grade No. 0000) is wound around the rubbing tip (1 cm×1 cm) of the tester that is to be in contact with a sample, and this is fixed with a band so as not to move.
- Stroke length (one way): 13 cm.
- Rubbing speed: 13 cm/sec.
- Load: 500 g/cm$^2$
- Tip contact area: 1 cm×1 cm.
- Rubbing frequency: 10 times back and forth.

An oily black ink is applied to the back of the rubbed sample, and this is visually observed under reflected light and checked for the scratches in the rubbed part. The sample is evaluated under the following criteria:
- A: No scratch found in careful observation.
- B: Slight and weak scratches found in careful observation.
- C: Weak scratches found.
- D: Middle-class scratches found.
- E: Scratches found at a glance.

(4) Evaluation for Wet Cotton Bud Abrasion Resistance:

A wet cotton bud is fixed to the rubbing tip of a rubbing tester. In a flat dish, the upper and the lower sides of a sample are fixed with clips. At room temperature of 25° C., the sample and the cotton bud are dipped in water at 25° C., and a load of 500 g is applied to the cotton bud. Under the condition, the sample is subjected to a rubbing test at a different rubbing frequency. The rubbing condition is as follows:
- Stroke length (one way): 1 cm.
- Rubbing speed: about 2 back-and-forth strokes/sec.

The rubbed sample is observed, and on the basis of the rubbing frequency having caused film peeling, the rubbing resistance of the sample is evaluated according to the following criteria:
- A: No film peeling even after 150 back-and-forth rubbing strokes.
- B: Film peeled after 100 to 150 back-and-forth rubbing strokes.
- C: Film peeled after 50 to 100 back-and-forth rubbing strokes.
- D: Film peeled after 30 to 50 back-and-forth rubbing strokes.
- E: Film peeled after 10 to 30 back-and-forth rubbing strokes.
- F: Film peeled after 0 to 10 back-and-forth rubbing strokes.

(5) Rubber Eraser Abrasion Resistance:

An antireflection film sample is fixed on a glass plate with an adhesive. A rubber eraser, MONO (trade name, by Tombow) is hollowed to give a piece having a diameter of 8 mm and a thickness of 4 mm. The rubber eraser piece is used as a head of a rubbing tester. This is vertically pressed against the surface of the antireflection film sample under a load of 500 g/cm$^2$, and at 25° C. and 60% RH, this is rubbed against the sample for a stroke length of 3.5 cm at a rubbing speed of 1.8 cm/sec, for 200 back-and-forth rubbing strokes in total. Then, the adhered rubber eraser is removed, and the rubbed part of the sample is visually checked for the degree of scratches. The same test is repeated three times with one sample, and the data of the sample are averaged. The sample is evaluated according to the following five criteria:
- A: No scratch found.
- B: Few scratches found.
- C: Some scratches found.
- D: Clear scratches found.
- E: Scratches found in the entire rubbed surface.

(6) Mean Reflectance:

Using a spectrophotometer (by Nippon Bunkoh), the spectral reflectance of the film sample is measured within a wavelength range of from 380 to 780 nm, at an incident angle of 5°. The data within a range of from 450 to 650 nm are averaged, and the resulting mean value indicates the mean reflectance of the sample.

(7) Measurement of Haze and Inner Haze:

Using a haze meter Model 1001DP (trade name, by Nippon Denshoku Kogyo), the haze of the sample is measured. Coating liquids for antiglare hard coat layer and light-diffusive layer are prepared in the same manner as those mentioned above, except that the mat particles or the translucent particles are removed from the former. The coating liquids are applied onto a substrate, dried and cured to thereby form an antiglare hard coat layer or a light-diffusive layer thereon. Thus prepared, the haze of the films with no surface roughness is also measured, and this is an inner haze of the film sample.

(8) Measurement of Surface Resistivity:

All samples are conditioned at 25° C. and 60% RH or at 25° C. and 10% RH for 2 hours, and the surface resistivity (SR) thereof is measured under the same condition according to a circular electrode method.

(9) Evaluation for Dust Resistance:

An antireflection film sample is stuck to the surface of CRT on the transparent support side thereof, and this is used for 24 hours in a room having from 1,000,000 to 2,000,000 particles/ft$^3$ of air dust and tissue paper dust having a particle size of at least 0.5 μm. The number of the air dust particles and the tissue paper dust particles having adhered to the antireflection film, per 100 cm$^2$ of the film, is counted. Based on the mean value of the data, the film is evaluated as follows:
- A: Less than 20 particles.
- B: From 20 to 49 particles.
- C: From 50 to 199 particles.
- D: 200 particles or more.

(10) Contact Angle, Evaluation for Fingerprint Resistance:

This is to demonstrate the stain resistance of the surface of the films. The film sample is conditioned at a temperature of 25° C. and at a humidity of 60% RH for 2 hours, and then the contact angle thereof to water is measured. In addition, a fingerprint is given to the sample surface, and this is wiped away with a cleaning cloth. The sample surface is observed, and its fingerprint resistance is evaluated as follows:
- A: Fingerprint completely wiped away.
- B: Some fingerprint remained as visible.
- C: Almost all fingerprint could not be wiped away.

(11) Evaluation for Antiglare Property:

Diffusive light from a fluorescent lamp with a louver is reflected on the film, and the film is evaluated for the antiglare property according to the criteria mentioned below.

A: No glare seen.
B: Little glare seen.
C: Some glare seen.
D: Visible glare seen.

The results in Tables 4 and 5 confirm the following:

The sols for the antireflection film of the invention vaporize little, and form layers of good adhesiveness. The antireflection film satisfies well-balanced properties of scratch resistance, dust resistance, stain resistance and antiglare property, and has improved properties as a whole.

When X-40-2671G (silane coupling agent, by Shin-etsu Chemical Industry) was used in place of the sol (a-3) of the invention, a similar antireflection film was obtained, and it had good properties. When the sol (a-2) was used in place of the sol (a-1) for the coating liquid for low-refractive layer, then the storage stability of the coating liquid became better, and its aptitude to continuous coating increased higher.

Example 2

A triacetylcellulose film having a thickness of 80 μm (TAC-TD80U, produced by Fuji Photo Film), which had been dipped in an aqueous NaOH solution (1.5 mol/liter) at 55° C. for 2 minutes and then neutralized and washed with water, and the sample of the invention (saponified) in Example 1 were stuck to both surfaces of a polarizing film that had been prepared by stretching an iodine-adsorbed polyvinyl alcohol film, and the film was thus protected to give a polarizing plate. Thus fabricated, the polarizing plate was replaced for the viewing side polarizing plate in a notebook-size personal computer having a transmission-type TN-mode liquid-crystal display device built therein (the liquid-crystal display device has a polarized light-selective layer-having polarized light separation film, Sumitomo 3M's D-BEF in the space between the backlight and the liquid-crystal cell). As a result, the external light reflection on the display panel in the device was much reduced, and the display quality of the device was extremely good.

Example 3

A PVA film was dipped in an aqueous solution containing 2.0 g/liter of iodine and 4.0 g/liter of potassium iodide, at 25° C. for 240 seconds, and then dipped in an aqueous solution of 10 g/liter of boric acid at 25° C. for 60 seconds, and thereafter this was led into a stretching tenter of a mode shown in FIG. 2 in JP-A 2002-86554, in which this was stretched by 5.3 times. The tenter was bent in the stretching direction as in that FIG. 2, and thereafter its width was kept constant. The film was dried in an atmosphere at 80° C., and them taken out of the tenter. The traveling speed difference between the right and left tenter clips was less than 0.05%, and the angle formed by the center line of the film led into the tenter and the center line of the film to be fed to the next step was 46°. In this, |L1-L2| was 0.7 m; W was 0.7 m; and |L1-L2|=W. The substantial stretching direction Ax-Cx at the tenter outlet was inclined by 45° from the center line 22 of the film to be fed to the next step. Neither wrinkle nor deformation was seen in the film at the tenter outlet.

Using an aqueous 3% solution of PVA (Kuraray's PVA-117H) as an adhesive, the film was stuck to a saponified, Fuji Photo Film's Fujitac film (cellulose triacetate, having a retardation of 3.0 nm), and dried at 80° C. to obtain a polarizing plate having an effective width of 650 mm. The absorption axis direction of the thus-obtained polarizing plate was inclined by 45° to the machine direction thereof. The transmittance at 550 nm of the polarizing plate was 43.7%, and the degree of polarization thereof was 99.97%. This was cut into a size of 310 mm×233 mm, and it gave a polarizing plate having an area efficiency of 91.5%, of which the absorption axis was inclined by 45° to the size thereof.

Next, the film of the invention (saponified) in Example 1 was stuck to the polarizing plate to fabricate an antireflection film-having polarizing plate. Using the polarizing plate, a liquid-crystal display device was constructed, in which the antireflection layer was the outermost surface layer. The device was free from a problem of external light reflection on the display panel thereof, and therefore its visibility was good since the reflected image on its display panel was invisible.

Example 4

An optically-compensatory film (Wide View Film Ace, by Fuji Photo Film) was used as the protective film of the viewing side polarizing plate on the liquid-crystal cell side of a transmission-type TN-mode liquid-crystal cell with the sample of the invention of Example 1 stuck thereto, and as the protective film on the liquid-crystal cell side of the polarizing plate on the backlight side thereof. Thus constructed, the liquid-crystal display device had a good contrast in a light room, its viewing angle was extremely broadened in every direction, its visibility was bettered and its display quality was also bettered.

The samples of the invention 104 to 131 (light-diffusive layer-having samples) had a scattered light intensity of 0.05% at 30° to a light-going out angle of 0°. Because of this light-scattering characteristic thereof, the viewing angle of the samples was broadened especially in the downward direction and the yellowing appearance in the right and left direction thereof was reduced. Accordingly, the liquid-crystal display devices constructed herein were extremely good. For comparison, films were fabricated in the same manner as that for the samples of the invention 104 to 131, for which, however, the crosslinked PMMA particles and the silica particles were removed from the coating liquids (B-1) to (B-10) for light-diffusive layer. The scattered light intensity of these comparative samples at 30° to a light-going out angle of 0° was substantially 0%, and the downward viewing angle of the comparative samples was not broadened and the yellowing appearance thereof was not reduced at all.

Example 5

A cellulose acylate having a degree of acetyl substitution of 2.94 was used. According to a co-casting method, a cellulose acylate sample 301 having a thickness of 80 μm was produced, which contained 49.3% (relative to cellulose acylate) of an optical anisotropy depressant A-19, and 7.6% (relative to cellulose acylate) of a wavelength dispersion controlling agent, UV-102. The retardation, Re of the thus-obtained film was −1.0 nm (this is negative, since the slow axis is in the TD direction), and the thickness direction retardation, Rth thereof was −2.0 nm. Both these data are extremely small. The cellulose acylate sample was used as a transparent support of a protective film, which is one of the two protective films of a polarizing film and which is on the cell side; and the sample of the invention in Example 1 was used as the protective film thereof on the viewing side. Thus constructed, the polarizing plate was tested in a liquid-crystal display device described in Example 1 in JP-A 10-48420; with an optically-anisotropic layer containing discotic liquid-crystal molecules, described in Example 1 in JP-A 9-26572; with a polyvinyl alcohol-coated alignment film; in a VA-mode liquid-crystal display device described in FIGS. 2 to 9 in JP-A 2000-154261; or in an OCB-mode liquid-crystal display device described in FIGS. 10 to 15 in JP-A 2000-154261. In all cases, good results were obtained in point of the image contrast and the viewing angle of the display devices.

A-19:

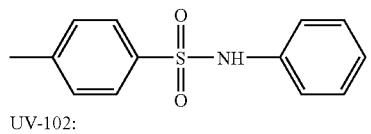

UV-102:

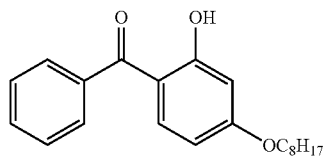

Example 6

The sample of the invention in Example 1 was stuck to the glass sheet on the surface of an organic EL display device, via an adhesive. As a result, the reflection on the glass surface was suppressed, and the visibility of the display device was bettered.

Example 7

Using the sample of the invention in Example 1, a polarizing plate having an antireflection film on one surface thereof was fabricated. A λ/4 plate was stuck to the other side of the polarizing plate, opposite to the side coated with the antireflection film. This was stuck to the glass plate on the surface of an organic EL display device in such a manner that the antireflection film of the polarizing plate could be the outermost layer of the device. As a result, the surface reflection and the inner reflection from the glass surface of the device were both cut, and the visibility of the display device was thereby extremely bettered.

The antireflection film of the invention has good adhesiveness between upper and lower layers therein and stably shows the necessary optical properties while having good scratch resistance. In addition, it has good dust resistance and good stain resistance. The antireflection film of the invention can be produced at high producibility. The display device comprising the antireflection film of the invention, and the display device comprising the polarizing plate with the antireflection film of the invention are free from troubles of external light reflection and background scene reflection on the panel and ensure extremely good visibility, and they are free from a trouble of display unevenness and have good display quality.

The entire disclosure of each and every foreign patent application from which the benefit of foreign priority has been claimed in the present application is incorporated herein by reference, as if fully set forth.

What is claimed is:

1. An antireflection film comprising:
   a transparent support;
   at least one functional layer; and
   a low-refractive layer,
   wherein at least one of said at least one functional layer comprises a hydrolyzate and/or a partial condensate of an organosilane compound represented by formula (1), and
   the antireflection film has an inner haze of from 1 to 50%:

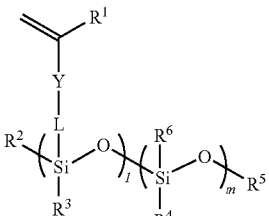

(1)

where $R^1$ represents a hydrogen atom, a methyl group, a methoxy group, an alkoxycarbonyl group, a cyano group, a fluorine atom, or a chlorine atom;
Y represents a single bond, *—COO—**, *—CONH—**, or *—O—**, wherein * indicates the position at which the group bonds to $=C(R^1)—$; and ** indicates the position at which the group bonds to L;
L represents a divalent linking group;
$R^2$ to $R^4$ each independently represents a halogen atom, a hydroxyl group, an unsubstituted alkoxy group, or an unsubstituted alkyl group;
$R^5$ represents a hydrogen atom or an unsubstituted alkyl group;
$R^6$ represents a substituted or unsubstituted alkyl group, or a substituted or unsubstituted aryl group; and
I indicates a number that satisfies a numerical formula of I=100−m, and m indicates a number of from 0 to 50, and
wherein the hydrolyzate and/or the partial condensate of the organosilane compound may be a hydrolyzate and/or a partial condensate of a mixture of a plurality of different compounds represented by formula (1),
wherein the hydrolyzate and/or the partial condensate of the organosilane compound contains 30% by mass or more of a hydrolyzate and/or a partial condensate of the organosilane compound having a molecular weight of less than 1000.

2. The antireflection film as claimed in claim 1, wherein the low-refractive layer comprises a binder having a functional group capable of crosslinking with $R^1$ in formula (1).

3. The antireflection film as claimed in claim 1, wherein $R^6$ in formula (1) is a fluoroalkyl group.

4. The antireflection film as claimed in claim 1, wherein each of the functional layer and the low-refractive layer comprises a binder which is one of a thermosetting resin and a UV-curable resin.

5. A polarizing plate comprising:
a polarizing film; and
two protective films for the polarizing film;
wherein at least one of the two protective films is an antireflection film of claim 1.

6. A display device comprising a polarizing plate of claim 5,
wherein the low-refractive layer is disposed on a viewing side of the device.

7. A display device comprising an antireflection film of claim 1,
wherein the low-refractive layer is disposed on a viewing side of the device.

* * * * *